United States Patent
Komarek et al.

(10) Patent No.: US 6,408,008 B1
(45) Date of Patent: Jun. 18, 2002

(54) CIRCUIT FOR ATTENUATION OF ECHOS CAUSED BY LINE VARIATIONS AND AN INTERFACING SYSTEM FOR CAPACITIVELY COUPLING A PLURALITY OF SOURCES TO A TWO-WIRE COMMUNICATION LINE

(75) Inventors: James A. Komarek, Newport Beach; Jack L. Minney, Irvine; Stephen P. Nordine, Santa Ana; Harold F. Lewis, Villa Park; Richard Wada, Santa Ana; John F. Stockman, Costa Mesa, all of CA (US)

(73) Assignee: Creative Integrated Systems, Inc., Santa Ana, CA (US)

( * ) Notice: Subject to any disclaimer, the term of this patent is extended or adjusted under 35 U.S.C. 154(b) by 0 days.

(21) Appl. No.: 09/449,713

(22) Filed: Nov. 24, 1999

Related U.S. Application Data

(62) Division of application No. 09/339,774, filed on Jun. 24, 1999, now Pat. No. 6,018,219, which is a division of application No. 09/095,876, filed on Jun. 10, 1998, now Pat. No. 5,959,413, which is a division of application No. 08/669,250, filed on Jun. 21, 1996, now Pat. No. 5,825,777, which is a division of application No. 08/435,282, filed on May 5, 1995, now Pat. No. 5,548,592, which is a continuation of application No. 08/043,790, filed on Apr. 6, 1993, now abandoned.

(51) Int. Cl.[7] .................................................. H04J 3/02
(52) U.S. Cl. ....................................... 370/458; 370/489
(58) Field of Search ................................. 370/319, 321, 370/324, 329, 330, 337, 336, 341, 346, 347, 350, 431, 451, 437, 458, 465, 489, 503; 379/410, 411, 408, 409, 43.17, 207, 219, 202, 225, 227, 230, 231, 235, 234, 247, 250, 93.04, 93.07, 93.14, 198, 215

(56) References Cited

U.S. PATENT DOCUMENTS

| | | | | |
|---|---|---|---|---|
| 5,425,052 A | * | 6/1995 | Webster et al. | 375/220 |
| 5,548,592 A | * | 8/1996 | Komarek et al. | 370/458 |
| 5,825,777 A | * | 10/1998 | Komarek et al. | 370/458 |
| 5,959,413 A | * | 9/1999 | Komarek et al. | 315/306 |
| 6,018,219 A | * | 1/2000 | Komarek et al. | 315/194 |

* cited by examiner

Primary Examiner—Dang Ton
(74) Attorney, Agent, or Firm—Daniel L. Dawes; Myers, Dawes & Andras LLP

(57) ABSTRACT

A circuit attenuates echo caused by line variations and a transformerless, high DC impedance, two-wire line interface. To reduce echo, a test tone is introduced on the communication line with all station units connected to the line. The resultant receive signal is conditioned through a peak detector, digitized and read by a processor. The resistive and capacitive characteristics of a network are iterated by the processor and the results remeasured. The network is set to the best combination for least echo by the processor. An interfacing system capacitively couples a plurality of sources to a two-wire communication pair by means of a plurality of differential voltage-to-current amplifiers. Each source uses a differential receiving amplifier to receive signals from the line and is resistively coupled in parallel to all the sourcing entities coupled to the communication line at that particular interface. There is an echo balance network associated with each source.

12 Claims, 32 Drawing Sheets

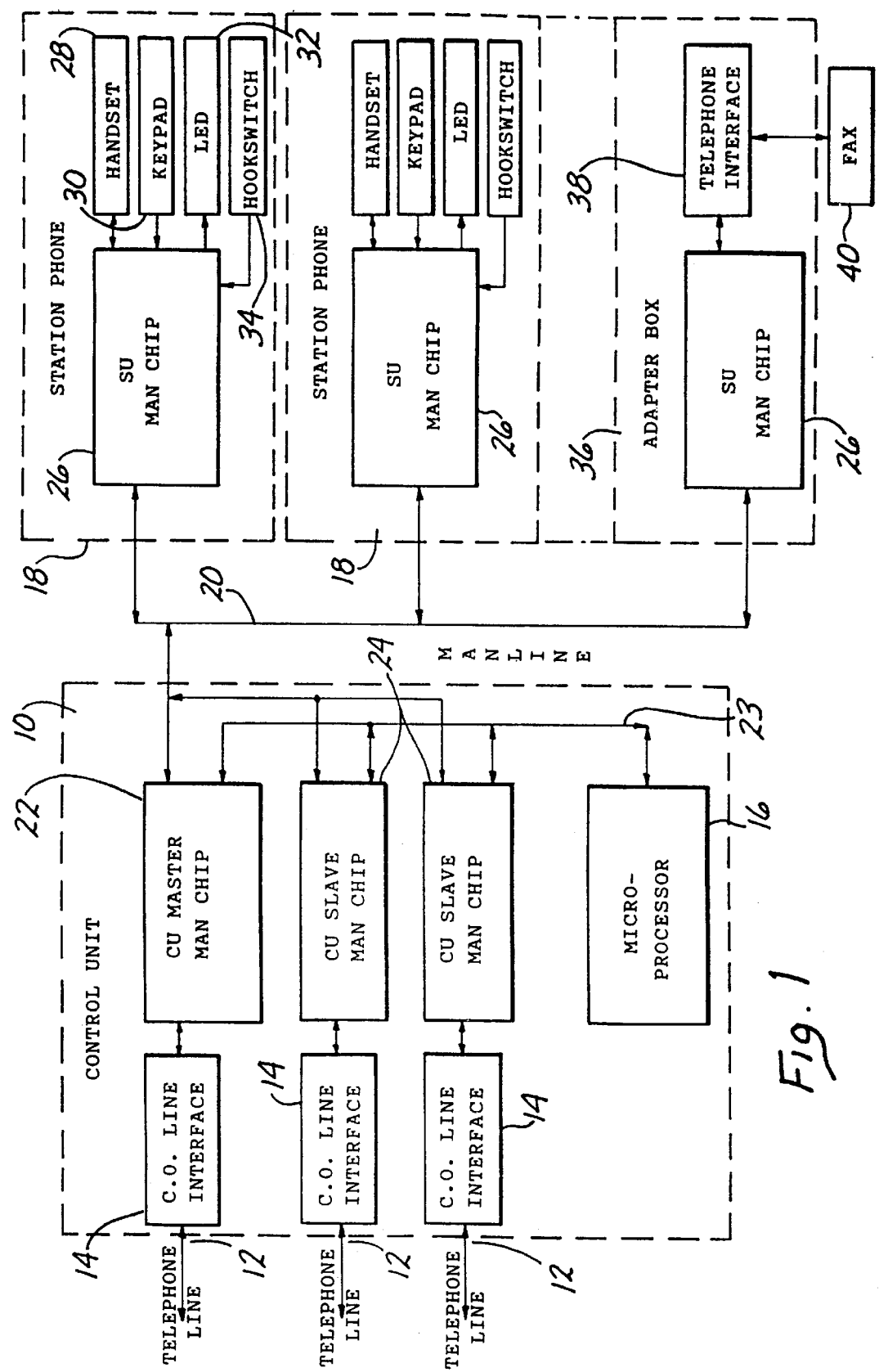

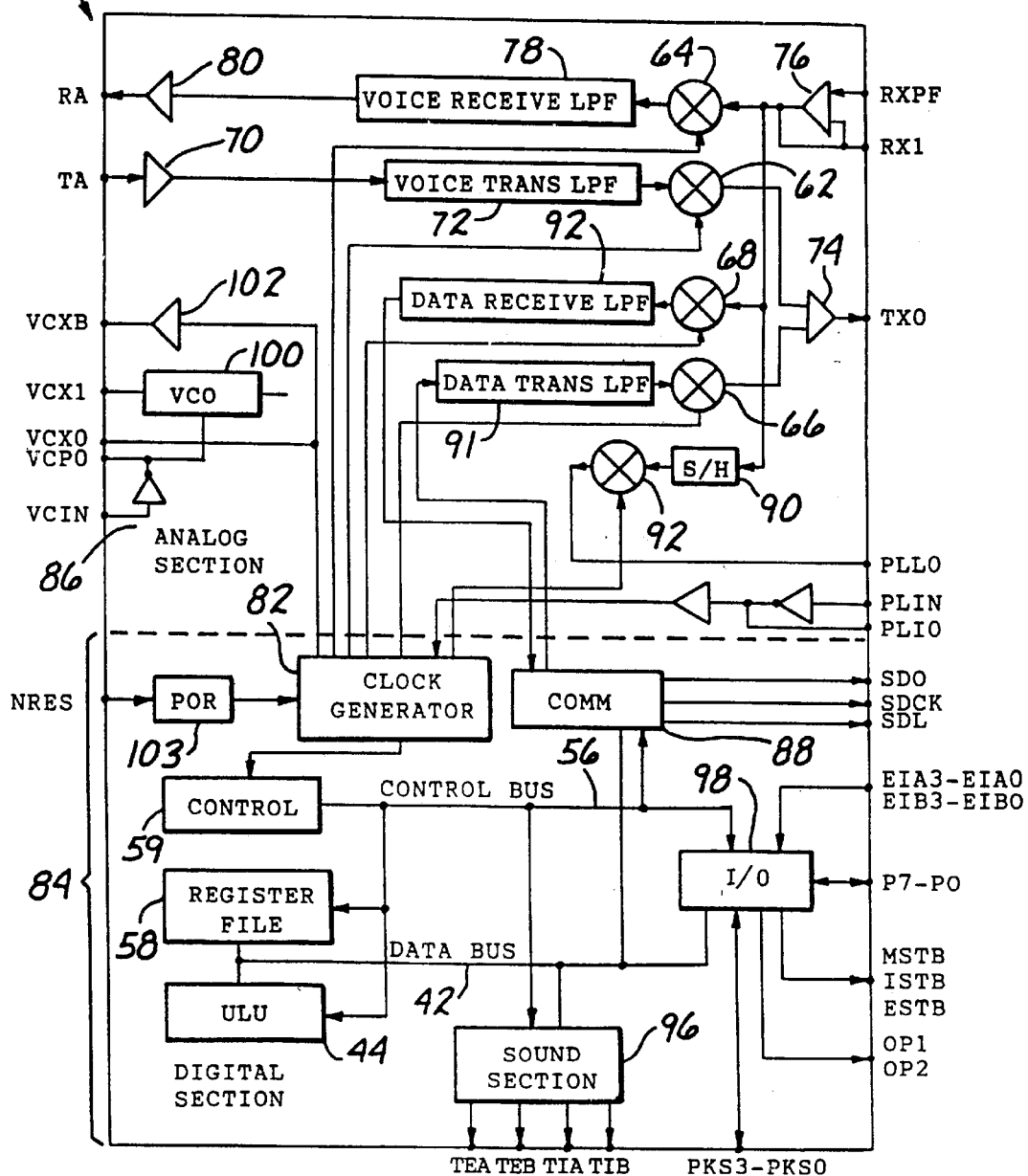

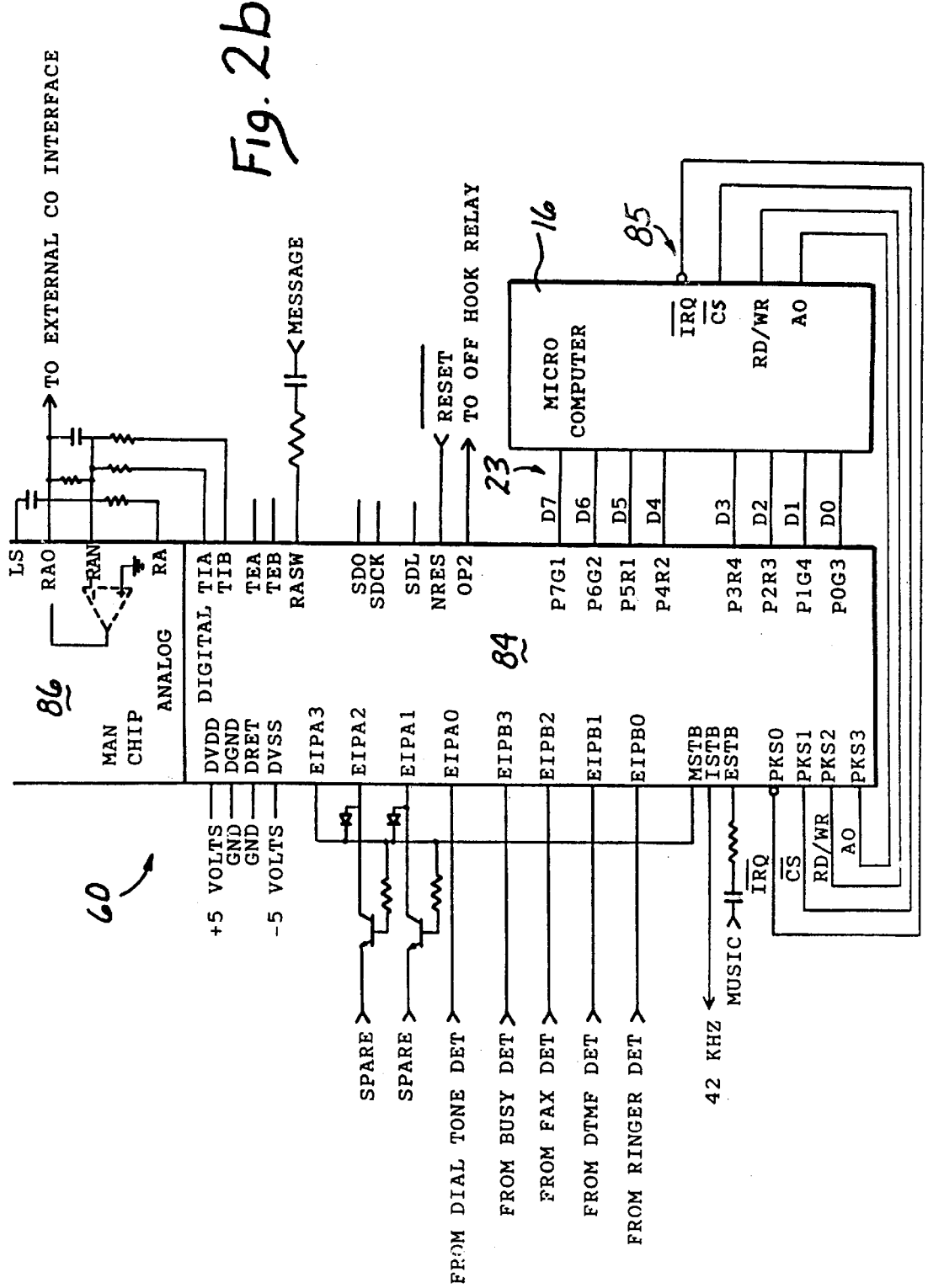

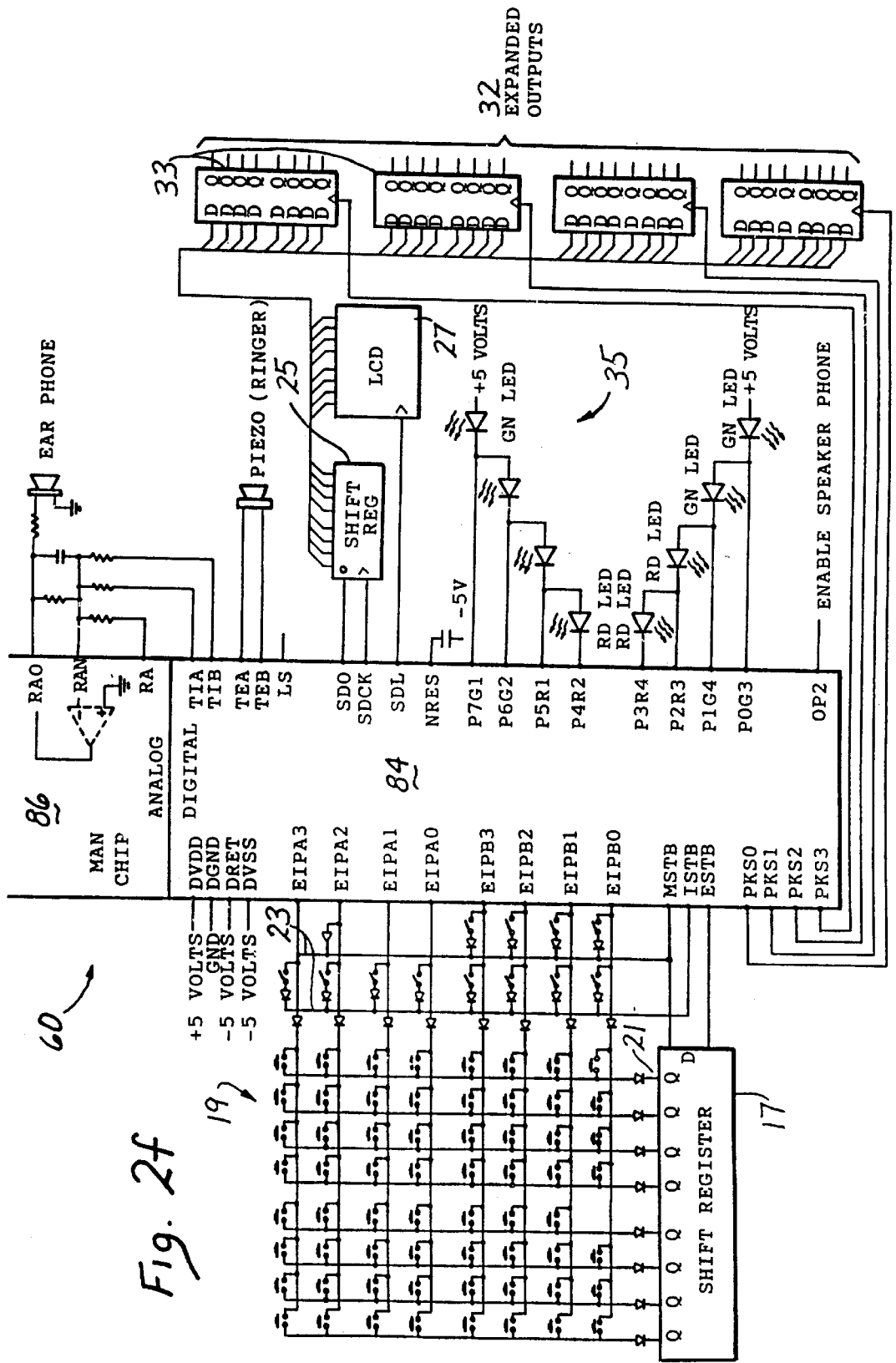

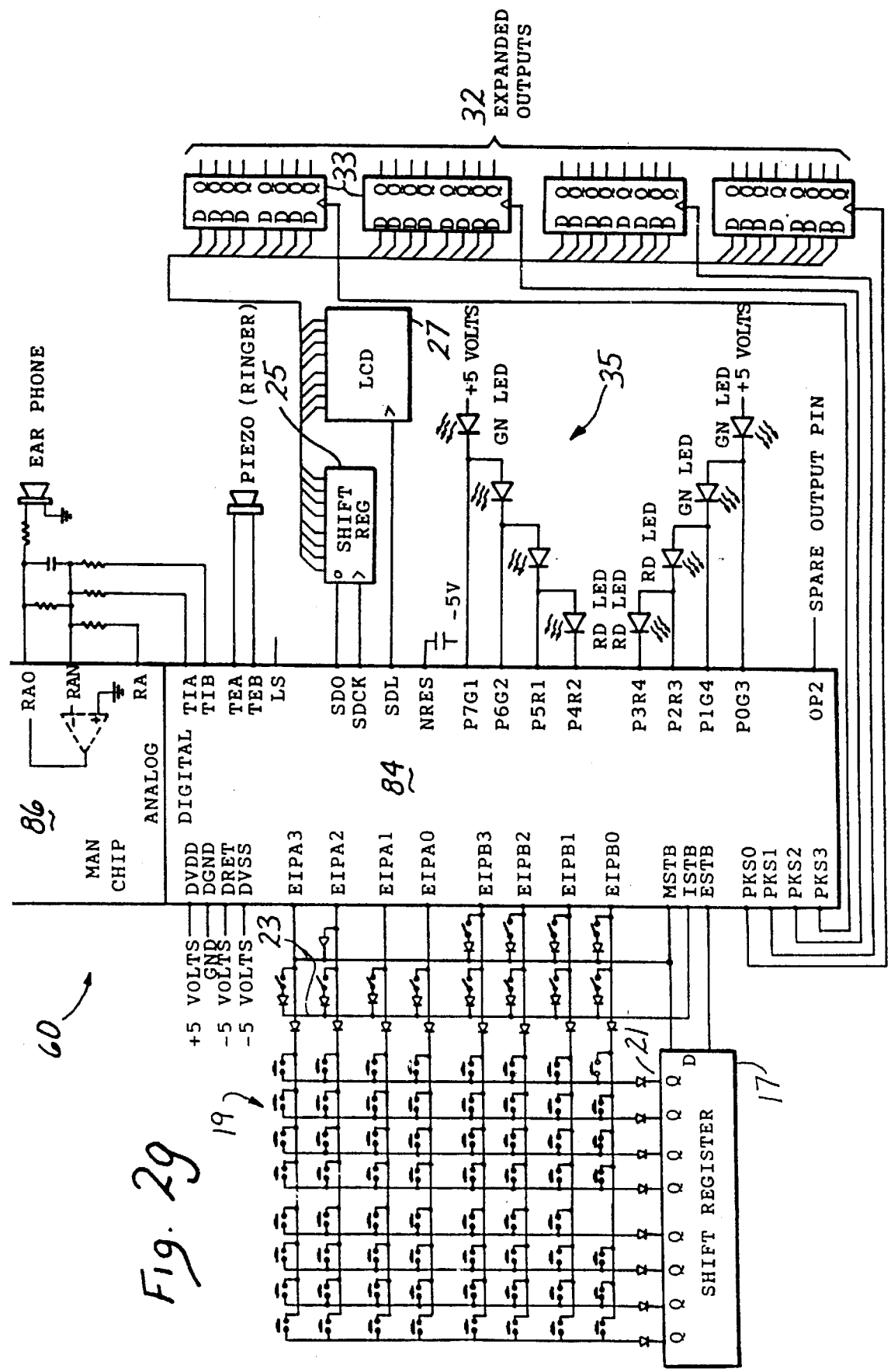

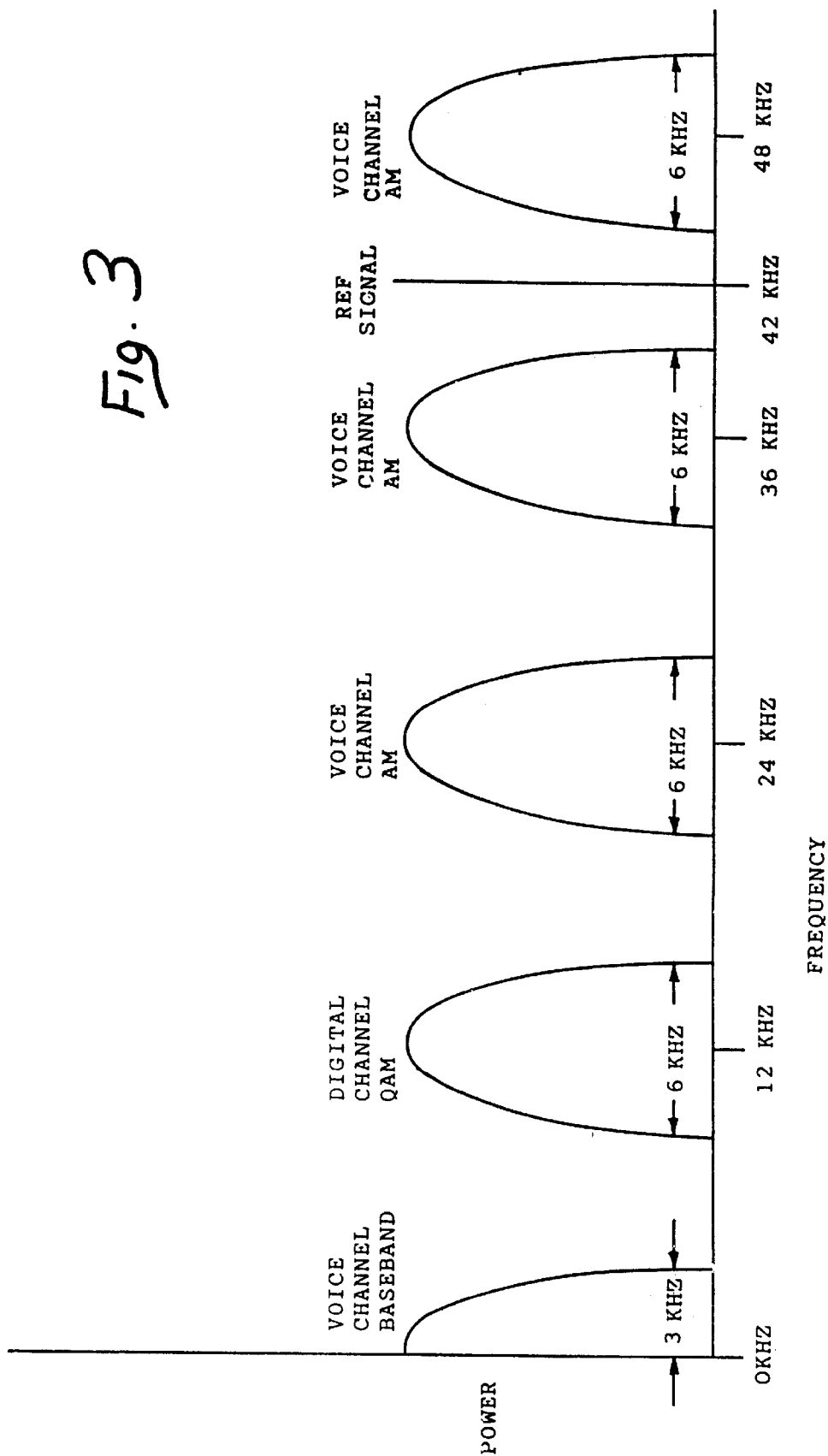

Fig. 13

CIRCUIT FOR ATTENUATION OF ECHOS CAUSED BY LINE VARIATIONS AND AN INTERFACING SYSTEM FOR CAPACITIVELY COUPLING A PLURALITY OF SOURCES TO A TWO-WIRE COMMUNICATION LINE

The present application is a divisional of earlier U.S. application Ser. No. 09/339,774, filed Jun. 24, 1999, now U.S. Pat. No. 6,018,219, which is a divisional of earlier U.S. patent application Ser. No. 09/095,876, filed Jun. 10, 1998, now U.S. Pat. No. 5,959,413, which is a divisional of earlier U.S. patent application Ser. No. 08/669,250, filed Jun. 21, 1996, now U.S. Pat. No. 5,825,777, which was a divisional of earlier U.S. patent application Ser. No. 08/435,282, filed May 5, 1995, now U.S. Pat. No. 5,548,592, which in turn was a continuation of U.S. patent application Ser. No. 08/043,790, filed Apr. 6, 1993, now abandoned.

BACKGROUND OF THE INVENTION

1. Field of the Invention

The invention relates to the field of telephone systems and in particular to telephone systems in which multiple stations may be operated on a single shared telephone line.

2. Description of the Prior Art

The System

Home and small office telephone systems are typically purchased and operated by the telephone user. In addition, the telephone user or the owner of the building in which the telephone system is installed, is similarly responsible for the installation and maintenance of the internal telephone lines beginning at the telephone company line terminal at the entry point to the building. Very commonly, the internal telephone wiring which is available in a home or small office is a single line system. In other words, while there may be multiple telephone jacks, each of the jacks are coupled in parallel to a single telephone line within the structure. Therefore, only one telephone conversation at a time may be carried on the line and if two handsets are picked up, the power on the line is distributed between the two activated handsets with a consequent loss of audible volume. Additionally, the communication as well as the central office link must be generally held in common between the two participants.

A number of schemes have been attempted for expanding the communication capability of a single internal telephone line network, most of which involved various voice band multiplexing schemes. As the features and complexity of the telephone network increases, greater demand is placed upon the multiplexing system. The complexity of the multiplexing scheme can become prohibitive when the system must be full featured. For example, when the system must provide an automated operator to provide voice message answering of incoming calls, special handling of fax, phone, modem and answering machines at the telephone stations, extension dialing, a host of separate business phone features and fax features, and accommodate a large number of phone stations all incorporated in an economical package which easily lends itself to expansion and modification, the prior art has failed to provide practical solutions. The difficulty arises from many reasons including the following: (1) The expense and labor involved in wiring or rewiring the facility if a star wire system is used (a separate wire to each phone); and (2) the complexity and technical difficulty in implementing a digital or frequency band (AM, FM, etc.) form of sharing a single common line. Finally, the high communication and computer overhead time which is required in a multiplexing system to handle multiple features and stations with complete flexibility and adaptability. The amount of digital communication which must be carried on often becomes prohibitive and the system fails during peak periods or unusual demand scenarios.

Many multiple wire (star wire) as well as some two-wire small phone systems utilizing a master controller and multiple station controllers are known in the art. The multitude of star wire systems suffer from both the inherent wiring complexity as well as the following problem. One typical two wire system is the Model 8002 MCD base key telephone system unsuccessfully offered by Rockwell. In such systems, a sophisticated processor is not only required in the master controller, but also at each station which adds to the cost and complexity of the system. An architecture which is built upon multiprocessing makes changes in the system difficult since modifications must be made in both the controller program and in the station programs. Communication between these multiprocessors is complex and when the number of stations increases, overall communication can become very slow during busy periods. Only a few features can be changed remotely since again most of the features require changes in both station and controller programs.

In the Rockwell system, a mix of voice channels, digital channels and a reference signal on a twisted pair telephone line, using double side band suppressed carrier with amplitude modulated signals was employed. However, the Rockwell system did not define the structure of digital data communication, nor did it remove the requirement for a separate control processor in every station. Therefore, although it did allow multiple signals on a single twisted pair telephone line, it did not provide any simplification to the complexities of multiprocessing nor solve the inflexibilities inherent in multiprocessing architectures. Additionally, this product suffered from severe noise, phase lock, and synchronization problems which eventually doomed it to failure.

Therefore, what is needed is a single twisted pair, multi-channel telephone system which can be economically and easily adapted to a home or small business and which has the power and flexibility to perform the functions discussed above without undue complexity, expense or susceptibility to failure under heavy demand or unusual use scenarios. Additionally, it needs to solve the critical noise and synchronization problems inherent in such a system without resort to a full digital (and very expensive) solution.

Simplified Processor

Conventional general purpose processors typically operate on a program stored in a read only memory by means of an instruction counter in order to read the stored instructions in sequence or according to a sequence with programmed jumps. This architecture is relatively complex, requires large numbers of transistors to implement and will therefore use a large area of a chip when integrating this function, and is time consuming of real time communication cycle time. The disadvantages of such a processor are particularly burdensome in an application where general programmability is not required.

What is needed is an architecture and method of operation for a processor which is more usable for applications that require only a limited number of operations and that avoids the overhead and timing disadvantages of a general purpose processor.

Communication Signaling Scheme

In a typical prior art small telephone system, a separate pair of wires is coupled from a control unit or master phone to each remote station or telephone handset. This type of system is commonly referred to as a "star wire" system. The control unit determines where the message is coming from and where it will be going according to which pair of wires is selected. This system has the disadvantage that there is a need to provide a separate wire pair for each remote station connected to the control unit and thus eliminates the use of standard house telephone wiring since conventional home wiring typically connects to all the extensions or telephone stations in parallel on a single pair of wires.

The prior art has also devised a scheme in which a single pair of wires is shared between multiple remote stations connected to a control unit. The control unit or master phone manages the telephone network by using a message based protocol. Whenever a phone call or message is to be sent, the transmitting unit, regardless of whether it is a remote station or control unit, will initiate a message in the network by sending an initial data protocol which will define the transmitter and recipient of the message. This type of message based protocol is subject to slow downs or lock up as the number of remote units and systems activity increases.

What is needed is a communication protocol for a small telephone system which is not subject to the limitations of the prior art. In particular, the protocol should eliminate the need in the system to establish a handshake protocol every time a message is sent in either direction to avoid slow downs during active communication periods between a plurality of units. Such a protocol should also allow serial digital data to be transmitted over the same line in burst format without affecting signaling speed so that components such as a display can be serviced quickly without affecting signaling response time. Additionally, a good error correction scheme must be implemented without affecting signal response time. Serial data should be quickly transferred for display or use in other serial communication network applications regardless of the direction of transfer.

Voltage Controlled Crystal Oscillator

Voltage controlled crystal oscillators in the prior art generally do not use MOSFETs to modulate the output impedance of the amplifier stages in the oscillator to shift the phase of the output in order to change the frequency of the crystal controlled oscillator. In addition, prior art voltage control oscillators are generally not designed to be easily integrated in large communication circuits.

What is needed is a crystal controlled voltage oscillator using phase shift techniques in which the frequency of oscillation can be adjusted within a tight and stable range and which has a topology suited to integrated circuitry and that utilizes a small chip area.

Light Emitting Diode Driver Circuit

The standard method for driving multiple light emitting diodes (LEDs) is to drive them in parallel through a series resistance and switched by appropriate logic signals. The current through any light emitting diode is determined by the value of its corresponding series resistor when the logic switch is closed which is also in series with the diode. When all the light emitting diodes are on, the current is additive and may be substantial depending upon the number of LEDs.

Therefore, what is needed is a circuit in which the total current used to drive a bank of light emitting diodes can be held constant and limited for lower power applications. Further, if the mechanism using the diodes is line powered on a line also used for communication the amount of noise which switching of the current through the light emitting diodes places upon that communication line should be avoided as much as possible as it could interfere with that communication. In addition, the current supplied to each LED must be maintained as constant as possible in order to maintain consistent LED brightness within a multiple bank of LEDs regardless of how may of the LEDs may be lit. These attributes are difficult to maintain with parallel LED switching.

Automatic Timing Compensation for a Communication Line

Telephone systems which use an internal telephone cable and which carry voice and/or data modulated signals at high frequencies are characterized by line delays between signals transmitted between the control unit and the station unit and between two station units. In order to compensate for these inherent line delays, the prior art has devised circuits for advancing the transmission signal or delaying the received signal a fixed average amount given the line length specification variations if the line delay is above a predetermined minimum and otherwise accepting smaller line delay inaccuracies.

Another method used in the prior art is to manually adjust the compensation components tied to the line at the time of installation in order to attempt to cancel out line delay variations.

What is needed is some type of circuit which provides for automatic adjustment to the transmission signal to avoid line delays, a circuit which can be implemented at low cost and which adjusts for potential load changes such as may occur when a new station is plugged in.

A Low Cost Adaptive Echo Balance Methodology

Whenever there are four-to-two wire conversions in a telephone system, there is an echo back of the transmitted signal which must be given consideration in the design of the system. In such applications where echo in not critical, the provision of a fixed component balance network is usually a satisfactory solution. In other applications where echo cancellation is more critical, normally a signal processor particularly adapted to cancel the echo is employed.

What is needed is some type of apparatus and methodology wherein echo cancellation can be achieved in applications where a fixed network would not provide a satisfactory solution, but which does not require the more expensive compensation based upon a digital signal processor for echo cancellation.

A Two-Wire Twisted Pair, Multiple Signal, Capacitor Coupled, Communication Line Interface A typical prior art means for interfacing multiple signals onto an internal (inside the house or office) twisted pair communication line is comprised of a transformer across the primary of which the internal communication line is connected and across the secondary of which a transmit buffer and receive buffer are provided for bidirectional communication with internal circuitry. The internal communication line could be a telephone cable within a home or office and the internal circuitry to which it would be coupled would be a key telephone circuit or handset. A plurality of such transmit and receive circuits could be coupled in parallel across the secondary of the transformer to couple multiple sources at the same location to the internal communication line through a single interface. Each source to be coupled to the internal communication line at different locations of course requires a separate transformer and in a typical system, a multiplicity of transformers are used corresponding to the number of remote sources.

The large number of transformers necessary for a useful system creates a large accumulation of magnetizing inductance, leakage inductance, core saturation and resonance which degrades the communication transmission for relatively wide bandwidth signals and thereby severely limits the number of interfaces that can be reliably coupled to the internal communication line.

Therefore, what is needed is a circuit and method to provide interfacing for a two-wire twisted pair that will support: (1) multiple signals being communicated on the line at the same time through the same interface such as a reference frequency, digital signaling data, and/or voice modulation at different frequencies; (2) signals being communicated through several interfaces simultaneously from different locations on the line; (3) large variation in line load and other system loads without significant signal degradation; (4) the supplying DC power over the same lines; (5) a common low impedance line load; and (6) echo cancellation to eliminate false data from being transferred.

Telephone Line Interface

A typical telephone line interface uses a transformer to couple to the central office lines and two buffer amplifiers coupled to the secondary of the transformer to provide a signal OUT and signal IN to the equipment being interfaced whether a common telephone or a sophisticated PBX system. An example of such a prior art line interface unit is shown in FIG. 21 and includes transformer 338 with a secondary 340 and primary 342. Amplifier 344 is used to generate the signal OUT and is coupled to secondary 340 while amplifier 346 drives the secondary from the signal IN. Summing resistors 348 associated with the transmit amplifier 344 sums the input signal and the output signal to thereby provide basic echo cancellation. Output drive amplifier 346 and its associated summing resistors 350 and output resistor 352 drive the appropriate output signal through the transformer 338 onto the telephone lines coupled to primary 342.

The implementation of FIG. 21 suffers from an erroneous echo signal due to reactive parameters associated with the greatly varying telephone line characteristics and transformer 338.

A Piezo Driver Using Voltage Doubling and CMOS Techniques

A typical prior art piezo circuit uses switched positive and/or negative supply voltages which are available within the system, or alternatively some type of power supply which is coupled to the piezo driver to provide a higher voltage which is switched in when needed. This is a relatively expensive and space consuming solution to the problem of providing a higher voltage to a piezo ringer than is normally available in a telephone circuit.

Therefore, what is needed is some means for applying a higher voltage to the piezo element without the need of providing an additional higher voltage power supply so that sound volume improvement can be provided in a manner compatible with integrated circuit technology at low cost.

Voltage Limiter

Prior art voltage limiters for amplifiers typically use cascaded diodes coupled in parallel across the input and output of the amplifier in one or both directions to limit the voltage range of the amplifier. The linear range of such cascaded diodes is, however, limited.

Therefore, what is needed is some type of circuitry in which voltage limitation across an amplifier can be achieved over an extended linear dynamic range, closer to the voltage limit points.

Line Powering for Two-Wire Twisted Pair, Multiple Signal, Capacitor Coupled Communication Line Interface When remote electronic devices are powered by the communication line, consideration must be given to the noise generated by providing power on the same wires as the communication signals. In a typical house telephone line, this type of noise is typically not severe since all the operating devices share the same communication channel and the same parties to the communication. In that case, any noise is synchronous with a voice conversation in progress and is generally not harmful. In those cases where the line is shared between devices having signals which are incompatible, such as in a telephone and modem communication, the user generally does not use the incompatible devices at the same time and thereby avoids the conflict. However, in the case of simultaneous, unrelated communication of multiple devices sharing the same wire, line powering becomes very complicated and the solutions are costly if low noise is required.

In a two-wire line, one wire is provided at a positive voltage and the other at negative voltage to provide a constant current flow to the remote stations. In order to energize such a system, the voltage must first be placed across the two wires of the line by a line power source. Then the remote stations must have means for pulling power from the line at a constant predictable rate in order to minimize the possibility of generating noise on the line which might interfere with the communication.

Digital and analog circuits typically utilize a constant voltage and have variable current demands. In addition, many such circuits require several different voltages to be supplied each with different current demands at different times. It is further desirable to minimize the different types of voltage supplies needed and to provide a current balance between the positive and negative rails as much as possible in order to avoid drift of the voltage supplies relative to the voltages of the supplying two-wire lines.

Therefore, what is needed is some sort of apparatus and methodology for line powering whereby multiple devices can employ a common line with multiple channels having unrelated signals, which devices communicate with different parties without the generation of noise through the line powering which interferes with any of the communication.

BRIEF SUMMARY OF THE INVENTION

The System and the Chip

The invention is a telephone communication system for communication between a plurality of exterior telephone lines and a single common in house two-wire line. The system comprises a control unit for coupling to the plurality of exterior telephone lines and for controlling communication between the plurality of exterior telephone lines and the common two-wire line. A plurality of station units are coupled remotely throughout the building to the common two-wire line. Each of the station units selectively communicates on one of a plurality of voice bands or channels with any one of the exterior telephone lines or with another station under the control of the control unit. Each of the station units communicates digital control and data information with the control unit on a separate AM modulated frequency band or channel on the common two wire line. The control unit communicates on this digital channel with the plurality of station units in a time frame subdivided into a plurality of tine slots. A specified portion of each time slot is reserved for control communication between the control unit and each one of the plurality of station units. All control communication between each one of the station units and control unit occur within the selected portion of the time slot within each time frame. As a result, control communication on the single common two-wire line is effected without requiring complex control hardware within the control unit or station units. Communication between the station units and the control unit is on at least one AM digital channel.

The control unit generates a reference frequency to which the plurality of station units are synchronized. The plurality of station units and the control unit are synchronized with each other through phase lock synchronization to the reference frequency using crystal controlled VCO.

The system further comprises a plurality of modulating interfaces in the control unit. Each modulating interface, contained in part of a MAN chip, services a separate one of the exterior telephone lines. One of the plurality of modulating interfaces serves as a master and the remaining ones are slaved to the master.

The plurality of modulating interfaces (MAN chips) in the control unit and in the station units are identical, but operated in different modes according to their respective operational position within the system so that a system based on a single integrated circuit is provided.

The control unit also contains the central microprocessor which is programmable and all communication features between the control unit and the plurality of stations and their relationship with the exterior telephone lines are stored within this control unit processor so that the entire system may be modified by modifying the programs stored in the control unit. Because of this, the system may be more easily changed and may even be remotely modified through the exterior telephone company lines coupled to the control unit.

The control unit communicates with the plurality of station units through a digital data channel. The digital data channel has two digital signals simultaneously communicated in phase quadrature through phase shifted keying.

The digital data channel is full duplex and serial digital data is communicated through a portion of the time frame. The remaining portion of the time frame is used for communication of control information between the control unit and the plurality of station units.

The control unit and plurality of station units by means of their MAN chips encode, generate and communicate control and status information onto the common two wire line over the digital data channel.

The plurality of voice channels are simultaneously (with the above reference signal and digital data channel) communicated onto the common two wire line and the control unit comprises a circuit for programmably vectoring a selection of the voice channels in order to selectively network the plurality of voice channels among the station units coupled to the single common two wire line.

The control unit and plurality of station units by virtue of the MAN chip contained within each further comprise a controllable input/output port programmably capable of logic switching and sensing, keyboard and display control, as well as tone and pulse generation.

The control unit and plurality of station units by virtue of the MAN chip contained within each comprise circuitry for interfacing with a general purpose microprocessor for bidirectional exchange of data, control, and status information with the microprocessor.

The control unit also contains circuitry to detect various tones and pulses as well as generate voice messages in order to provide for a full featured business telephone system capability, although these features are not unique of themselves.

A Simplified Bus Oriented Processor Using a Fixed Time Slot Protocol

The invention also includes a bus oriented processor comprising a data bus having fixed time slot access with respect to devices on the bus that are peripheral to the processor. Each peripheral device is accessed through fixed and unique portions of timing frames on the data bus. A universal logic unit is coupled to the data bus. The universal logic unit performs a predetermined assortment of operations on data read from or written to the data bus during fixed time slots within the timing frame.

The processor further comprises a plurality of registers coupled to the data bus. Each of the registers is read from or written into during selected and fixed time slots within the timing frame. A corresponding plurality of combination and logic circuits are provided. Each combination and logic circuit is coupled to one of the registers and to the universal logic unit for receiving a compare/carry control signal, CMPCRY, indicative of whether or not a compare or carry occurred or not during a corresponding operation within the universal logic unit.

The processor further comprises a plurality of bit memory circuits for storing bit flag and other machine state flags, and a corresponding plurality of combination and logic circuits. The corresponding combination and logic circuits are coupled to the timing and control bus. A logical combination is detected by the corresponding combination and logic circuit from the timing and control bus and the CMPRY, and the bit flag is stored within the bit memory circuit for generating a conditional logic signal.

The universal logic unit performs only two basic types of instructions. The first type are compare instructions and the second type of instructions are incrementation/decrementation instructions.

Each time slot is comprised of dedicated cycles. Each cycle and portion of cycle within each time slot is dedicated to bus precharge, selective data transfer from the bus or selective data transfer to the bus in a fixed sequential order so that bus voltage levels can be maintained and contention can be avoided.

The invention is also a method of operating a processor to which an instruction is communicated. The method comprises the function of repetitively performing a sequence of timed steps. The steps include the following: precharging the data bus; selectively reading a first data signal from the data bus during a first dedicated time cycle depending upon the instruction; precharging the data bus; selectively reading a second data signal on the data bus during a second dedicated time cycle according to the instruction; selectively performing one of a predetermined number of operations on the first and/or second data signal during the second and beginning of the third dedicated time cycle according to the instruction; selectively writing the result of the operation during the third dedicated time cycle according to the instruction; and selectively generating a logic signal, CMPCRY, during the third dedicated time cycle according to the instruction and according to the results of the step, performing a control action such as the step of writing the data into a register.

The step of performing the instruction consists of one of the steps of:

comparing the first and second data signals and selectively incrementing the first data signal;

comparing the first and second data signals and selectively decrementing the first data signal;

incrementing the first data signal; and decrementing the first data signal.

Communication Signaling Scheme

The invention is an improvement in a method for communicating over a single two-wire cable with a plurality of stations comprising the step of bidirectionally communicating with the plurality of stations in a sequence of time frames. Each of the time frames is divided into a plurality of time slots corresponding to the plurality of stations. Each one of the time slots is dedicated for communication to a specified one of the plurality of stations. The step of bidirectionally communicating comprises communicating serial digital data (that is stream format communication data) in at least one portion of the time slot and communicating signaling data (that is control information) in at least another portion of the time slot. Each of the time frames having a frame sync included therein to which the station units synchronize communication on the two-wire cable. As a result, efficient data signaling with the station units is performed without substantial dependence on system activity.

The improvement further comprises the step of communicating a reference signal to the station units from the control unit as a single timing signal against which the time frames of each of the station units are synchronized by circuitry which senses the frame sync.

The improvement further comprises the step of performing for each station unit within its corresponding dedicated time slots in consecutive frames an echo back communication protocol as determined by detected communication errors and selectively correcting the communication errors in signaling data.

The signaling data is correlated in the bidirectional communication with a specified register within the station unit receiving the communication so that the bidirectional communication is easily implemented in hardware.

Each time slot is comprised of three byte cycles. Two of the cycles are dedicated to serial data and the third of the cycles is dedicated to signaling data.

Each of the time slots is divided into a sequence of dedicated byte cycles. Each of the cycles is dedicated to distinguishable groups of signaling data and serial digital data relating to communication of the control unit with the station unit. The signaling data is directed to or from separate and specific registers within the station unit.

Voltage Controlled Crystal Oscillator

The invention is an integrated circuit, crystal controlled voltage controlled oscillator comprising a plurality of phase shifting amplifiers in combination with a crystal controlled feedback loop coupled across the plurality of phase shifting amplifiers. The phase shifting amplifiers are voltage controlled. A bias tracking circuit maintains a constant bias voltage within the plurality of phase shifting amplifiers regardless of any control voltage applied to the phase shifting amplifiers. As a result, control of output frequency of the voltage control oscillator is maintained over an extended range without saturation of the phase shift amplifiers.

Each phase shifting amplifier is comprised of a CMOS inverter having an output node, a capacitor coupled to the output node and a voltage controlled output impedance modulating circuit for modulating the impedance of the output node and phase shift at the output node. The capacitor is a pair of CMOS shunt transistors coupled to the output node.

More specifically the plurality of phase shifting amplifiers comprises three CMOS inverters. Each inverter has an output node. The CMOS inverters are coupled serially with each other to form a cascaded chain of a first, second and third inverter. Two pairs of CMOS shunt transistors comprise a capacitor. One pair of the CMOS shunt transistors is coupled to each the corresponding output nodes of the first and second inverters. Two CMOS voltage controlled modulating circuits coupled to the output nodes of the first and second inverters to modulate the dynamic impedance of the output nodes of the first and second inverters to control the phase shift of the voltage at the output of the third inverter. The output of the third inverter is coupled to the crystal controlled feedback loop so that the resonant frequency of the crystal controlled feedback loop is in turn controlled by the phase shift at the output node of the third inverter. The voltage controlled oscillator has a fundamental frequency determined by a voltage signal applied to the CMOS impedance modulating circuit.

The voltage controlled oscillator is fabricated in a CMOS integrated circuit so that the first and second inverters and the two corresponding CMOS impedance modulating circuits have operational characteristics dependent upon integrated circuit process parameters and wherein the two corresponding CMOS shunt transistors are coupled to the corresponding first and second output nodes to produce excess phase lag to cancel at least in part the effect of the integrated process parameters upon the operating characteristics.

The bias tracking circuit comprises a matched dummy circuit matching in operational characteristics the two CMOS output impedance modulating circuits. The dummy circuit has a dummy node. A control circuit is coupled to the control voltage applied to the voltage controlled oscillator. The control circuit drives the dummy circuit to maintain the dummy node free of displacement current as the control voltage changes. The control circuit is coupled to the CMOS voltage controlled modulating circuit to essentially maintain the output nodes of the first and second inverters free of displacement currents as the voltage control signal changes, so that self-bias of the phase shifting amplifiers is substantially independent of the control voltage.

The three inverters are matched and the control circuit comprises two dummy inverters, each matching the three matched inverters. An operational amplifier is included. Each of the matched dummy inverters within the control circuit is coupled to one of two inputs of the operational amplifier. The dummy output node is fed back to one of the inputs of the operational amplifier to maintain the dummy node at a net zero displacement current by driving the dummy circuit with the output of the operational amplifier to maintain the node at a net zero displacement current while the control voltage is applied to the dummy circuit. The output of the operational amplifier is are coupled to each of the CMOS voltage controlled modulating circuits to similarly drive each of the CMOS voltage controlled modulating circuits to maintain the corresponding first and second output nodes at a net zero displacement current.

The invention is still further characterized as a method for operating a voltage crystal controlled oscillator in a CMOS integrated circuit comprising the steps of receiving an input signal at an input node; and phase shifting the input signal to generate a phase shifted output at an output node by circuit of voltage controlled phase shifting circuits. The phase shifted output signal from the output node is fed back to a crystal controlled resonant circuit. The output of the crystal controlled resonant circuit is fed back to the input node. Each of the prior steps is repeated to create a regenerative oscillator. The fundamental frequency of the oscillator is determined by the crystal controlled feedback circuit. The phase shift introduced at the step of phase shifting with a voltage control signal is modified to change the fundamental frequency of oscillation. The DC bias of the phase shifting circuits used in the step of phase shifting is maintained constant as the voltage control signal changes to extend the range of voltage control adjustment of the fundamental frequency of the oscillator without saturating the inverting amplifiers.

The step of maintaining self-bias comprises the steps of applying the voltage control signal to a dummy circuit matching the phase shifting circuit; generating a gate control signal which when applied to the dummy circuit maintains self-bias of the dummy circuit independent of the voltage control signal; and applying the gate control signal to the voltage controlled phase shifting circuits within the voltage control oscillator.

The method further comprises the step of increasing the voltage range output from the phase shifting circuits by applying CMOS shunt capacitive transistors to the output constructed of the gates of CMOS FET transistors similar to the inverting amplifier FETs themselves.

The method further comprises the step of increasing the degree of phase shift during the step of phase shifting in the voltage controlled oscillator by providing two cascaded phase shifting voltage controlled circuits driven in parallel by the voltage control signal and coupled in series to provide an excess phase shifting lag within the voltage controlled oscillator of approximately 90 degrees.

Light Emitting Diode Driver Circuit

The invention is a circuit for driving a plurality of light emitting diodes comprising a series circuit of the plurality of light emitting diodes. A plurality of switches is provided in series circuit. Each one of the switches is coupled in parallel across a corresponding one of the plurality of light emitting diodes so that the series circuit of light emitting diodes and series circuit of switches together collectively comprise a ladder network. A constant current source is coupled in series with the ladder network. As a result, the plurality of light emitting diodes are efficiently driven with a substantially constant light emission intensity with a reduced maximum energy.

The circuit further comprises a plurality of the series circuits of light emitting diodes and corresponding plurality of the series circuits of switches to form a corresponding plurality of ladder networks. Each of the ladder networks are coupled in parallel. The circuit further comprises a gate control circuit coupled to each of the ladder networks for selectively coupling one of the corresponding parallel ladder networks to the constant current source. The gate control circuit selectively switches in sequence each of the ladder networks with overlapping timing so that at no time during the sequence is the constant current source every completely disconnected from at least one of the plurality of ladder networks. The result is that the circuit can be operated at a predetermined duty cycle for time multiplexing purposes.

The invention is also a method of driving a plurality of light emitting diodes using the approach of providing a current to the plurality of light emitting diodes in series circuit. The current is shunted through a switched shunt around any selected diode that is determined to be in a temporarily off, nonemitting condition. The current flowing through the series circuit of light emitting diodes and shunts is maintained constant. As a result, a plurality of light emitting diodes are driven at low power consumption as many diodes share the same current and low noise as the current remains constant regardless of the on or off state of the diodes.

The approach of providing a current and shunting the current around selected ones of the light emitting diodes further comprises the step of providing a current through at least one of a plurality of series circuits of light emitting diodes and controlling the current through each one of the plurality of series circuits of light emitting diodes and corresponding shunts to selectively stop and start the current while simultaneously maintaining current through at least one of the series circuits of LEDs at all times. As a result, the series circuits of LEDs may be driven at different duty cycles for multiplexing purposes without current spikes (and so noise) being created.

Automatic Timing Compensation for a Communication Line

The invention is a method for compensating for line delay variations in a telephone communication system having a single shared communication line comprising the steps of initializing communication on the single line between a control unit and at least one of a plurality of station units coupled by circuit of the line. This compensation is effectively performed by maintaining two separate time bases (transmit and receive) in each communicating device and advancing transmit timing with respect to receive timing (delay receive timing with respect to transmit time). The communication is initialized to a predetermined delay value for transmit advance timing over the receive timing when the system is turned on or powered up. The control unit then performs tests on the system and the predetermined initial value for the line delay is automatically adjusted according to actual line delays sensed on the single communication line. As a result, changes in line delay within the telephone system are automatically accommodated.

The step of automatically adjusting the line delay further comprises the step of automatically measuring capacitance effect and thereby determining approximate capacitance of the single communication line and computing a new transmit advance time to more nearly compensate for line delay with the station units that are connected. There are several types of tests that the control unit can perform in order to determine line capacitance and optimum advance timing. The present design injects a tone signal into one of its transmit channels and test various transmit positions and various settings of its adjustable transmit signal feedback cancellation circuitry, and monitors relative signal level on its receive signal channel. Feedback settings at specific peak and null reading positions are then applied to a lookup table to determine optimum setting of the transmit advance timing.

The step of automatically adjusting the predetermined transmit advance can be performed for each of the plurality of station units coupled to the control unit through the single communication line. A separate automatic adjustment can be made for each station unit, or a single system wide adjustment can be made.

The transmit advance timing can be set by using a static optimal adjustment by independently and optimally adjusting or setting the timing value in each individual communicating device (station unit or control unit) to set a fixed value depending upon its physical position on the wire and its computed best compromise timing relation with all other communicating devices and in particular to the control unit.

The transmit advance can also be adjusted by using a dynamic setting depending upon the communication task at hand for each the station. This is performed by specifically adjusting two particular communicating devices to specific timing adjustments prior to the start of communication between the two for the sole purpose of optimizing that one communication. This might be done for specific troublesome situations or possibly system wide in order to extend the wire length possible for operation or for simply better performance. However, this would be an extremely complicated and time consuming computer task.

A Low Cost Adaptive Echo Balance Methodology

The invention is a circuit for reducing echo back signals on a communication line comprising a summing circuit coupled to the communication line for bidirectional communication of signals therewith. The summing circuit has a summing node. The summing node sums signals which are measures of the transmitted and received signals on the communication line. A balance network circuit couples a selected impedance to the summing node. A processor receives a signal from the summing node and generates a control signal to the balance network circuit to select an impedance to be coupled to the summing node to reduce the signal received from the summing node by the processor circuit. As a result, the echo of a transmitted signal placed on the communication line is substantially reduced.

The balance network circuit comprises a plurality of selectively switched impedance elements. The switched impedance elements are comprised of a plurality of switched capacitive elements and switched resistive elements.

The processor circuit comprises a peak detector circuit for generating a constant analog voltage corresponding to an amplified signal from the summing node. An analog-to-digital converter converts the constant analog voltage to a digital signal. An analog to pulse width circuit can be substituted for the analog to digital circuit to reduce cost. A digital processor receives the digital signal and generates control signals to be coupled to the balance network circuit for altering the impedance of the balance network circuit to minimize the echo back signal.

The circuit further comprises a test tone signal generation circuit for selectively coupling a predetermined test tone on the communication line and into the summing node to generate from the communication line the echo back signals coupled to the summing node.

The circuit further comprises a station unit coupled to the communication line. The control unit communicates with the station unit across the communication line. The station unit similarly is provided with a summing circuit and balance network circuit. The processor circuit corresponding to the control unit communicates control signals to the balance network circuit corresponding to the station unit to substantially reduce the echo back signals at the station unit as determined by optimal reduction of the echo back signals by the processor circuit and corresponding balance network circuit at the control unit.

A Two-Wire Twisted Pair, Multiple Signal, Capacitor Coupled, Communication Line Interface The invention is a system for coupling to a two-wire communication line to a plurality of sources comprising a plurality of voltage-to-current amplifiers. Each voltage-to-current amplifier is capacitively coupled to the communication line. The voltage-to-current amplifier bidirectionally communicates between the communication line and one of the plurality of sources. A circuit is included for providing high impedance between the plurality of voltage-to-current amplifiers and the communication line. As a result, the plurality of sources are coupled to the communication line without being characterized by the mutual inductance, leakage inductance, inherent resonance, nonlinearity of magnetic media, or the winding resistance characteristic of transformer coupling.

Each of the voltage-to-current amplifiers comprises two differential amplifiers. Each differential amplifier has an output capacitively coupled to one of the communication lines comprising the two-wire communication line. One of the two differential amplifiers is operated as a current source into ground and the other one of the differential amplifiers is operated as a current source from ground.

The system further comprises an RC coupled differential receiving amplifier having two inputs. Each of the inputs is coupled to one of the two wires of the communication line. The differential amplifier has an output characterized by substantial common mode rejection of signals received from the two-wire communication line.

The system further comprises a plurality of echo balance circuits for canceling echo back signals, wherein each the RC coupled differential amplifier has its output coupled to a corresponding one of the echo balance circuits. One of the echo balance circuits is provided for each of the voltage-to-current amplifiers so that echo back signals from each source are substantially reduced.

The system further comprises a balanced DC load powering circuit for allowing line powering over the communication line without lowering the AC impedance apparent to the line and without disturbing signal current information.

The system further comprises a balance load ground circuit for setting a ground reference voltage while maintaining high impedance of the communication line and to allow the plurality of voltage-to-current amplifiers to be coupled to the communication line without significantly lowering the impedance apparent to the communication line due to the interface.

Telephone Line Interface

The invention is a telephone line interface for coupling central office telephone lines with circuitry or systems such as telephones or PBX systems. The interface comprises a transformer having its input coupled to the central office telephone lines and having an output. A load resistor is coupled to the output of the transformer and provides the proper 600 ohm termination to the central office line. An output amplifier receives an audio signal from the circuitry being interfaced to the line. An inverting amplifier is coupled to the output amplifier for inverting the output of the output amplifier and coupling the inverted output to the load resistor. An input amplifier is coupled to the output of the transformer for generating an input signal to the plurality of sources. A balance network is coupled between the output of the output amplifier and the input of the input amplifier for summing the audio signal with the inverted audio signal output through the transformer. The summing is performed at the input of the input amplifier so that echo back signals are substantially reduced by cancellation.

The balancing network has an impedance that simulates the central office lines and equipment. The balance network simulates the output impedance of the transformer as presented to the input amplifier when the transformer is coupled to a telephone central office line and equipment. The balance network can be seen as a circuit for providing a source resistance equivalent to the telephone central office. The telephone line interface thus comprises a circuit for providing an equivalent impedance to a typical transmission telephone line. The telephone line interface therefore comprises a circuit for compensating for the magnetizing inductance of the transformer, for compensating for the load resistance, for compensating for winding resistance of the transformer as it effects low frequency gain of the input amplifier, and for compensating for low frequency cut off associated with magnetizing inductance of the transformer.

A Piezo Driver Using Voltage Doubling and CMOS Techniques

The invention is a circuit for driving a piezo element comprising a first CMOS driver and a second CMOS driver. Each CMOS driver generates a driving voltage in response to an input control voltage. The driving voltages from the two CMOS drivers are placed across the inputs to the piezo element. A circuit is provided for generating two distinct input control voltages opposite in phase. One of the control voltages is coupled to the input of the first CMOS driver and the other one of the control voltages is coupled to the input of the second CMOS driver. As a result, an effective increased voltage swing greater than the magnitude of the supply voltages is experienced across the first and second CMOS drivers and is applied across the piezo element.

Each of the drivers is a CMOS driver having an output equal to alternately the positive or negative supply voltages, Vp or Vn. Each of the CMOS drivers is comprised of a first stage CMOS input driver having an input coupled to the control voltage, and a second stage output CMOS driver. The second stage output CMOS driver has an input coupled to the output of the first stage input driver.

The invention is also a method for generating an improved audio output from a piezo element comprising the steps of providing an input signal having a frequency at which the piezo element is to be driven. This inverted input signal is inverted. The input signal is coupled to a first CMOS driver. An output signal is generated from the first CMOS driver in phase with the inverted input signal coupled to the first CMOS driver. The generated output signal has an amplitude equal to the difference in supply voltage coupled across the first CMOS driver, Vp-Vn. The input signal is coupled to a second CMOS driver. An output signal is generated from the second CMOS driver in phase with the input signal. The output signal generated from the second CMOS driver has a magnitude equal to the difference in voltage supply across the CMOS driver, Vp-Vn. The generated output signals from the first and second CMOS drivers is coupled across the piezo element. As a result, a voltage equal to substantially twice the voltage difference across the CMOS driver is applied across the piezo element to generate increased audio volume.

Voltage Limiter

The invention is a circuit for voltage limiting the output of an amplifier having an input and output. The circuit comprises a first series circuit of bipolar transistors coupled between the input and output of the amplifier. The first series circuit of bipolar transistors is arranged and configured to limit the negative voltage swing of the output. A second series of bipolar transistors is coupled between the input and output of the amplifier. The second series of bipolar transistors is arranged and configured to limit the positive output voltage swing of the amplifier. As a result, voltage limitation of the output of the amplifier is achieved while maintaining high linearity within the useful dynamic range of the amplifier.

The first and second series of bipolar transistors are comprised of a series circuit of a plurality of bipolar transistors. The base and collector of each transistor in the series circuit are coupled in common as the input of the transistor.

Each of the series circuits is comprised of one or more transistors. Each of the transistors within the series circuit, except the end transistors of the series, has the emitter coupled to the base and collector of an adjacent one of the transistors in the series. One end transistor is coupled to the input of the amplifier and the other one of the two end transistors is coupled to the output of the amplifier.

Line Powering for Two-Wire Twisted Pair, Multiple Signal, Capacitor Coupled Communication Line Interface The invention is a circuit for providing at least one dual voltage supply on an output. The circuit comprises a two-wire communication/power supply line having a positive and negative voltage on the two-wire line. A floating ground circuit provides a floating reference center voltage for the voltage supply to regulate power supplied on the line and isolate the line from ground loop noise.

The floating ground circuit comprises a fixed current source circuit for providing a constant current source having its input coupled to the line and having an output coupled to the output of the supply voltage. An adjustable current source circuit is coupled to the line and to the output of the supply voltage. The output of the adjustable current source circuit is slowly varied to balance the fixed current source circuit to approximately maintain the floating reference center voltage centered between the positive and negative voltages on the two-wire line. The adjustable current source circuit is varied at a rate which is subaudible. The fixed current source is comprised of a voltage regulator and a series output load resistor. The adjustable current source circuit is comprised of a voltage regulator and a variable resistance device.

The floating ground circuit further comprises a voltage divider and a gain stage amplifier. The gain stage amplifier has an input coupled to the voltage divider and an output coupled to the variable resistance device. The voltage divider is coupled between the positive and negative voltages on the two-wire line.

The circuit further comprising a diode bridge. The diode bridge is coupled between the two-wire line and the floating ground circuit. The diode bridge provides a fixed polarity to the floating ground circuit regardless of the nature of coupling between the diode bridge and the line.

In the illustrated embodiment the circuit is used in combination with telephone station units and wherein the floating ground circuit supplies current to telephone station units. The circuit is also used in combination with low powered nontelephonic communication devices in which case the floating ground circuit provides a predetermined and minimum amount of bias current with a small constant current load on the line and to provide linear signaling with the communication devices through the two-wire line.

When used as an adapter box, the floating ground circuit further comprises a diode bridge for providing a predetermined polarity from the line and a fixed current source and voltage divider coupled across the line. The fixed current source is coupled to the voltage divider to provide the floating reference center voltage and to forward bias the diode bridge to maintain operation of the diode bridge in a linear region.

One-Chip System

The invention is also a telephone communication system for communication between a plurality of exterior telephone lines and a single common in house two-wire line. The system comprises a control unit having a chip for coupling to the plurality of exterior telephone lines. The chip controls communication between the plurality of exterior telephone lines and the common two-wire line. A plurality of station/adapter units each have the chip. Each station/adapter unit is coupled remotely throughout the building to the common two-wire line. The chip in each of the station/adapter units selectively communicates with an arbitrarily selected one of the exterior telephone lines under the control of the chip in the control unit. The chip in the control unit and station/adapter unit chips are identical, but operated in different modes according to their respective operational position within the system so that a one-chip system is provided and so that communication on the single common two-wire line is effected without requiring complex control hardware within the control unit or station/adapter units.

The chip in the control unit communicates with the plurality of station/adapter units in a time frame subdivided into a plurality of time slots. A specified portion of each time slot is reserved for communication between the control unit and each one of the plurality of station/adapter units. All communication between each one of the station/adapter units and control unit occurs within the selected portion of the time slot within each time frame.

The system further comprises voice band and digital band interface circuit in the chip for communication between the control unit and the remote station/adapter units.

The system is used in combination with at least one computer having modem communication capability and/or at least one telefax device. The chip is programmable, is capable of communicating signals in telefax compatible format and in telephone tone signal format, and is accessible within the system by extension dialing. The control unit is programmed to selectively couple the computer and/or telefax device coupled to the chip in the station/adapter units to at least one of the plurality of exterior telephone lines through the single common in house two-wire line.

The system is particularly adapted for use with a plurality of the computers and/or telefax devices coupled to the station/adapter units. The control unit selectively couples the plurality of the computers and/or telefax devices into a programmable network.

The station/adaptor unit emulates a telephone receiver with respect to communication characteristics on the plurality of exterior telephone lines. The station/adaptor unit further comprise a circuit for selectively powering the computer and/or telefax device upon is are accessed. The station/adaptor unit also further comprising a modem and a serial input/output port for external communication.

The system further comprises an auxiliary communication device, which is defined to include, but is not limited to a telefax machine, an answering machine, a computer or any other communication or information processing device. The auxiliary communication device has the chip for communication with the system on the single common in house two-wire line.

The invention may be better visualized by now turning to the following drawings wherein like elements are referenced by like numerals.

BRIEF DESCRIPTION OF THE DRAWINGS

FIG. 1 is a block diagram of the multiband audio network (MAN) system.

FIG. 2a is a simplified block diagram of the MAN chip used in the control unit, station unit and adapter box of the system shown in FIG. 1.

FIGS. 2b–i are block diagrams illustrating the external configuration of the digital section of the chip of FIG. 2a for the different modes of the chip.

FIG. 3 is a diagram of a power spectrum as a function of frequency of the multiplexed signals on the communication line shown in FIG. 1 illustrating a 3 kHz voice channel base band, a 6 kHz digital channel, three 6 kHz AM modulated voice channels, and a 42 kHz reference signal.

FIG. 13 is a schematic of a timing circuit wherein the stored advanced timing is used to generated a delayed timing signal.

Figure 2C:
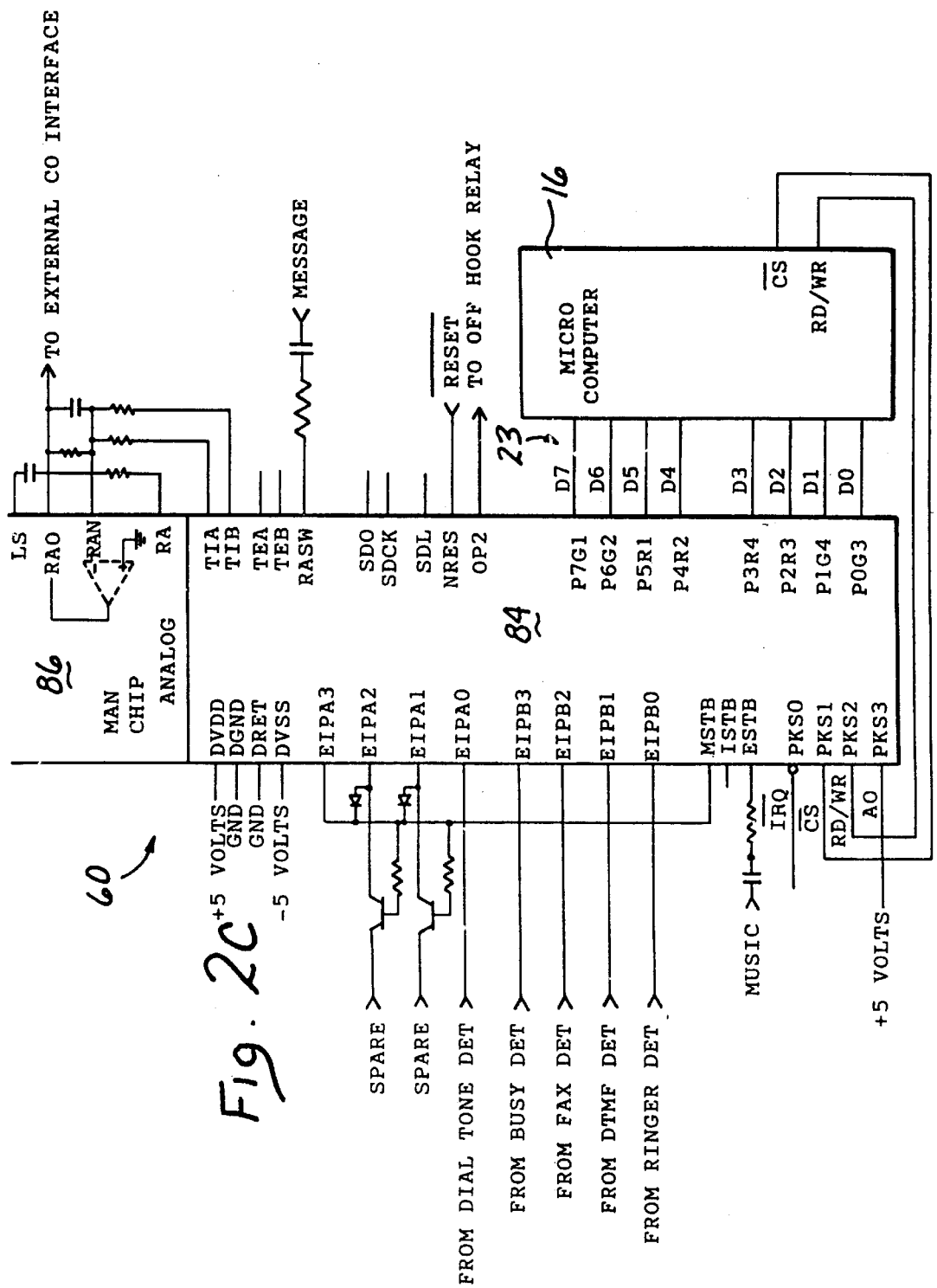
Figure 2D:
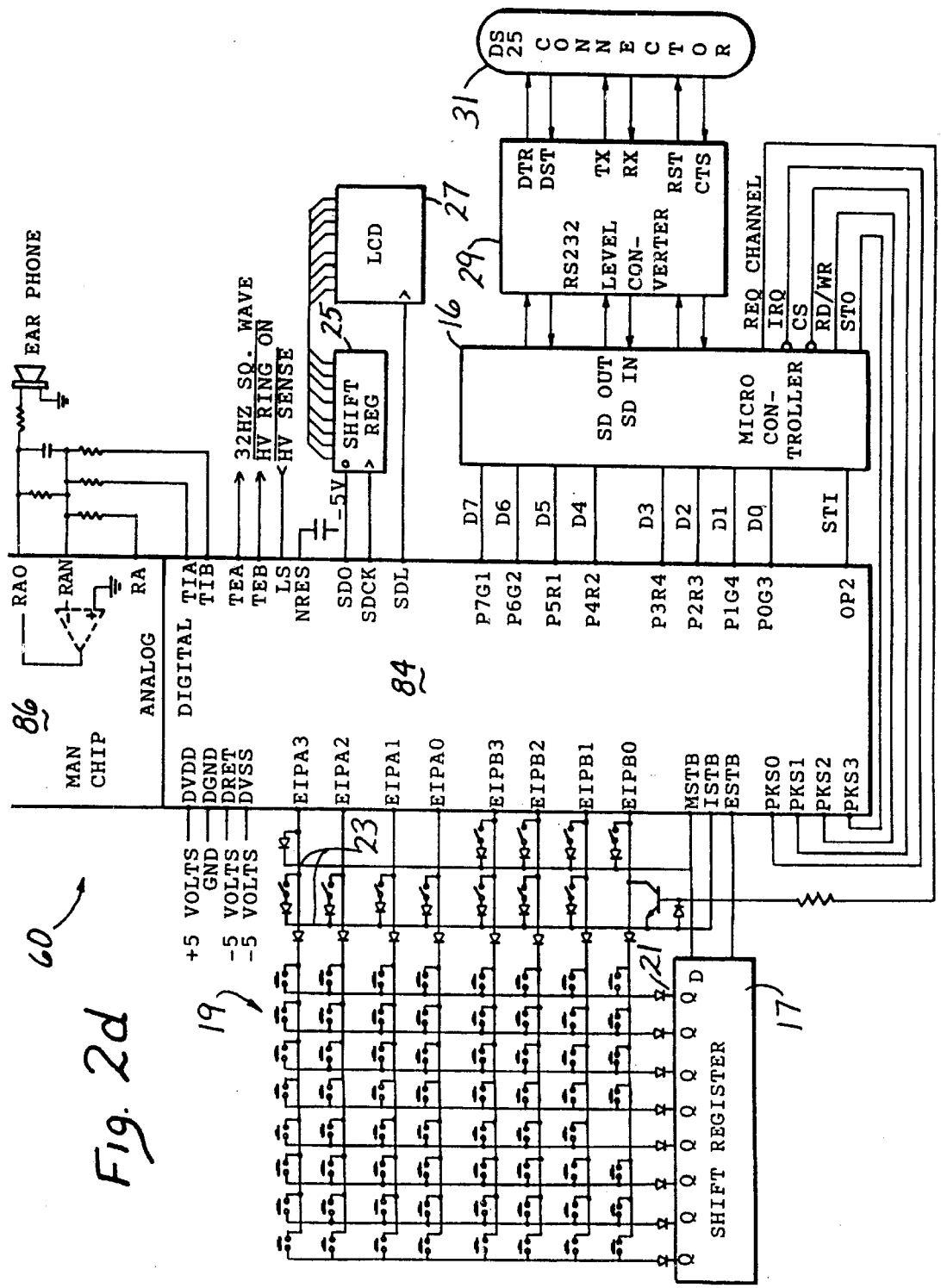
Figure 2E:
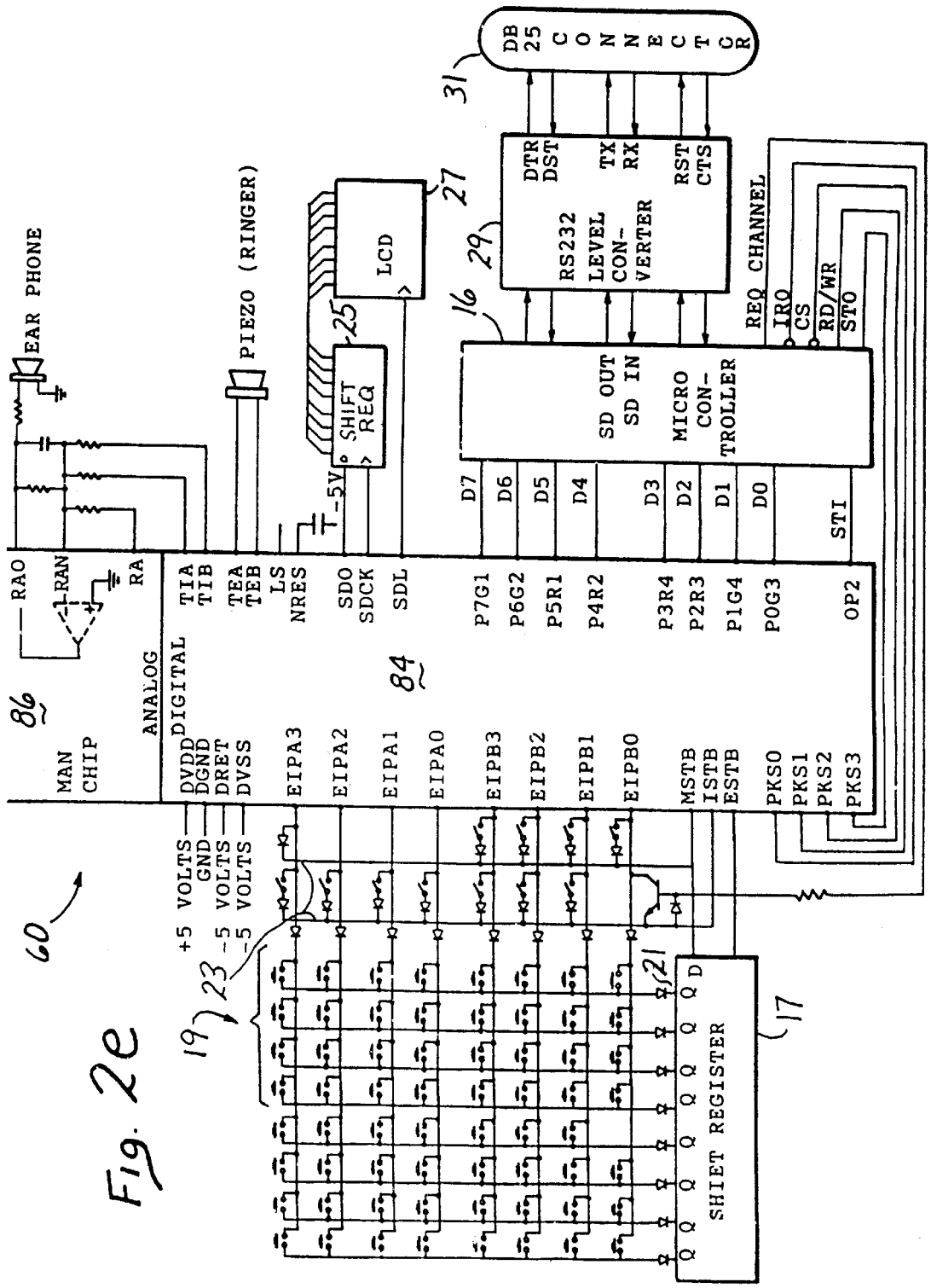

The invention now having been illustrated in the above figures, turn to the following detailed description of the preferred embodiments.

DETAILED DESCRIPTION OF THE PREFERRED EMBODIMENTS

The System

The invention is a telephone line communication system capable of operating on a single internal telephone line as commonly found in the home or small businesses, which is economically implemented with an integrated circuit chip to provide a virtually one chip telephone with business system features and which provides most of the components necessary to implement a full-featured, reliable and easy to install office communication system. In the illustrated embodiment, the system accepts from one to three lines from the telephone exchange with up to 14 extensions coupled to the single internal line. The extensions can include a combination of up to 8 line powered telephones (called station units) along with adapter boxes for coupling to standard telephones, modems, answering machines and fax machines.

The multiband audio network (MAN) of the invention can distribute four audio bands and a digital data band over a single twisted pair of wire. The system can be routed using standard 22, 24 or 26 gauge 2-wire cable in any configuration desired by the customer without requiring separate wires to each phone such as occurs in prior art star wired systems or special multiwire cabling in other types of systems. The four audio bands on the twisted pair are used to communicate between specially equipped stations or through a specially equipped interface to the telephone company as described below. A 6,000 bits per second full duplex digital data channel is also provided on the same twisted pair for the purpose of control signaling or data communications.

Turn now to FIG. 1 which is a block diagram of the MAN system. A control unit, generally denoted by reference numeral 10, communicates with one to three outside telephone lines 12 connected to the telephone company central office through a corresponding plurality of line interface units 14. Control unit 10 includes a microprocessor 16 which dictates the switching of the four voice channels on the network to telephone lines 12 as well as to each station unit 18 or 36 coupled to control unit 10 through the single multiplex twisted pair wire 20, the internal house telephone line.

The operation of master chip 22, and slave chip 24, as well as station chip 26 are insensitive to wiring topology, that is, the routing of single multiplexed twisted pair 20 can be configured in any topology desired such as star, chained or any combination thereof. As will become evident from the description below, the system of the invention eliminates the need for multiple, dedicated, point-to-point wiring, minimizes the number of components needed, and simplifies the installation of a telephone system.

A control unit master chip 22 modulates/demodulates one of three voice channels and a digital data channel onto line 20. In addition to the three modulated voice channels, a base band voice channel is accessible allowing up to four independent voice communications over single line 20. Master MAN chip 22 formats and modulates the data bus flow to allow microprocessor control and monitoring of the control signaling data of all stations units 18 and adapter boxes 36 from control unit 10. Master MAN chip 22 modulates the voice band signals to and from either the telephone company line or possibly a phone station onto one of four possible frequency bands which allow four communication paths to coexist on single wire pair 20. Master chip 22 controls all telephone line functions and switching including seven direct inputs and two outputs. It provides sound generation circuitry such as ringing/busy, signal/touch tones, for the telephone line interface. The master chip 22 also includes a microprocessor interface bus which provides for its control and signaling from the central control processor. By virtue of being the master MAN chip of the system, it has a data path from and to this bus to and form the digital channel on line 20. The 42 kHz reference signal provided from the master MAN chip timing provides the timing reference signal to the line 20 for the purpose of synchronization of all MAN devices in the system. Master MAN chip 22 is depicted in a more detailed block diagram in FIG. 2a and will be further described below.

Control unit slave chip 24 provides the identical functions as master chip 22 with the exception that a separate telephone line 12 coupled to control unit slave chip 24 is serviced. In the illustrated embodiment control unit slave chip 24 is identical in construction to master chip 22 although it is configured differently through described below.

Each station unit 18 or 36 includes all the control and interface support necessary to perform conventional multi-featured telephone functions. These functions include a combination of keyboard and display support circuitry including key strobe and debounce circuitry, LED buffers, piezo drivers, control registers and communication hardware. Each station unit 18 or 36 also includes MAN chip in the station mode 26 and a plurality of telephone hardware such as a handset 28, keypad 30, LED display 32, and hookswitch 34 needed to complete a feature telephone. A MAN chip in the station mode 26 is also included within an adapter box 36 whose output is to a telephone interface 38. The telephone interface which is constructed to imitate the features of the telephone company exchange connection in turn can be coupled to any type of standard telephone line compatible instrument such as a fax machine 40, an answering machine, a standard telephone, or a computer driven modem. Station chip 26 is also identical to master chip 22 except that it is differently configured through hardware switches.

Therefore, as depicted in FIG. 1, one chip design is used to control and interface each telephone station 18 or adapter box 36 to each exterior telephone company line interface 14 and to control the system network over line 20. All signals between chips 22, 24 and 26 are multiplexed over the single twisted pair wire 20 which is typically up to 800 feet in length.

Control unit 10 by virtue of its 3 MAN chips (1 master, 2 slaves) can transmit and receive voice on three of four bands simultaneously. Each station unit 18 or 36 transmits and receives voice simultaneously on one selected band at a time. A station unit 18 or 36 exchanges voice signaling with control unit 10 or any other station unit 18 or 36 in the case of a COM line call or a multiple of them in the case of a conference call. The voice band can also carry modem and fax data. The digital band is used for control of the network as well as providing medium speed digital communication. A fill duplex digital channel is provided for this purpose at a carrier frequency of 12 kHz. Full duplex or bidirectional digital communication is implemented by sending and receiving data in phase quadrature, i.e. 90 degrees phase shifted signals (A and B digital data). A power spectrum diagram as a function of frequency of the multiplexed signals on line 20 is depicted in the graph of FIG. 3 which illustrates a 3 kHz voice channel base band, a 6 kHz digital channel, three 6 kHz AM modulated voice channels, and a 42 kHz reference signal. In the illustrated embodiment, the three modulated voice channels operate on a center frequency of 24, 36 and 48 kHz. The base band voice channel is centered at 0 kilohertz. The two phase quadrature 6,000 bit per second digital channels are centered at 12 kHz. The 42 kHz reference signal is used by chips 22, 24 and 26 for phase-lock-loop operation in order to synchronize together.

The digital data channels centered at 12 kHz are broken in to time slots which are used to control different aspects of the system. By using a scheme of dedicated time slots for the communication of signaling data as described below, 2,000 bits per second of each 6,000-bit-per-second data stream is not used even with 14 stations connected to the system. The excess asynchronous digital data stream could be used for other auxiliary services such as LCD display or to create low-speed asynchronous digital paths for small file transfers between computers, printers or other devices coupled to the internal telephone network.

The invention treats the twisted pair bus as an input/output bus with the distinction that the remote station units are treated and addressed as input/output ports to the control unit rather than as a plurality of remote processing stations. This general approach simplifies hardware, adds system flexibility and improves communication efficiency. The system in the illustrated embodiment is characterized as a 1-chip telephone system, this terminology denoting a system in which several copies of a single identical chip is used in several different modes in control unit as well as in the plurality of stations to implement most of the electronics of a complicated system. As will be described below, digital and voice band filters and associated frequency modulator and demodulators in combination with precision phase lock circuits, VCO, level detectors with appropriate logic, timing and control results in a telephone system not only capable of performing control unit, station, and AB digital functions, but is flexible enough to couple to a plurality of other compatible components resulting in extremely integrated, reliable and low cost personal communication systems.

Chips 22, 24 and 26 can be thought of as an input/output port-like devices, chips 26 being remote to the controlling processor, coupled by a 2-wire bus that transports a plurality of analog voice grade channels, and a digital data channel and power. The illustrated embodiment is described in the context of that telecommunication bus using a key telephone system.

The reference signal at 42 kHz is transmitted from control unit 10 at all times to allow station units 18 and adapter boxes 36 to synchronize with control unit 10 and with each other by phase locking.

Power is provided to station units 18 or 36 and are transmitted on line 20. The power current is kept constant so that little or no noise generation occurs to disturb the voice and digital channels.

The MAN Chip

The MAN chip, whether used as a control unit master chip 22, CU slave chip 24 or station chip 26, is the same chip operated in different modes summarized in Table 1 below. Each mode corresponds to an external switch setting, read into a particular (MODE) register in the chip at power on reset time, the output states of this register being used to configure the chip in hardware. The modes differ depending on whether the chip is used as a master control chip 22, slave control chip 24, or station chip 18 or 36 with their various components such as external or piezo ringer or with maximum or minimum input/output configurations.

TABLE 1

| Mode | Function | Figure |
|---|---|---|
| 000 | Control unit master 22. Controls the digital channel. Supplies timing reference for the MAN line. Connects to one telephone company line. | 2b |
| 001 | Control unit slave 24. Only receives digital channel for PLL synchronization. Connects to one telephone company line. | 2c |
| 010 | Station unit 18 or 36. Station mode with microprocessor interface and external ring circuit. | 2d |
| 011 | Station unit 18 or 36. Station mode with microprocessor interface and piezo ringer | 2e |
| 100 | Station unit 18 or 36. Station mode with maximum input/output configuration and external ring circuit. | 2f |
| 101 | Station unit 18 or 36. Station mode with maximum input/output configuration and piezo ringer | 2g |
| 110 | Station unit 18 or 36. Station mode with minimum input/output configuration and external ring circuit. | 2h |
| 111 | Station unit 18 or 36. Station mode with minimum input/output configuration and piezo ringer | 2i |

The MAN chip 22, 24, and 26 is diagrammatically depicted in FIG. 2a. The MAN chip, here collectively denoted by reference numeral 60, is comprised of an analog section 86 and digital section 84. Digital section is comprised of a register file 58 which is used for various control and input/output operations. How registers 58 are used depends upon the mode in which chip 60 is operated as depicted in Table 1 above.

Internally, MAN chip 60 operates on an 8-bit data word. The upper 4 bits identify the address of a 4-bit register and the lower 4 bits are the data in the register. The 4 bits of address allow 16 possible 4-bit registers to be addressed. To allow for additional lesser used functions and ports, secondary registers are also provided which can be addressed through two successive words. The first word's upper 4 bits are 1000 or a code "8" which indicates that a secondary register is to be addressed. The lower 4 bits of the first word identify the address of the secondary register. The second word is the secondary register's data. Up to 16 secondary registers can be addressed.

The registers within register file 58 when used in the control unit modes 000 or 001 are accessed through a microprocessor interface 98 on chip 60. The data signals are provided on an 8-bit bidirectional data bus 42, an address line (A0), read/write control line (RD/WR) and interrupt request line (IRQ) all included as part of control bus 56. See the control mode configurations of FIGS. 2b and 2c.

Register file 58 when configured in a station unit mode (010-111) is accessed through the MAN line's digital channel by way of its data bus 42 and communications interface 88. The states of these registers are then written-to or read-from by the central processor 16 through the control unit master chip 22 of FIG. 1 through its corresponding microprocessor interface 98 via its data bus 42 and communication interface 88.

Consider first the registers in register file 58. In the illustrated embodiment, the definition of the registers in file 58 change depending on whether the register file is in a station mode and control mode. The register assignments are defined below in Table 2 according to whether it is acting as an input register, output register or secondary output registers. The register name, 0-F, is in the first column of Table 2 while the register function is summarized in the next two columns of Table 2 for a station mode (010-111) control mode (000 or 001) respectively.

TABLE 2

| | Input Registers (4 bits) | | | |
|---|---|---|---|---|
| Reg | Station Mode Function | Control Mode Function | A0 | W/R |
| 0 | Mode/no change during initialization | used internally | — | — |
| 1 | Mode/no change after initialization | used internally | — | — |
| 2 | Inpins A | not used | — | — |
| 3 | Inpins B | not used | — | — |
| 4 | Keys A | not used | — | — |
| 5 | Keys B | not used | — | — |
| 6 | Keys C | not used | — | — |
| 7 | Keys D | not used | — | — |
| | Output Registers (4 bits) | | | |
| Reg | Station Mode Function | Control Mode Function | A0 | DIR |
| 8 | Secondary Reg. Select | Secondary Reg. Select | 1 | W |
| 9 | Green | Not used | — | — |
| A | Red A | Not used | — | — |
| B | Red B | Not used | — | — |
| C | Serial Control | PL Control | 1 | W |
| D | Channel Control | Channel Control | 1 | W |
| E | DTMF | DTMF | 1 | W |
| F | Sound | Sound | 1 | W |
| — | Not used | Status Register | 1 | R |
| — | Not used | Communication Reg. | 0 | W |
| — | Not used | Communication Reg | 0 | R |

TABLE 2-continued

Secondary Output Registers (8 bits)

| Reg | Station Mode Function | Control Mode Function | A0 | DIR |
|---|---|---|---|---|
| 0 | Output Exp. Reg #0 | Not used | — | — |
| 1 | Output Exp. Reg #1 | Not used | — | — |
| 2 | Output Exp. Reg #2 | Not used | — | — |
| 3 | Output Exp. Reg #3 | Not used | — | — |
| 4 | Test Mode | Not used | — | — |
| 5 | Test Mode | Not used | — | — |
| 6 | Slow Event Reg | Not used | — | — |
| 7 | Not used | Not used | — | — |
| 8 | Program Tone A | Program Tone A | 1 | W |
| 9 | Program Tone B | Program Tone B | 1 | W |
| A | Effects for Sound | Effects for Sound | 1 | W |
| B | On/Off Time | On/Off Time | 1 | W |
| C | Timing/Balance Control | Timing/Balance Control | 1 | W |
| D | Gain Control | Gain Control | 1 | W |
| E | Not used | Not used | — | — |
| F | Not used | Not used | — | — |

W = write; R = read; A0 is control line input

Sound section 96 on chip 60 generates sounds that are commonly used in telephone equipment. Sound section 96 is active in all the modes for chip 60 and can be configured either to operate a high voltage ringer or piezo ringer. Sound section 96 generates a tone A and tone B. A third section within sound section 96 is an On or Off timer which controls the On and Off duration of tone A and tone B. A warble function can be provided with switches between tone A and B at a low frequency rate to create a ring sound commonly used in telephones and telephone systems. Sound section 96 can either be used in a fixed mode or can be programmable. The fixed mode typically includes all the DTMF tones, dial tone, two busy tones, and two ring tones. Fixed tones are typically set by a one mask ROM within chip 60. In the programmable mode, tones and On/Off times can be altered by writing into appropriate registers under program control.

Shown in FIG. 2a is both an internal mode associated with TIA and TIB and external mode associated with TEA and TEB for tone A and tone B. In some modes, tone A and tone B are added internally within sound section 96 and drive a piezo ringer with TEA and TEB. Since the signals TEA and TEB are made the complements of each other in this mode, this effectively doubles the voltage across the two pins for use with a piezo ringer. In other modes, a high voltage ringer is used instead of a piezo ringer and TEA is used to output a 32 Hz square wave with TEB the ringer enable and are used in conjunction with the LS pin used for High Voltage Sense. The On/Off timer within sound section 96 controls the ringer enable On/Off times of the ring signal. Both internal and external sounds can be fixed or programmed. In the internal mode, tone A and tone B output to separate I/O pads as TIA and TTB and these are used for the DTMF tones, dial tones and busy tone. Any adding of the TIA and TIB signals must occur outside of chip 60.

Chip 60 includes a serial input/output port 98 which allows for a simple interface to a standard 8-bit microprocessor 16. See FIGS. 2b–e. Input/Output section 98 also allows for detection of switch closure using a multiplexing approach. Up to 10 strobed lines can be strobed by MSTB, ISTB and ESTB using external hardware of which strobed lines, eight key input lines 21 are coupled through an external shift register 17 and two are status switch lines 23 are provided for a maximum of 79 switch locations 19. See FIGS. 2d–g. MSTB and BIPA 0–3 provide the mode and MSTB and EIPB 0–3 provide the station identification number for chip 60. Strobe signals on these pins are normally high and go active when low. The strobe line pulls the EIP line low through a closed switch that is connected to the strobe and EIP line. Otherwise, the EIP line remains high.

Key switches are debounced internally within chip 60. Mode and station identification switches are not debounced. The status of a key state is transmitted after being in a new state for approximately 24 milliseconds. The momentary key status is transmitted immediately after it is pushed down or closed and is not considered released or open until it has been in that state for at least 24 milliseconds.

Figure 2H:
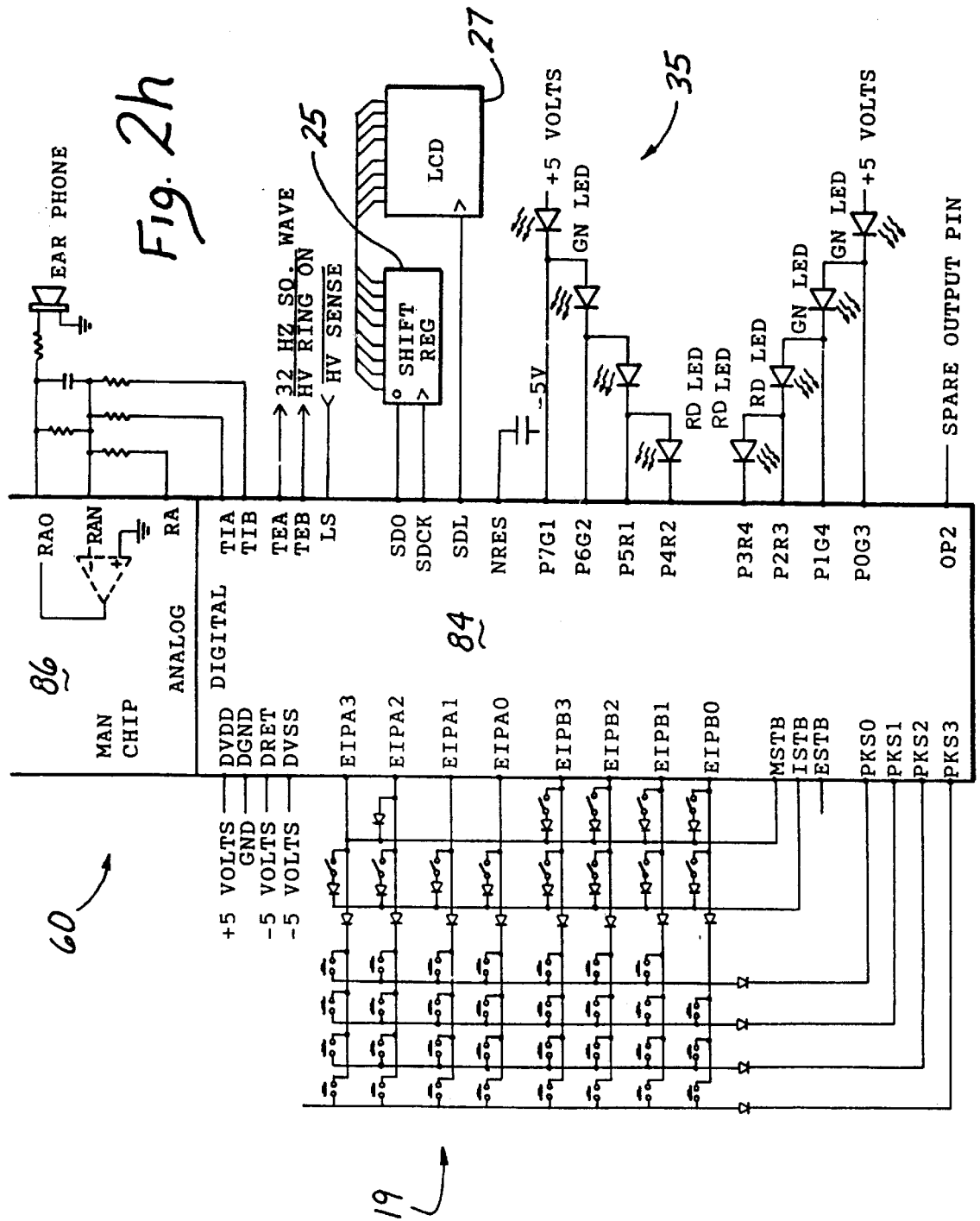
Figure 2I:
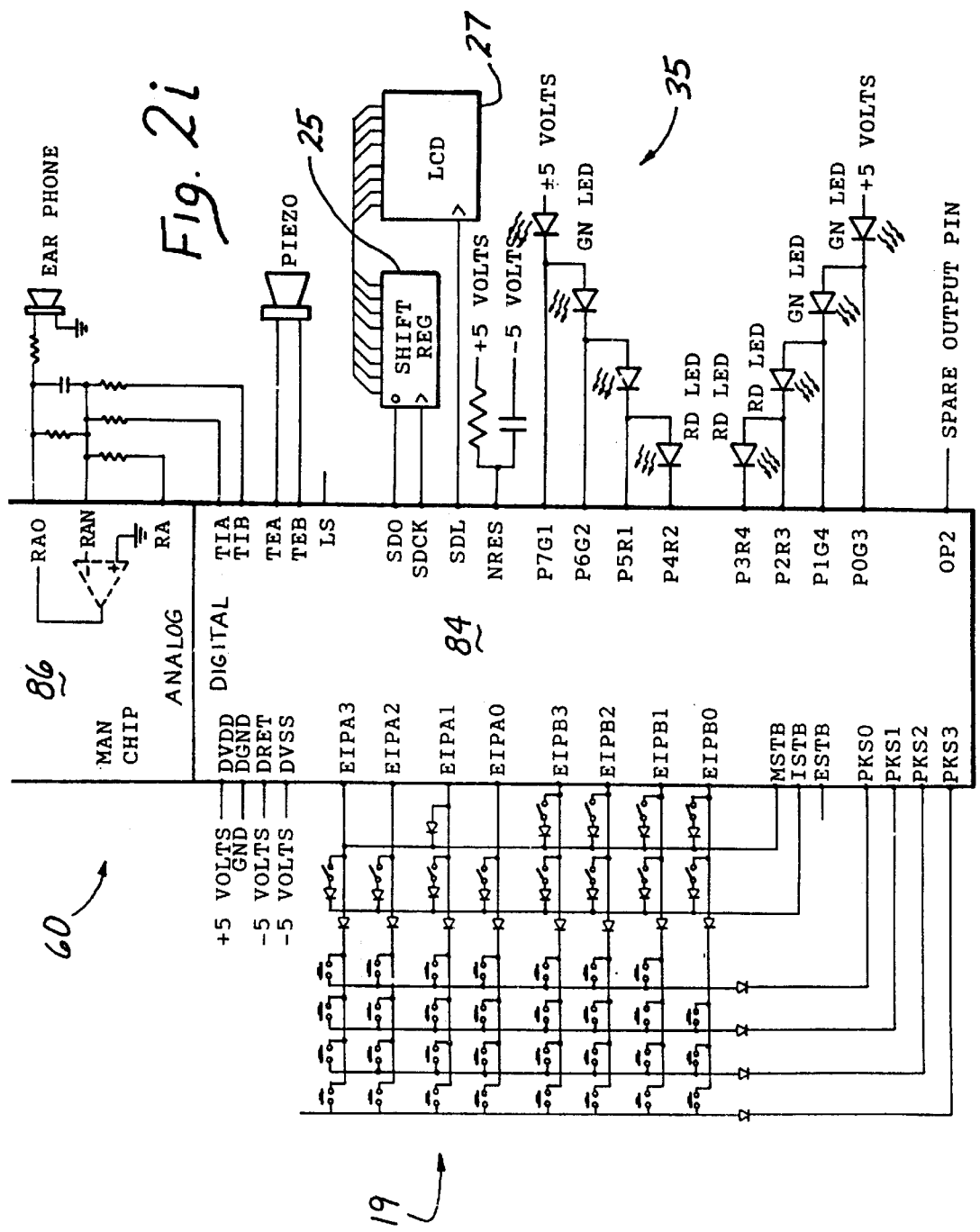

There are four banks of status switches which are multiplexed on the EIPA and EIPB pins besides the keyboard switches in the station unit modes. Each bank has four switches for a possible total of 16 switches. The banks are called mode, station, Inpins A, and Inpins B switches. Both mode and station identification number use the MSTB pin shown in FIG. 2a as the strobe. The switches Inpins A and Inpins B use the pin ISTB for the strobe. PKSO-3 are used as the strobe signals for momentary key switches when chip 60 is configured in a minimum input/output configuration and where 32 key switches are supported. See FIGS. 2h and i. In other input/output configurations where a maximum number of 63 key switches are supported, an external shift bit register is connected to the strobe signal of MSTB while the clock input of the external shift register is connected to ESTB. The outputs of the shift register are then used as the strobe lines for a key switch matrix for key denoted as keys A, keys C and keys B and keys D, each group being a 4×4 submatrix.

FIGS. 2d–i illustrate some of the display and communication capabilities of chip 60 when used as a station unit 18 or 36. Each of the FIGS. 2d–i show coupling of the serial data output pins, SDO and SDCK to load a shift register 25 whose output in turn is coupled to a LCD display 27. In the modes shown in FIGS. 2d and 2e microprocessor 16 has its serial data pins coupled to an RS232 level converter 29 which is coupled in turn to serial connector 31 to auxiliary data equipment such as modems, faxes and the like. When in the modes depicted in FIGS. 2g and 2f shift register 25 is also coupled to four secondary registers 33 clocked by PKSO-3 from chip 60 to provide additional expanded outputs. The modes of FIGS. 2f–i further illustrate control of a plurality of green and red LEDs 35 provided on the station unit by pins POG3–P7G1 of chip 60 which operate to provide telephone light status functions.

Considering now the analog section of the circuit. Turning first to the voice channel, each MAN chip 60 includes an analog modulator 62, an analog demodulator 64, a data modulator 66 and a data demodulator 68. Analog modulator 62 takes an audio signal to be transmitted, TA, which is buffered by buffer 70 and filtered with a 3 kHz low pass filter 72. The analog signal is then modulated by analog modulator 62 to a higher frequency channel using conventional AM suppressed carrier modulation techniques or passed through in the case of base band. As previously stated, three voice carrier frequencies are available, namely 24, 36, and 48 kHz as delivered to modulator 62 from clock generator 82. The carrier frequency is determined by Register D. Clock generator 82 in turn is driven by oscillator 100 and controlled by control circuit 59. When the VCO oscillator is used in an oscillating mode, a crystal and a resistor capacitor network is tied externally from VCXM and VCXO. The VCO oscillator is buffered with 102 and appears on output pin VCXB for driving other circuitry. If the VCO oscillator is driven from another source, the signal is entered at pin VCXI.

The modulated signal from 62 is then applied to output TXO through a summing buffer 74. TXO output is further conditioned outside the MAN chip and then applied to MAN line 20 (FIG. 1). In addition to these three modulated voice channels, the analog signal TA, can also be applied to MAN line 20 as a base band signal, i.e. a signal without a carrier frequency.

Analog demodulator 64 receives an input signal, RXFP from MAN line 20 (after some conditioning) through amplifier 76. Modulator circuit 64 demodulates the received signal back to the base band from the appropriate carrier frequency, if any, filters the output with a 3 kHz low pass filter 78, and then couples the signal through buffer 80 to generate a received audio signal, RA.

Analog modulator 62 and demodulator 64 are synchronized to the signals on MAN line 20 (FIG. 1) by means of a clock generator 82 and (depending on the mode) by a phase lock circuit. Master control unit 22 (FIG. 1) transmits a 42 kHz sinusoid on MAN line 20 (FIG. 1) as depicted in FIG. 3. This is used to synchronize the analog and digital channels between control unit 10 and station units 18 or 36. Station units 18 or 36 as well as the slave control chips 24 phase lock onto the same 42 kHz reference signal. Phase locking all chips to the 42 kHz signal on the MAN line 20 helps to compensate for any phase shift that may occur on MAN line 20 or the interface circuitry to that line.

As depicted in FIG. 2a, the phase lock loop is implemented by receipt of the 42 kHz reference signal through a sample and hold circuit 90 which is coupled to MAN line 20. The reference signal is demodulated by demodulator 92 and output to PLLO and conditioned externally and fed back into the PLIN pin for digital phase lock is required and into pin VCIN when analog phase lock is required. PLIN is conditioned and input to clock generator 82 in order to address the clock timing on chip 60 to synchronize it with the reference signal lit a digital mode VCO implementation (with the analog VCO fixed to a set frequency). VCIN is buffered and input to the analog VCO oscillator 100 for an analog mode VCO implementation. The choice of digital phase lock loop or analog phase lock loop is selected with one bit of the mode register which is loaded at power on from an external pin. In the mode where chip 60 is used as master chip 22 (FIG. 1) synchronization is made directly to the on-chip 42 kHz reference signal. The operation of the data channel is similar to the analog channel except that only one data channel is available. Digital data from data bus 42 is coupled to communications interface 88 whose output is coupled to a 3 kHz low pass filter 91 and then to modulator 66 where the digital data is modulated with a 12 kHz carrier frequency. The output of modulator 66 is coupled to summing buffer 74 and then through pin TXO to MAN line 20 after some conditioning. The use of amplitude modulation allows the signal 12 kHz data carrier frequency to have independent receive and transmit signals, transmitted in phase quadrature. Therefore each transmitted bit has three states, logical 1 (+V), logical 0 (−V) and NO ENERGY (V=0).

The carrier suppressed digital signal is received from MAN line 20 as RXFP and conditioned by amplifier 76. The received data signal is demodulated by demodulator 68 whose output is then coupled through a 3 kHz low pass filter 92. The output of filter 92 is then coupled to the input of digital Interface 88. The data is then transferred to the data bus 42 where it is transferred into registers. The combination of a modulator and demodulator in chip 60 is to give chip 60 full duplex 6 kilobit per second capability.

Digital interface 88 is also coupled to control bus 56 and has as it outputs the clocking signal serial data output, SDO, a 6 kHz bits per second serial data out clock, SDCK, and a serial data latch signal, SDL. Therefore direct serial communication is provided to other serial devices from the MAN line 20 (FIG. 1).

A Simplified Bus Oriented Processor Using a Fixed Time Slot Protocol

Current state of the art processors include logic decoders that convert a program counter into an instruction stored in a read-only memory and implement jumps between instructions. The invention incorporates a digital section or processor 84 shown in the block diagram of FIG. 2a in each chip 22, 24 or 26 of FIG. 1 that has a fixed cycle with no jump capability. The program counter of the prior art is replaced with a timing or state counter which eliminates the program stored in a read-only memory in favor of local control signals derived from the timing. The processor uses minimized arithmetic logic unit which is described in the present specification as a universal logic unit (ULU) to make increments, decrements and comparisons instead of additions and subtractions. The universal logic unit (ULU) is defined in the specification as logic circuitry that operates each cycle to perform universally used logic functions similar in nature to the role of an arithmetic logic unit in a larger conventional system, but in a manner consistent with the simpler orderly protocol described below. As a result, less silicon area is required in the integrated circuit constructed to accomplish these tasks while maintaining similar programmability and functional equivalency to a conventional processor on a low level.

Figure 4:
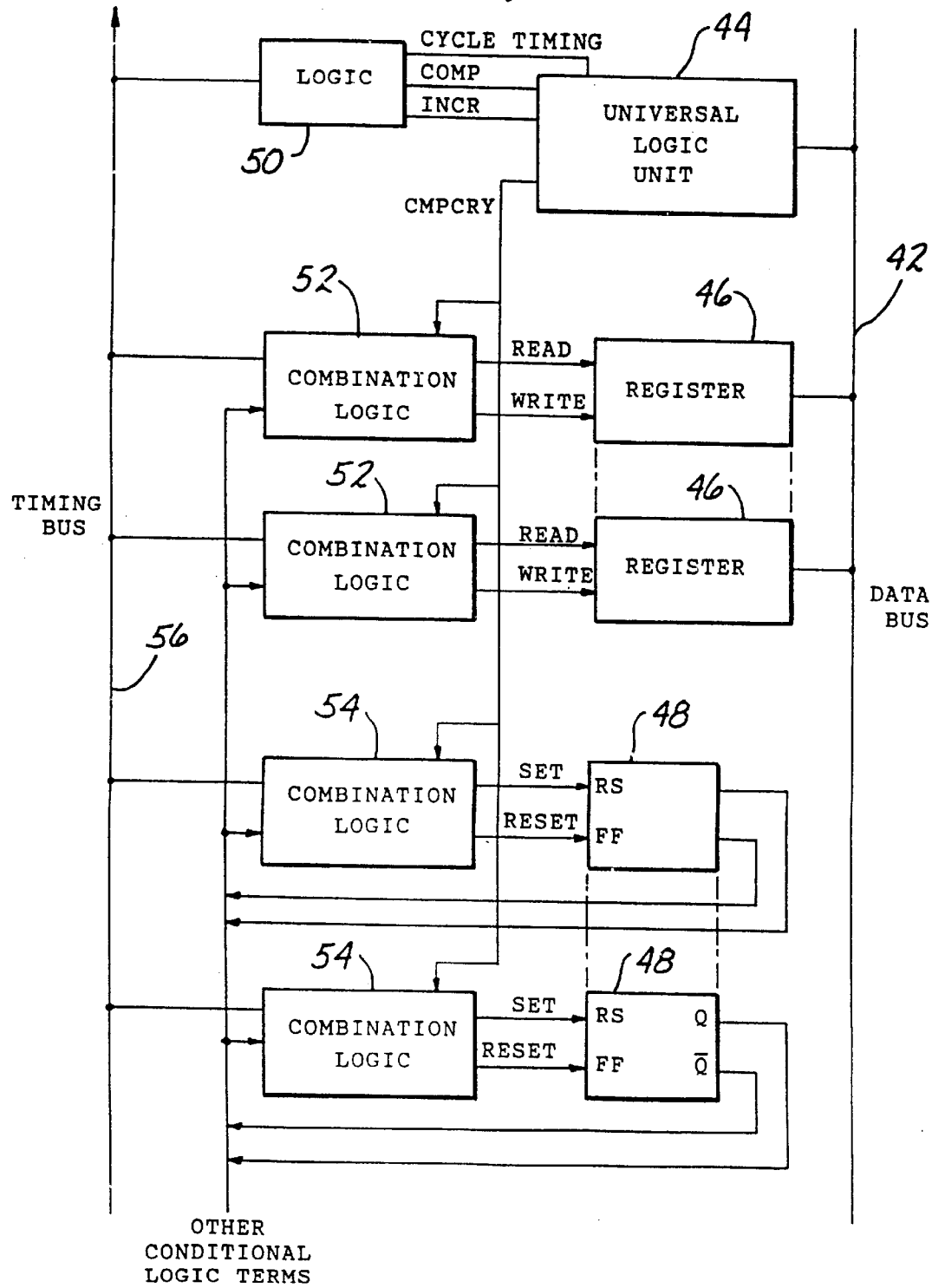
FIG. 4 is a simplified block diagram of a portion of the digital portion of the MAN chip of FIG. 2a illustrating the time-slot processor of the invention.
Figure 5:
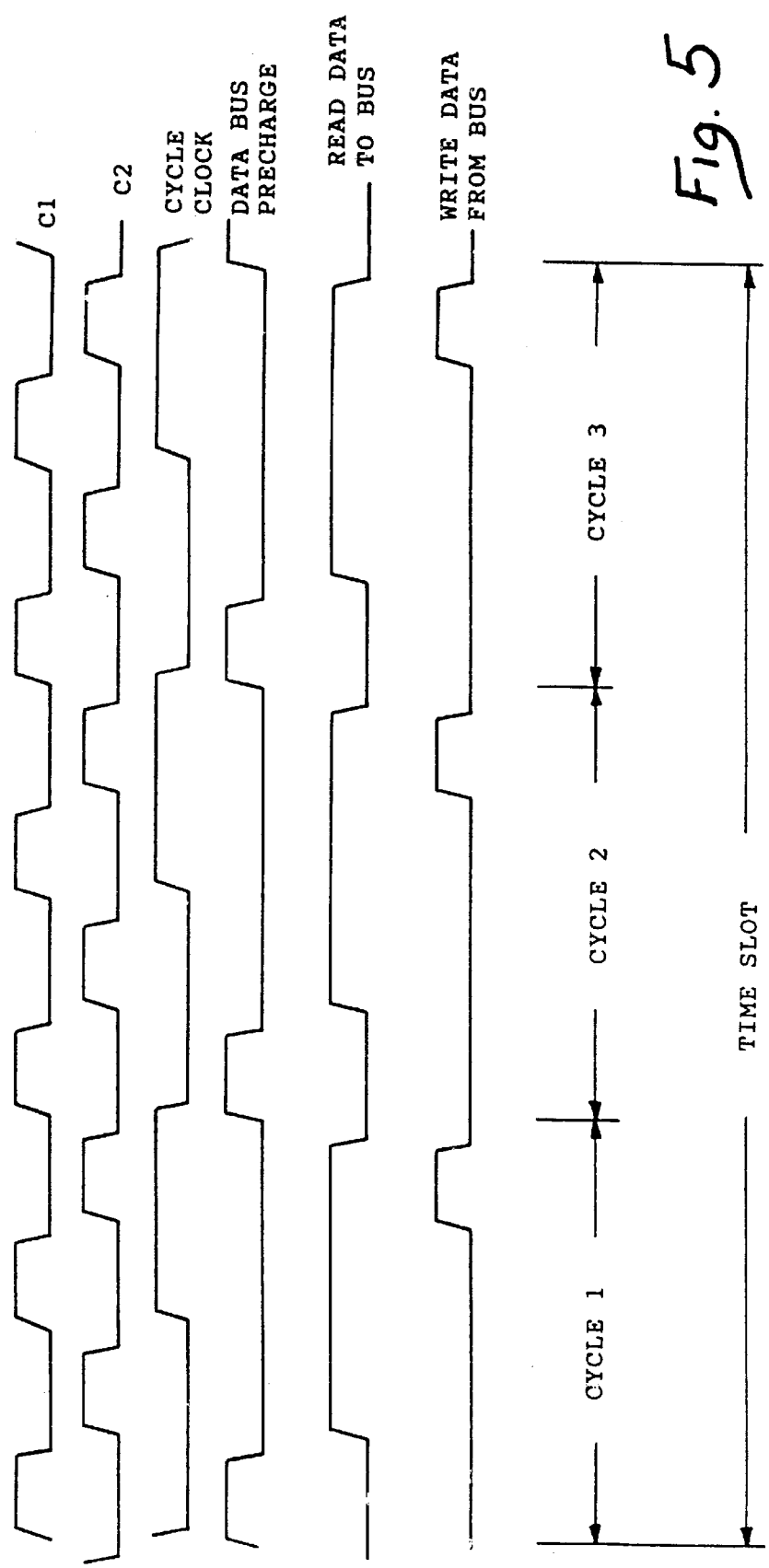
FIG. 5 is a timing diagram of the operation of the processor of FIG. 4.

Turn to FIG. 4 which is a block diagram of circuitry operating according to the cyclical timing illustrated in the timing diagram of FIG. 5. Digital section 84 of FIG. 2a includes a data bus 42, a universal logic unit 44, registers 46 comprising register file 58, an RS flip/flop 48 in combination with logic gate circuitry 50, 52 and 54 as will be further described below comprising part of control circuit 59 of FIG. 2a. Logic gates 50, 52 and 54 in turn are coupled to a timing/control bus 56.

Data bus 42, which is 8 bits wide in the illustrated embodiment, is a precharged bus driven by universal logic unit 44 and registers 46. Bus conflicts are resolved by assigning each operation to a dedicated time slot. The time slots are diagrammatically depicted in the timing diagram of FIG. 5. Each time slot in turn is comprised of three cycles. The use of precharged data bus 42 allows low power, minimum hardware and low noise performance in the system. Data bus 42 is precharged to high voltage representing a logical 1, but is inverted on being coupled to any register so that the precharge state is seen by the circuitry in FIG. 4 as a logical 0. This allows registers 46 to be easily cleared by inhibiting all read cycles during one time slot and to write each register to be cleared in its individual time slot.

Universal logic unit 44 operates on data presented on data bus 42 in conjunction with registers 46 to do compares, increments and decrements. ULU 44 may operate on data in every time slot ULU 44 in the illustrated embodiment is constituted to perform only four instructions represented by the 2-bit instruction codes set forth below in Table 12.

TABLE 12

| Instruction | Definition | COMP | INCR |
| --- | --- | --- | --- |
| COMPI | compare and increment, read to bus on NO COMPARE | 1 | 1 |
| CMPD | compare and decrement read to bus on NO COMPARE | 1 | 0 |
| INC | increment read to bus on NO CARRY | 0 | 1 |
| DEC | decrement read to bus on NO CARRY | 0 | 0 |

The most significant bit of the instruction is a signal referenced In FIG. 4 as compare, COMP, and the least significant bit is a signal referenced as increment, INCR. The control signals COMP and INCR are provided to ULU 44 on timing and control bus 56 through logic circuit 50. Each time slot includes three cycles and the operation of each cycle for the four instructions in summarized and described in tabular form in Table 13 which defines the operation of ULU 44 in response to COMP and INCR.

TABLE 13

| Instr | Cycle | CMPCRY | X'fer bus to ULU | X'fer ULU to bus |
|---|---|---|---|---|
| CMPI & | 1 | N | Y | N |
| CMPD | 2 | N | N[1] | N |
|  | 3 | Y[2] | N | X[3] |
| INC & | 1 | N | Y | N |
| DEC | 2 | Y | N | N |
|  | 3 | Y[4] | N | X[3] |

N = no
Y = yes
X = optional

1—The bus is not transferred into the ULU, but the ULU compares the data stored in cycle 1 to the data on the bus in cycle 2.

2—CMPCRY is set to a "1" if the values compare and set to a 0 otherwise.

3—If CMPCRY is a "1", the incremented or decremented value is not driven onto the bus in cycle 3, otherwise it is.

4—If the incremented or decremented value produces a carry, CMPCRY is set to "1" otherwise it is set to a "0".

The signal compare/carry, CMPCRY, is an output signal from ULU 44 and is used by other logic circuitry in FIG. 4 to determine the subsequent operation to be performed based on whether a compare or carry has been detected.

The first cycle of each instruction writes data from data bus 42 to ULU 44. For the instructions CMPI and CMPD, data is written to ULU 44 in cycle 1 and compared to data on the data bus is cycle 2. For CMPI and CMPD, If the data on data bus 42 in cycle 1 and cycle 2 are equal, that is a valid comparison is made, CMPCRY is set to "1" in cycle 3 and no data is written from ULU 44 then on to data bus 42. For CMPI, if the data on data bus 42 in cycle 1 and cycle 2 do not compare, i.e. are not equal, CMPCRY is set to "0" in cycle 3. ULU 44 would them increment that data it received from data bus 42 in cycle 1 and drive the incremented value on to data bus 42 in cycle 3. The same operation occurs with respect to CMPD except the value is decremented.

In the instructions INC and DEC, the data on data bus 42 is ignored in cycle 2. For INC, if the data bus is all 1's In subcycle 1, CMPCRY is set to "1" in cycle 3 and ULU 44 does not write onto or drive data bus 42. For INC, if the data in cycle 1 is not all 1's, the data on data bus 42 in cycle 1 is incremented and ULU 44 writes or drives the result onto the data bus in cycle 3. In this case, CMPCRY is set to "0" in cycle 3. For INC, if nothing else drives data bus 42 in cycle 3 for a crry condition, i.e. CMPCRY equal to "1", then incremented value "00" is written onto the bus by default. For the instruction DEC, if the data in cycle 1 is not all 0's, the data on data bus 42 in cycle 1 is decremented. ULU 44 drives the data bus 42 in cycle 3 and sets CMPCRY to "0" in cycle 3. For DEC, if data bus 42 is all 0's in cycle 1, CMPCRY will be set to "1" in cycle 3 and ULU 44 will not write onto or drive bus 42.

For the instructions CMPI and CMPD, the control signal CMPCRY is valid only during cycle 3. For the instructions INC and DEC, control signal CMPCRY is valid in both cycles 2 and 3. These basic instructions can be used to build up all of the more complex operations necessary to operate digital section 84 of FIG. 2*a*.

Registers 46 may be any type of register such as simple transparent latches that read data from data bus 42 and store it indefinitely. Registers 46 also write data to data bus 42 by leaving bus 42 precharged or driving it to ground. Register-to-register transfers are accomplished by having one register 46 configured to be in a write cycle. The read and write control signals are determined by decoding the timing bus 56 for the time slot information and from control signal CMPCRY or other logic signals for additional information. The number of registers 46 which may be coupled to data bus 42 is limited only by the capacitance of data bus 42.

RS flip/flop 48 is used to interpret the control signal CMPCRY along with other signals from timing bus 56 and other conditional logic signals. Flip/flop 48 stores control or logic information for subsequent use. The output of flip/flop 48 is used as an additional condition logic term or control signal. Although only one flip/flop is depicted in FIG. 4, it is expressly contemplated that a plurality of such flip/flops will be included as needed.

A simple counter can be mechanized by reading a value from a register 46 in FIG. 4 when CMPCRY is set to a "1" and incrementing R with ULU 44 at the time or event occurrence that needs to be counted. A simple comparator can be mechanized by reading one source to data bus 42 during cycle 1 and another source to data bus 42 in cycle 2. CMPCRY from ULU 44 is then observed in cycle 3. By using flip/flops and other conditional logic elements more complicated counters, comparators and data transfer circuits can be implemented.

It must be understood that it is within the scope of the invention to provide an even simpler processor by eliminating ULU 44 and replacing it with custom logic circuits for performing simpler logic functions in more basic applications or to create a more complex processor by replacing ULU 44 with a more extended arithmetic logic unit.

The operability of processor of FIG. 4 may also be extended to port data bus 42 directly to input/output pins for operation of the circuit or to port data bus 42 to other existing buses such as an external microprocessor data bus.

Thus, it can be readily appreciated that by combining a simple ULU 44 with simple registers 46, RS flip/flops 48, data bus 42 and timing bus 46, many operations involving timers, counters, comparators, and data transfer operations can be performed with a minimum number of interconnections and logic elements with the result that only a small portion of the integrated circuit is used to implement these functions.

Utilizing a precharged data bus 42 with dynamic memory unit such as registers 46 and 48 also results in a small usage of integrated circuit area, low power, and low noise while allowing the implementation of multiple timing and comparison functions. By performing the instructions in a time slot scheme based upon timing signals from timing bus 56, multiple timing, comparison and transfer operations can be easily realized. The timing signals required for such a time slot scheme are generally available on timing bus 56 without the addition of extra hardware on the chip. The programming available within the time slot scheme can be expanded by increasing the frame time period. As a result of the time slot bus scheme, the hardware required to perform timing, comparison and transfer operation is minimized in terms of the die area required for its implementation and will usually be able to take advantage of counter devices needed for other system functions.

A much simpler solution for tasks performed by a processor of FIG. 4 results than would be realized if instead instruction execution were performed with a program counter with jump capability. The combination and small number of instructions necessary, in combination with the time bus slot scheme, yields a simple easy-to-implement instruction decode within ULU 44.

Communication Signaling Protocol

A synchronization signal is transmitted for phase locking all the station units (station phone 18 or adapter box 36 of FIG. 1) to the control unit clock and a common frame synchronization signal is used to align all units in time. Each remote telephone or adapter box has a unique number assigned to it by the setting of a manual switch on that phone or box. Each number (manually set) corresponds to a slot in a time frame as referenced from the frame synchronization signal.

Thereafter all control signaling to a specific station unit occurs in that particular time slot. This eliminates the need in the system to establish a handshake protocol every time a message is sent in either direction. Slow downs in system response to stimuli during periods active communication between a plurality of units is thereby avoided. Serial digital data can also be transmitted over the same line without affecting signaling speed. Instruments such as a liquid crystal display can be serviced quickly without affecting signaling response time and a good error correction scheme can be implemented also without affecting signal response time. Other serial data can be quick transferred for use as data communication network regardless of the direction of transfer between the units as controlled by the master control unit.

Chip 60 in FIG. 2a in the station mode 18 or 36 in FIG. 1 also performs digital communication protocol functions to facilitate proper data communications between it and chip 60 in the control unit mode 10 of FIG. 1. Communication protocol is used to define how data on the digital channel is sent. The communication protocol of control unit 10 is implemented by a microprocessor 16 which is externally connected to device 22.

Figure 6:
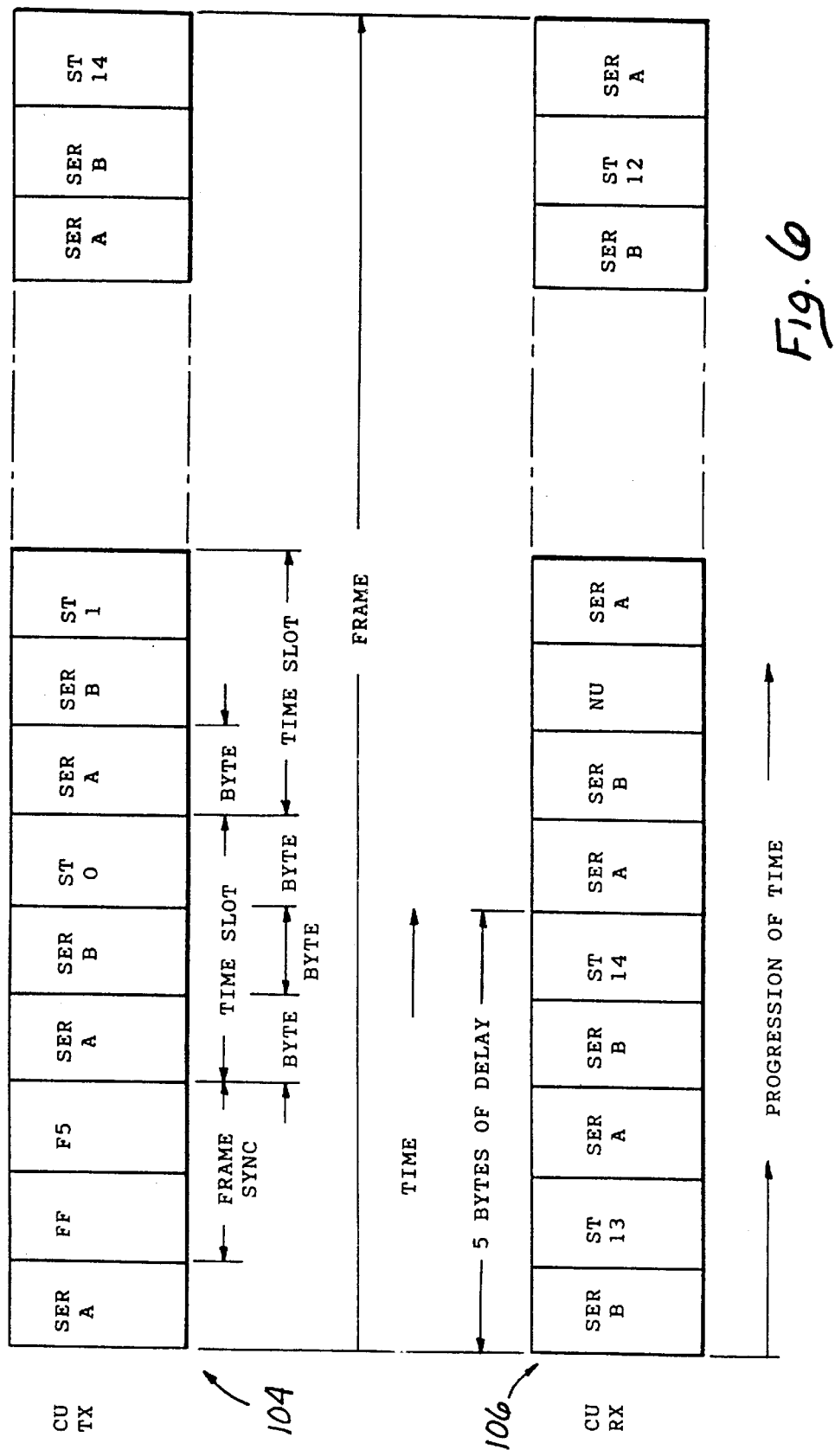
FIG. 6 is a time map of a time frame of communication transmitted and received by a control unit.

Turn now to FIG. 6 wherein a timing frame is diagrammatically laid out in line 104 as a timing frame transmitted by the control unit 10 in FIG. 1 and a timing frame 106 for signals received by control unit 10. In the illustrated embodiment, timing frames 104 and 106 are each divided into 16 time slots and each time slot is divided into 3 bytes. Time progresses from left to right in the diagram. A sync signal of "FFF5" is transmitted from control unit 10 once per frame to synchronize station units 18 or 36 in FIG. 1 to control unit 10. Fifteen of the time slots bytes, ST0–ST14, are used for the station control signaling data. The control signaling data is data transferred from control unit 10 to a station unit 18 or 36, or visa versa, that relates instruction or status information such as key presses, off-hook switch status, ring, select channel and the like. Input data is considered data sent from an input device such as a keypad or off-hook switch from station unit 18 or 36 to control unit 10. Output data is defined as data used to control the output devices such as the ringer or LED displays sent from control unit 10 to stations 18 or 36.

The time frame organization as depicted in FIG. 6 is used to regulate the data flow of the 6 kilobit per second serial data stream on MAN line 20 in FIG. 1. Bar 104 is a frame for a transmission from control unit 10 and bar 106 shows a frame for reception to a control unit. Three consecutive bytes create a time slot. Sixteen time slots create a frame. Each of the 14 station units is uniquely assigned a dedicated time slot in the frame during which it communicates with control unit 10 or more specifically, master chip 22. Fifteen of the time slots bytes are dedicated to corresponding station units, ST0–14. The first byte of a time slot is reserved for serial data channel A, the second byte is reserved for serial data channel B, and the last byte is used for control signaling data to communicate with one of the station units 18 or 36. Serial data channels (A or B) can be opened up between the control unit and any one of the station units as a high speed data link.

One time slot in each frame is reserved for the frame/byte sync character. The frame organization allows master chip 22 to communicate with the 15 station units in a round-robin fashion. The frame/bit synchronization slot's first byte is reserved for serial A data. The second and third bytes contain the data "FFF5". This frame/byte sync word sets and maintains the byte's synchronization, that is a grouping of 16 bits to form a serial data stream to synchronize the station units and control unit. Only master control chip 22 transmits in the control unit transmission (bar 104). Master chip 22 sends and receives its control information as well as all of the data transmitted and received on the digital control channel (after proper conditioning, described elsewhere) directly to and from microprocessor 16 on microprocessor data bus 23. The most significant bit of each byte is always sent first The transmit time slot byte of a particular station unit is delayed 5 bytes from its receive time slot byte. This allows the station unit 18 or 36 to respond to a command received from control unit 10 in the same frame, so that the station unit can send an echo back of the command received from control unit 10 in the earliest available byte time.

When chip 60 is operated in a station unit, it has three communication modes that determine the state of its digital communication link with master control unit 10. The three states are bad frame (BF), not bad frame (NBF), and good communication (GC). A power-on-reset signal (POR) from circuit 103 in FIG. 2a in station unit 18 or 36 forces the chip into a bad frame mode when the chip is first powered up. The chip goes from bad frame mode to not bad frame mode when a frame/byte sync word is received. If station unit 18 or 36 receives a second frame/byte sync word in its proper time slot position, the chip will then go from a NBF mode to a GC mode. It will drop back to the NBF mode if the frame/byte sync word is not received at the proper time. Station unit 18 or 36 returns to the bad frame, BF, mode if it fails to receive the expected frame/byte sync word for three consecutive frames in the proper designated time slot.

Any station unit 18 or 36 if in a bad frame, BF, mode will inhibit transmitting any signal, initializes out all registers, reads the mode and station number from fixed input pins and periodically walks the carrier phase, i.e.. phase shifts its internal clock around the 42 kHz reference signal in an attempt to achieve synchronization. In the not bad frame mode, NBF, all transmission of signals is inhibited and the frame and byte counters are initialized. In the good communication, GC, mode, the data transmitter 74 in FIG. 2a is enabled and the station unit 18 or 36 enters the normal operating mode.

When MAN chip 60 is used as a slave chip 24, it operates in a manner similar to that just described with respect to station units 18 or 36 with the exception that the slave chip 24 never transmits serial data. Instead, it sends and receives its control information directly to and from microprocessor 16 on microprocessor data bus 23.

When chip 60 is used in the master control unit mode its operation is similar except there is no frame/byte sync detection since no frame/byte sync characters are sent by any of the station units 18 or 36, the master control chip is the defacto synchronizing standard in the system, and is thereby not in need of synchronizing. Anything written into communication register 88 in the master mode is transmitted at the next byte time regardless of the time slot or frame count. The frame/byte sync character is not generated by the master control unit 22, but is provided by microprocessor 16 by writing the bytes FF and F5 at the appropriate times consistent with the frame organization described above in FIG. 6.

The microprocessor's interrupt line, IRQ, 85 in FIG. 2b is set low when control unit 10 is ready to transmit and receive 8 bit data words through the digital channel. If communication register 88 is not written to by processor 16 between interrupts, then no energy is transmitted for that byte time. If a valid byte has been received by the master control unit from a station unit,, then the most significant bit of the master chip's status register is set and can be read by processor 16 when the interrupt line is set low. In the master chip mode, communication starts with a BF mode after power-on reset. After the mode is read, master MAN chip 22 goes to the NBF mode. One frame later, chip 60 goes from the NBF to the GC mode and stays in the GC mode thereafter. In the GC mode, the master chip digital transmission on MAN line 20 is enabled.

Control unit 10 transmits data to station units 18 or 36 to change outputs such as the ringer or lights or to echo back data received from the station units for the purpose of error detection. Table 2, 3 and 4 illustrates the data format for these output bytes along with their assignments to the registers either in control unit 10 or station unit 18 or 36 included within register file 58 within each of the chips. Normal data transactions are handled in single byte transfers summarized in Table 2. However, lesser used operations require two bytes of data summarized in Table 2. The format of the single byte transfers are illustrated in Table 3 and the two byte transfers in Table 4 below.

TABLE 3

Single Byte Data Transfer

| Register number - 4 bits | Value - 4 bits |
|---|---|

TABLE 4

Two Byte Transfer of Data the first byte

| 1000 (Reg #8) - 4 bits | secondary reg. # - 4 bits |
|---|---| the second byte

| eight bit value |
|---|

In the illustrated embodiment, all control information transfers from control unit 10 to a station unit 18 or 36 begin with a register number "8" or greater as these registers represent output terminals to the station unit. For a 2-byte data transfer, the first byte is sent in a time slot for a given station unit and the second byte is sent in the same time slot for the same station unit but in the very next time frame. Control unit 10 sends a NO ENERGY signal in a particular station's time slot if it has no information to transfer or if it is sending an error message. Control unit 10 sends a NO ENERGY by placing substantially zero voltage signal on MAN line 20 as opposed to the data 1 (+V) or 0 (−V) voltage level.

Station unit 18 or 36 transmits data during the signaling byte in its assigned time slot as depicted in time frame 106 in FIG. 6. If an error occurs, a NO ENERGY signal will be sent during its assigned time slot instead. Data transfers initiated by station unit 18 or 36 to control unit 10 are input data to the station unit and are sent on a priority basis as summarized in connection with Table 5 below. As summarized in Table 2, all transmissions in the illustrated embodiment initiated by a station unit 18 or 36 have a register number less than "8" as these registers represent input terminals to the station unit.

The debounced keyboard switch closure data has the highest priority of any data transfer initiated by station unit 18 or 36 so that keyboard data will not be lost from a fast sequence of key presses by a user. As summarized in Table 2, keyboard information is presented in registers #4 through 7. Each register has a 4-bit value which represents one of 16 keys. In register #6, the value 0 is reserved for "no key", that is, no key is pressed. Therefore, 63 possible key can be recognized and transferred.

Data which indicates the status of discrete inputs connected to input ports A or B has the next highest priority of data which can be sent by a station unit. This data is debounced and then sent as the contents of registers #2 and #3 as summarized in Table 2. Each bit value represents an independent status state, therefore, each register represents four inputs. These registers are sent from station 18 or 36 to control unit 10 during initialization and then individually every time thereafter whenever there is a change in one of the inputs connected to the ports A or B.

Station unit 18 or 36 sends "key-up" data "0", that is, register #6, value 0="no key", after each key has been pressed and is finally released, unless another key press is ready to be sent in which case the last key up is ignored. This procedure enhances key debounce routing in the microprocessor as well as sound feedback to key depressions.

The mode register is sent from station unit 18 or 36 during initialization as the register #0. After initialization, the same mode register data is sent as register #1 and has the least priority as it should rarely change so that if no data is available, the mode register is sent as an idle byte. Effectively, register position is being used in this case as a form of station information from station unit 18 or 36 to control unit 10.

As depicted in FIG. 6, the serial A and serial B data fields are each eight bits of data with no control signaling information. Control unit 10 instructs station unit 18 or 36 to receive serial data, send serial data or both. Control unit 10 will also instruct station units 18 or 36 to send and receive the serial A bytes only, the serial B bytes only, or both. If control unit 10 or station unit 18 or 36 receives any bit as NO ENERGY in a serial byte when it is selected, it will interpret the transmission as being no data. If control unit 10 or station unit 18 or 36 does not have data to send in the serial A or serial B bytes when it is selected, it will transmit a NO ENERGY signal. If a serial data stream (A or B) is selected, the byte in every time slot is available, except for the FF byte in the frame sync time slot.

To facilitate reliable communication, the MAN system uses an acknowledge type protocol to detect data and system errors. Basically, the acknowledge, ACK, is an echo of the byte received. When station unit 18 or 36 transmits a byte to control unit 10, station unit 18 or 36 expects to receive an echo of its transmitted byte (except the idle byte) back from control unit 10 in the station's next received time slot. If an echo is received, station unit 18 or 36 considers its byte as being accepted by control unit 10. If station unit 18 or 36 receives any other response from control unit 10 in the station's next received time slot, station unit 18 or 36 enters an error condition. In the error condition, station unit 18 or 36 will send a signal, NO ENERGY, in its next transmit time slot instead of new data.

When control unit 10 receives the signal, NO ENERGY, from station unit 18 or 36, it knows that station unit 18 or 36 has encountered an error. After station unit 18 or 36 transmits the signal, NO ENERGY, it will wait until the next available time slot and then retransmit the original byte. The process will then be repeated until the proper echo is received.

When control unit 10 transmits a byte to station unit 18 or 36, it also expects to receive an echo of its byte back from station unit 18 or 36 in that station's next received time slot. If a correct echo is received back, control unit 10 knows that station unit 18 or 36 has acted upon control unit 10's data correctly. If the data echoed back from the station unit is incorrect data or NO ENERGY, the control unit will retransmit the data at the next opportunity. The failure of station unit 18 or 36 to echo back control unit 10's byte correctly can occur for several reasons. One reason is the byte was received incorrectly by either the station unit or control unit. Another possibility is that station unit 18 or 36 has something of higher priority to send. When station unit 18 or 36 has more than one byte to send control unit 10, priority is set forth in Table 5 below which is used to determine which byte is sent first.

TABLE 5

| Priority | Action |
| --- | --- |
| highest | error condition - send NO ENERGY |
| . | retransmit data not properly echoed |
| . | echo back of secondary reg data |
| . | keyboard switch closure |
| . | switch change (input ports A and B) |
| . | echo back of received data |
| . | key up command |
| lowest | register #1 (register #0 before initialization) |

Note that station unit 18 or 36 always sends data to control unit 10 in its time slot except for an error condition. If station unit 18 or 36 has no new data to send, then it will send contents of register #1. If station unit 18 or 36 sends a signal, NO ENERGY, then station unit 18 or 36 is in an error condition. The transmission of the contents of register 190 1 do not require an echo back from control unit 10 when they are transmitted by station unit 18 or 36.

Consider now the sequence of events which characterize control communication on the single two-wire pair. After successful power-up, a 42 kilohertz reference signal is transmitted on MAN line 20. As soon as the master chip in control unit 10 achieves good communication, mode GC, it begins to transmit. A frame sync is transmitted at the beginning of each frame. After the first byte of data is received by control unit 10 in a time slot dedicated to a station, control unit 10 recognizes that a station unit is on-line in that time slot. If control unit 10 receives four consecutive frames of no energy in that control unit's time slot, it will take the station unit in question off-line.

After a station unit is on-line, control unit 10 is now ready to accept data from and send data to that station. Consider first the reception of data by control unit 10. Each time a valid input byte of data is received from a station that is on-line, control unit 10 reads the data and echoes the same data byte back to the respective sending station unit at the first opportunity. A valid input byte of data is a byte which has no bits at the no energy or zero voltage level and the most significant bit is a logical 0. If there is a signal or energy in the next byte received from the station unit in question, it means the previous data byte received was good and control unit 10 may safely act upon it. However, if there is a NO ENERGY bit in the next byte, then the previous data byte may be in error and the transmission is ignored.

The first byte received from a station unit after it comes on-line is the input port B data. In control unit 10, this establishes the states of inputs B switches or register #3 for that particular station unit. After station unit 18 or 36 sends the initial inputs B information, the station unit only sends changes to inputs B to control unit 10.

Next, the input port A data is received from the station unit corresponding to the states of inputs A switches or register #2, and is treated in the same manner as input port B data described above.

After the input port A data, control unit 10 is sent mode information in the form of the address and contents of register #0 which communicates the station unit's mode or configuration. Station unit 18 or 36 continues to send register #0 an idle byte until control unit 10 resets the initialization status bit in the station unit, which will then cause the station unit to send an idle byte in the form of the address and the contents of register #1.

Control unit 10 is now ready to accept new input data from the station unit in question as long as it is on-line. If the byte has energy in it, but is not a valid input data, i.e. the most significant bit is equal to a 1, then NO ENERGY is sent in the next opportunity to the station unit to show an error.

Consider now how data is transmitted from control unit 10 to station unit 18 or 36. Each time control unit 10 sends a byte of data to station unit 18 or 36, control unit 10 looks at the next byte of data received from that station unit if the next received byte is the same data that control unit previously sent, then control unit 10 knows that station unit recognized the previous transmission and acted upon it. If the next byte sent by the station unit is anything else, the possibility exists that data was in error and it will be resent by control unit 10 at the next time slot opportunity for the station in question.

After a station unit comes on line, control unit 10 sends the message to set the initialization status bit in the station unit to unlock the keyboard and set its mode into register #1. Control unit 10 then sets all the registers in the station unit to the desired states according to the operational mode indicated by the station unit. After control unit 10 has set the registers in station unit 18 or 36 to the desired states, control unit 10 will only send energy to the station unit when it has something for the station unit to act upon. The idle byte for transmission from control unit 10 is the NO ENERGY signal.

Consider now the operation of a station unit 18 or 36. After power-up when the power supply voltage is high enough, the voltage control oscillator 100 as shown in FIG. 2a starts oscillating and an internal basic clock generator 82 starts. Station unit 18 or 36 uses the 42 kilohertz signal from control unit 10 to phase lock the basic clocks to those within control unit 10.

After the power supply voltage is high enough, and a hardware generated time delay period is passed and after the basic clocks are running, a power-on reset (POR) is issued by logic circuit 103 within the chip 60. Power on reset circuit 103 sets the communication logic to a bad frame condition, which means that it is not synchronizing to the frame sync signal, FFF5, transmitted from control unit 10. Power-on reset circuit 103 also initiates a sequence to initialize all the registers within the register file 58. Power-on reset circuit 103 also loads logic circuitry 59 in chip 60 with the station unit's unique station number and the mode in which it is to operate from externally set switches so the logic knows how to interpret incoming signals and how to configure its inputs and outputs. Power-on reset circuit 103 also starts the timing clocks and sets the transmit data register states to the NO ENERGY level.

After operation of power-on reset circuit 103, the communication logic (circuit 59) looks for the frame sync, FFF5, bit pattern in the digital communication channel. If the frame sync is not found within a predetermined time, internal timing is adjusted to differentiate one of seven possible timing combinations. The logic continues to time out every four timing frames and walk to the next tiring state until the frame sync bit pattern is recognized. When the frame sync is recognized, communication logic moves to a state called not bad frame, NBF.

The communication logic continues to look for the frame sync in the time slot where it is expected. If the frame sync is not found in the expected time slot in three tries, the logic goes back to the bad frame condition. If the frame sync is recognized, the logic goes to the good communication condition. The logic assumes the time slot position based on the station number and the station unit is now ready to communicate to the control unit 10. Anytime the station unit does not see the frame sync in the expected time slot, the state of the station unit returns to the not bad frame communication status.

Consider now the transmission of data by a station unit. The first thing the station unit sends to control unit 10 is switch inputs B data, then switch inputs A data and then the mode register information from register #0. After that, station unit 18 or 36 will send changes to inputs A and inputs B or send the register #0 an idle byte. After station unit 18 or 36 sends a first contents for register #0, it can receive data from control unit 10. The keyboard of the station unit is inactive until it receives an instruction from control unit 10 to reset the initialization status bit. After the initialization status bit is reset, the keyboard is active and station unit 18 or 36 sends its mode as register #1 for the idle byte. The station unit is now in full communication with control unit 10 and can receive and send all types of data.

Consider generally the reception of data by station unit 18 or 36. When the station unit receives valid data, that is the bits all have energy at the plus or minus logic level voltage in its station byte, it will react to the data according to that data and past history. For example, if the station unit sent input data at the last opportunity, an echo back flag is set and it compares received data to the sent data. If the data does not compare, the station unit will send a NO ENERGY signal to tell control unit 10 that there was an error and will send the correct data again at its first available time slot opportunity. No new data will be accepted until correct echo back is received. If the data compares, the echo back flag is reset and the station unit is ready to accept new data from control unit 10 or send additional input data.

Turn now to Table 6 which illustrates how input data takes precedence over output data in station unit 18 or 36.

TABLE 6

| Station Unit | Control Unit |
| --- | --- |
| (ignore output data) | <---- output data |
| input data ----> |  |
| (set echo flag) | input data |
| input data | <---- input data |
| (reset echo flag) |  |
| new input data or idle ----> | If any data, use last input data. If new input, echo back at next opportunity. If idle, resend output data at next opportunity |

Output data could be sent from control unit 10 to station unit 18 or 36. But if the station unit has input data to send to control unit 10, it will ignore the received data from control unit 10 unless it is expecting secondary data such as when a secondary register flag is set.

If a station unit is clear to receive new data, it tests the most significant bit (MSB) to make sure it is valid output data and if valid, it uses the data and echoes the data back to control unit 10 at the next opportunity. If the register field is "8", the station unit recognizes this as the first byte of a 2-byte instruction and sets the secondary register flag. The last four bits of this instruction tells the station unit where to put the second byte. If the secondary register is reset, and the data is input data (MSB=0) then the data is ignored and a NO ENERGY signal is sent to the control unit at the next opportunity to show an error as summarized in the depiction of Table 7.

TABLE 7

| Station Unit | Control Unit |
| --- | --- |
| idle or echo-back of output data ----> |  |
| input data <---- |  |
| NO ENERGY ----> | NO ENERGY received. If control unit sent input data last time as echo-back, ignore the data. If control unit sent output data last time, resend output data. If control unit sent NO ENERGY last time, count 1 toward off-line |

If the secondary register flag is set because the station unit is expecting a byte of data, and the received data is valid, the station unit loads the data into the appropriate register and echoes back the data to control unit 10 at the first opportunity. The secondary register flag is then reset. If the secondary register flag is set and the data is a no energy signal, the station unit resets the secondary register flag and sends a no energy signal to control unit 10 at the first opportunity to show an error as depicted in Table 8 below.

If the echo back flag and secondary register flag are both reset and the station unit receives the NO ENERGY signal, it accepts this as an idle byte and sends the contents of the mode register as an idle byte or sends new input data when it is detected at the next opportunity.

Consider now the transmission of data from the station unit according to the priority in Table 5. The highest priority for transmitting NO ENERGY signals error condition and this can occur when:

(1) input data was sent by station unit at the last opportunity (echo back flag set) and new data received does not agree as summarized in the scenario illustrated in Table 9;
(2) input data (MSB=0) is received as new information from control unit 10 with the echo back flag reset as summarized in Table 7; and
(3) secondary data is expected, that is the secondary flag is set, and a NO ENERGY signal is received resulting in the error condition as summarized in Table 8.

TABLE 8

| Station Unit | Control Unit |
|---|---|
|  | <---- "8 (register number)" |
| "8 (register number)" ----> | correct echo back |
| Reset secondary flag bit regardless of data received or NO ENERGY | <---- secondary data |
| ----> | NO ENERGY or incorrect data |
|  | <---- NO ENERGY |
| ----> | If idle, resend "8 (register number)". If input data, echo back in next appropriate time slot and resend "8 (register number)" at next opportunity |

The next highest priority for the station unit is retransmission of data not properly echoed back. This occurs after a NO ENERGY signal has been sent to show an error so that the control unit 10 knows not to act on the data in error. The input data will continue to be resent until proper echo back is received and the echo back flag is reset.

The next priority is the echo back of the secondary register data. This has a high priority because after the transmission of the first byte of a 2-byte instruction from control unit 10, the second byte must be received and echoed back and secondary flag reset to prevent data errors. If the station unit 18 or 36 is expecting the second byte of a 2-byte instruction with the secondary flag set, and NO ENERGY signal is detected, station unit 18 or 36 sends back a NO ENERGY signal and resets the stationary flag as depicted in the scenarios of Tables 8 and 10.

TABLE 9

| Station Unit | Control Unit |
|---|---|
| input data, (set echo back flag) ----> |  |
| NO ENERGY or incorrect data | <---- |
| NO ENERGY ----> | NO ENERGY, ignore last data |
|  | <---- |
| resend data ----> |  |

The next priority is the keyboard switch closures. During normal operation, this is the highest priority since switch input data has priority over output data as was depicted in Table 6. This technique is combined with a key stack to prevent loss of data from fast key entries with minimal impact of system response time.

The next priority is a switch change data which was discussed above in connection with Table 5. These inputs are for slower response type inputs such as off hook switch, two position switches and the like.

The echo back of received output data is the next highest priority. Output data is stored in the memory in control unit 10 and cannot be lost by a delay in being serviced. Therefore, output data is only prioritized over noncritical input data. The communication protocol is illustrated in Table 11 in the case where an error is echoed back and in Table 11a in the case where output data is erroneously received by the Control Unit.

TABLE 10

| Station Unit | Control Unit |
|---|---|
|  | <---- "8 (register number)" incorrect data |
| ----> |  |
| If "8 (register number)" received last time, reset secondary flag | <---- NO ENERGY |
| NO ENERGY ----> | NO ENERGY |
|  | <---- resend output registers* |

*An error has been detected by the control unit, all output registers are restored for the station unit involved.

TABLE 11

| Station Unit | Control Unit |
|---|---|
|  | <---- output data |
| ----> | NO ENERGY or incorrect data |
| NO ENERGY, reset secondary flag | <---- NO ENERGY |
| input data or idle ----> |  |
|  | <---- resend output data at first opportunity* |

*An error has been detected by the control unit, all output registers are restored for the station unit involved.

The key up command "60" is sent so a tone can be presented to an earpiece as long as a key is pressed. When one key is followed closely by another key, switching from one key to the next key tone without interruption is not a problem so that no key up is required. Therefore, if another key is ready to send before the key up is sent, the new key is sent and the key up from the previous key is ignored.

Finally, the contents of the mode register, register #0 or #1, is sent as an idle byte only if there is nothing else to send from station unit 18 or 36.

Station unit 18 or 36 holds all output data in its registers. These registers are initialized by the power-on reset 103 and are set to other states by control unit 10. If a station unit 18 or 36 goes off-line for any reason, such as being unplugged or plugged back into another location, the output registers are restored by control unit 10.

TABLE 11A

| Station Unit | Control Unit |
|---|---|
|  | <---- NO ENERGY or echo back of input data |
| ----> | output data |
|  | <---- resend output data at first opportunity* |

*An error has been detected by the control unit, all output registers are restored for the station unit involved.

Voltage Controlled Crystal Oscillator

A small and economically fabricated CMOS voltage controlled crystal oscillator is provided by coupling three inverter amplifiers in series with a regenerative crystal controlled feedback loop. The first and second CMOS inverters have output nodes whose impedances are modified by a CMOS impedance modulating circuit. Also coupled to each of these two output nodes is a CMOS transistor shunt capacitor. The impedance of the output node is modified according to the magnitude of a voltage control signal applied to the CMOS modulating circuits. The self-bias of the modulating circuits is maintained substantially constant by adjusting the gate drive in each of the modulating circuits according to gate drives derived from a dummy modulating circuit. The dummy modulating circuit has as one input the voltage control signal and as its compensating gate drive, a control signal derived from a feedback loop from a dummy output node in such a manner that the self-bias of the dummy modulating circuit is maintained substantially constant. The compensating gate drive from the dummy modulating circuit is then coupled to the appropriate compensating gates within the impedance modulating circuits in the voltage controlled oscillator.

Figures 7, 7A:
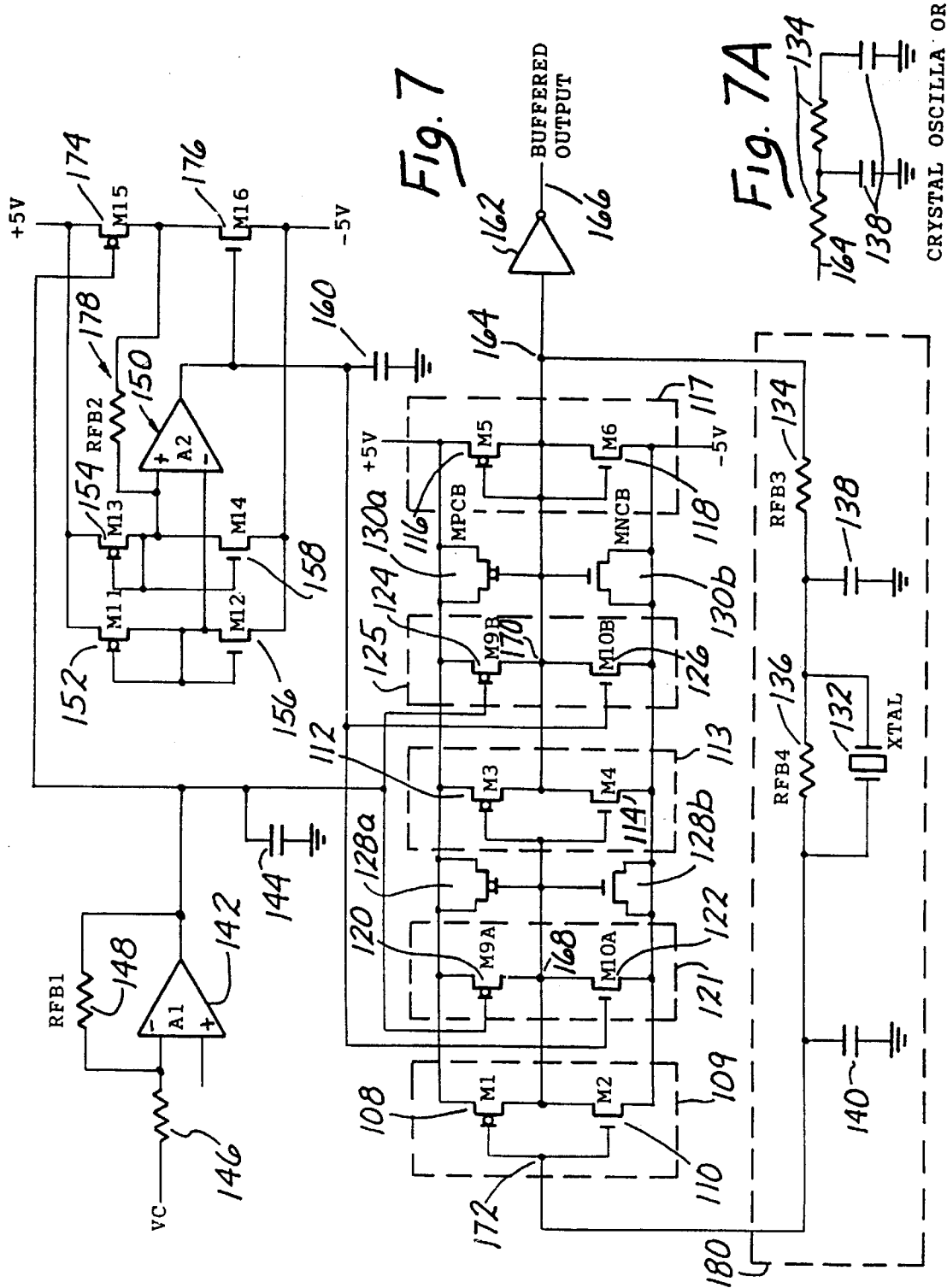
FIG. 7 is a schematic diagram of an improved crystal voltage controlled oscillator used in the circuit of FIG. 2.

The ultimate function of the oscillator of FIG. 7 is to provide a circuit to generate an output voltage with a fundamental frequency which is under the control of quartz crystal 132 and yet can be continuously adjusted above and below the natural resonant frequency of crystal 132 by a slowly adjustable analog voltage, VC. The circuitry of FIG. 7 is shown in an implementation which is particularly compatible with CMOS integrated circuit design. The circuit is also of such a nature as to be deposed within a small chip area in communication and other types of integrated circuits.

The oscillator of FIG. 7 forms a phase shifted controlled regenerative crystal oscillator which oscillates at a fundamental frequency at which the regenerative loop exhibits an overall phase shift of zero degrees and a loop gain equal to or greater than 1 (or zero decibels). A DC bias is sensed and currents are established in the phase shift transistors in the voltage controlled oscillator to control phase shift over acceptable limits without saturating the inverter amplifiers to which they are attached.

The components of the circuitry of FIG. 7 are fabricated in an inexpensive CMOS integrated circuit and therefore include well matched components which are inexpensively manufactured. All the components of the circuit of FIG. 7 are fabricated in an integrated circuit form which the exception of the crystal feedback loop generally denoted by the elements within dotted outline 180.

FIG. 7 is a schematic diagram of a voltage control crystal oscillator according to the invention. The oscillator is comprised of three inverting amplifiers 109, 113 and 117, two output impedance modulating stages 121 and 125, two shunt capacitors stages 128a and b and 130a and b, feedback controller elements 180, an operational amplifier 142, a special inverting control amplifier 150–158, 174, 176 and 178, and an oscillator output buffer amplifier 162.

The first amplifier 109 of the three inverting amplifiers is comprised of PFET 108 and NPFT 110. The second amplifier 113 of the three inverting amplifiers is comprised of PFET 112 and NFET 114. Finally, the third amplifier 117 of the three inverting amplifiers is comprised of PFET 116 and NFET 118. The first of the two output impedance modulating stages 121 is comprised PFET 120 and NFET 122 while the second of the output impedance modulating stages 125 is comprised of PFET 124 and NFET 126. The shunt capacitors stages in turn are comprised of PFETs 128a and b and NFETs 130a and b. The feedback control elements 180 comprise crystal 132, resistors 134 and 136 and capacitors 138 and 140. The initial control stage is comprised of operational amplifier 142, output capacitor 144 and summing resistors 146 and 148. The special inverting control gain stage is comprised of operational amplifier 150 in combination with bias tracking stages which in turn are comprised of PFETs 152 and 154 and NFFTs 156 and 158 feedback resistor 178 with output capacitor 160. The oscillator output buffer amplifier 162 is coupled to the output of the three inverting amplifiers.

The circuit described above in connection with FIG. 7 generates an output voltage signal at nodes 164 and 166 with a fundamental frequency which is at or very near the frequency at which feedback crystal 132 is cut or is natural series resonance. The frequency of the output voltage signal at output nodes 164 and 166 is continuously controllable within a small band of frequencies around the natural series resonance of crystal 132. The fundamental frequency of the output voltage signal of the oscillator of FIG. 7 is continuously controllable by slowly varying an analog voltage VC at the input to a summing resistor 146.

The first inverting amplifier 109 and second inverting amplifier 113 each exhibit a nominal phase shift of 180 degrees due to their inverting characteristic plus an excess phase lag of approximately minus 45 degrees at the oscillator frequency. The excess phase shift of first inverting amplifier 109 is caused primarily by 4 lag network comprised of the shunt gate capacitance of FETs 128a and b at node 168 combined with the dynamic output impedance of FETs 108, 110 120, and 122 at node 168. The excess phase shift of the second inverting amplifier 113 is caused primarily by a lag network comprised of the shunt capacitance of FETs 130a and b at node 170 combined with the dynamic output impedance of FETs 112, 114, 124 and 126 which are also coupled to node 170.

The excess phase lag of these two inverting amplifiers 109, 113 is therefore approximately minus 90 degrees. An excess phase shift of minus 45 degrees was chosen since this produces the maximum rate of change of phase shift per volt of control, VC. The exact amount of excess phase lag can be adjusted by analog control voltages applied to the gates of FETs 120 and 122, and 124 and 126 which modulate the net dynamic output impedance at nodes 168 and 170 respectively. The particular excess phase shift of each of these two inverting amplifiers is adjusted so that the overall phase shift around regenerative loop of the oscillator in FIG. 7 is at the desired frequency of oscillation, but is sufficiently close to the natural series crystal frequency to allow the crystal to maintain control. Control with the use of two stages was selected to yield a larger phase shift in degrees per volt thereby extending the useful control range of the design.

At DC and low frequencies, the feedback from output node 164 to input node 172 is degenerative and therefore the oscillator of FIG. 7 is self biased to a Class A condition, thereby ensuring that oscillation will always build up at any higher frequency which the overall phase shift is zero degrees and the voltage gain is equal to or greater than zero decibels.

When the control voltage, applied to the gates of FETs 120 and 124 goes more negative, a control voltage applied to the gates of FETs 122 and 126 must go more positive by just the right amount so that the drain current of FET 120 is equal to the drain current of FET 122 and similarly the drain currents of FETs 124 and 126 are equal to produce essentially no displacement current at nodes 168 and 170 respectively. Maintaining essentially zero displacement current at nodes 168 and 170 is necessary to sustain self-bias of the overall oscillator loop independent of the analog control voltage, VC, which is applied to summing resistor 146.

The balance of these currents is realized using an auxiliary pair of FETs 174 and 176 which have operational characteristics similar to control FETs 120, 122, 124 and 126. The common drain voltage of auxiliary control pair 174 and 176 is maintained at a centering voltage of approximately zero volts by developing an unique voltage at the gate of FET 176 to just balance the drain currents of the two FETs 174 and 176.

The correct balancing voltage is provided by operational amplifier 150 in combination with feedback resistor 178.

The input nodes of operational amplifier 150 are biased to the same self-bias as realized by the overall oscillator loop using FETs 152, 156, 154, and 158 which in turn have operational characteristics similar to FETs 108, 110, 112 and 114.

The use of MOS FET transistors 128*a* and *b* and 130*a* and *b* as the phase shift capacitors within the circuit allows for better access phase shift control because the gate capacitance of MOS FET transistors 128*a* and *b* and 130*a* and *b* can be manufactured to match the gate capacitance of the input FETs 108 and 110 respectively.

The use of shunt control elements 120, 122, 124 and 126 to modulate the dynamic output impedance of the amplifier also allows for a good phase shift control over a large signal swing.

The combination of a simple amplifier as typified by amplifier 109 with modulation of its output impedance by FETs 120 and 122 and with fixed capacitors 128*a* and *b* as loading elements to form a control phase shift amplifier is particularly well implemented in CMOS integrated circuit design.

The oscillator of FIG. 7 is also particularly characterized by the use of two voltage control stages to extend the useful control range of the oscillator.

The network in FIG. 7A can be substituted for resistor 134 and capacitor 138 which improves the performance for some characteristics of amplitude and phase shift of inverting amplifiers 109, 113, and 117 and associated circuitry 121, 124, 128*a* and *b*, and 130*a* and *b*.

Light Emitting Diode Driver Circuit

A low power, low noise driving circuit for a bank of LEDs utilized in the station units of the MAN system is provided by coupling each bank of LEDs in a series circuit between the voltage supply and a constant current source. Each LED has a controllable logic switch in parallel across it and the switches are further in series circuit with each other to form a ladder network. Any selected LED may be turned off by closing its corresponding logic switch. The current continues to flow then through the shunting switch into the remaining LEDs in the series circuit that are on. A plurality of such ladder networks may be coupled in parallel with each other and each ladder network controlled by a switching gate which selectively couples it to the constant current source so that the LED ladder networks are operated at a predetermined duty cycle. Current spikes are avoided across the voltage supply by driving the connecting control gates in an overlapping relationship so that the constant current source is never disconnected from the voltage supply.

Figure 8:
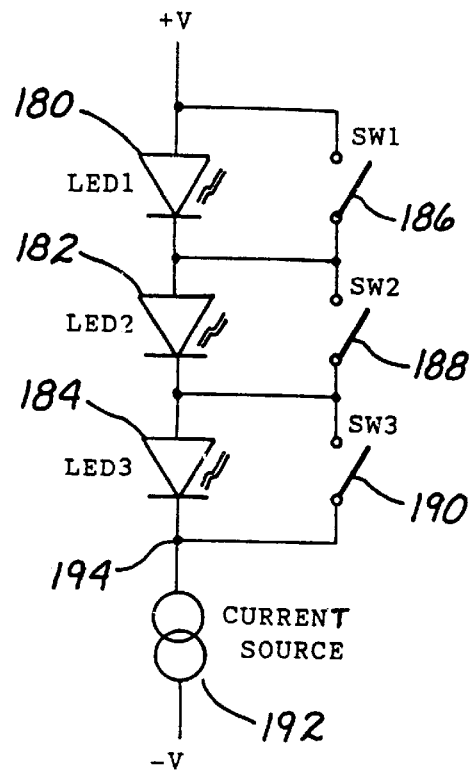
FIG. 8 is a simplified schematic showing the circuit of the invention for driving a bank of LEDs in the telephone station units.

Turn to FIG. 8 which is a simplified schematic of a first embodiment of the invention. A supply voltage V is coupled to a serial bank of LEDs 180, 182 and 184. Coupled in parallel across each LED 180–184 is a logic switch 186, 188 and 190 respectively. The bank of LEDs 180–184 is coupled to the opposing rail of the voltage supply through a constant current source 192. When switch 186 is closed, current flows through switch 186 and LED 180 is turned off since the voltage across LED 180 is close to zero volts and so below its threshold voltage. When logic switch 186 is opened, all the current flows through LED 180 and it emits light. When switches 186–190 are all open, the same current flows through each of the LEDs 180–184 and they all emit light.

For most current sources, the voltage at node 194 between the bottom LED 184 and current source 192 must be some minimum voltage above the negative voltage of the voltage supply in order for the current to remain relatively constant through current source 192. The maximum number of LEDs that can be placed in series is then determined by the collective maximum voltage drop of the LEDs and the difference between the voltage supply V and the minimum voltage V1 at node 194. If some LEDs cannot logically be on at the same time, then more LEDs can be added to the number of LEDs in series, but the resistance of the switches 186–190 must be considered in the design. If the switch impedances do not add to the total voltage drop as would be the case in a circuit as realized and shown in FIG. 8 (i.e. the worst voltage drop being with all LEDs on and the "not all on at once" option above is not used to increase the number of serviced diodes), then switches 186–190 need only to keep the voltage across each corresponding LED to a level that does not emit visible light and can therefore be a relatively high impedance switch.

Figure 9:
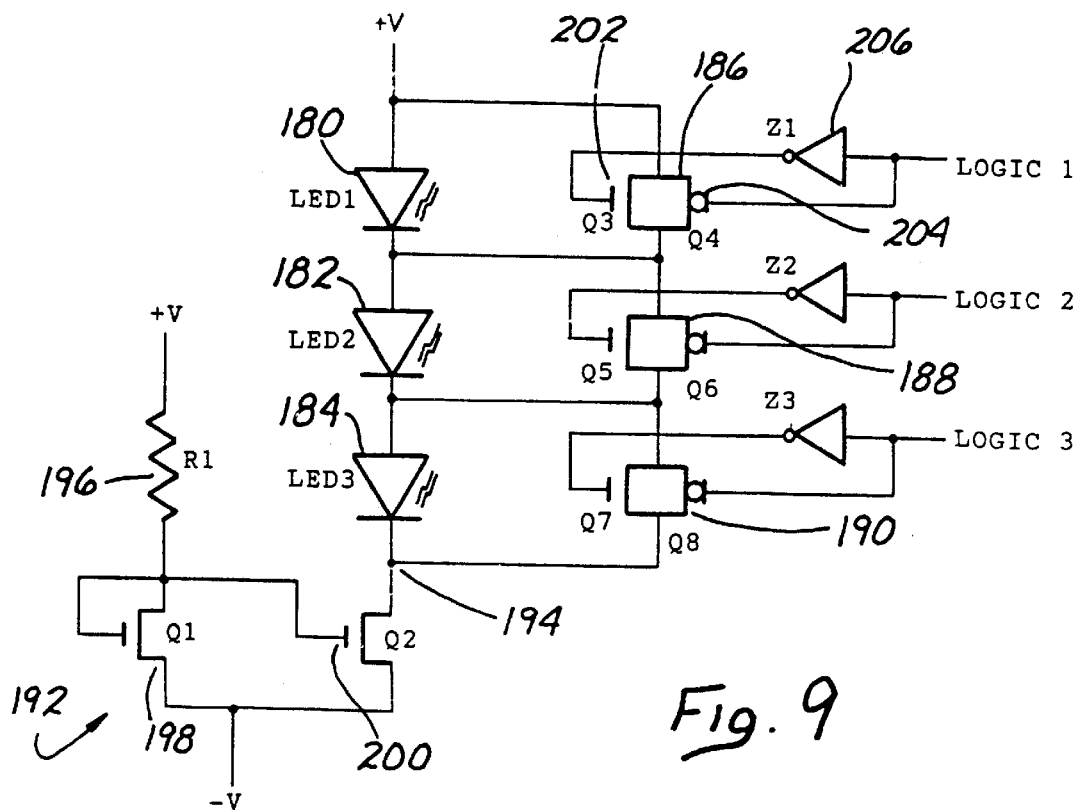
FIG. 9 is a schematic of an illustrated example of one implementation of the circuit of FIG. 8.

FIG. 9 is a schematic diagram of a MOS FET embodiment for implementation in an integrated circuit corresponding to the schematic diagram of FIG. 8. The analogous circuit portions bear the same reference numerals. Constant current source 192 is comprised of a resistor 196 and two NFETs 198 and 200. The specific design of the constant current source circuit 192 is not material to the invention and therefore will be not further described. Each switch 186, 188 and 190 is comprised in turn of MOS FET bilateral transistors 202 and 204 with common connected sources and drains across the gates of which is coupled an inverter 206. Again, the specifics of the switching element as shown in FIG. 9 are not material to the invention and therefore are shown in FIG. 9 only illustratively. The circuitry in FIG. 9 for example is a CMOS circuit but the circuit could be easily adapted to be implemented either as an NMOS or PMOS design if desired without departing from the scope of the invention.

Figure 10:
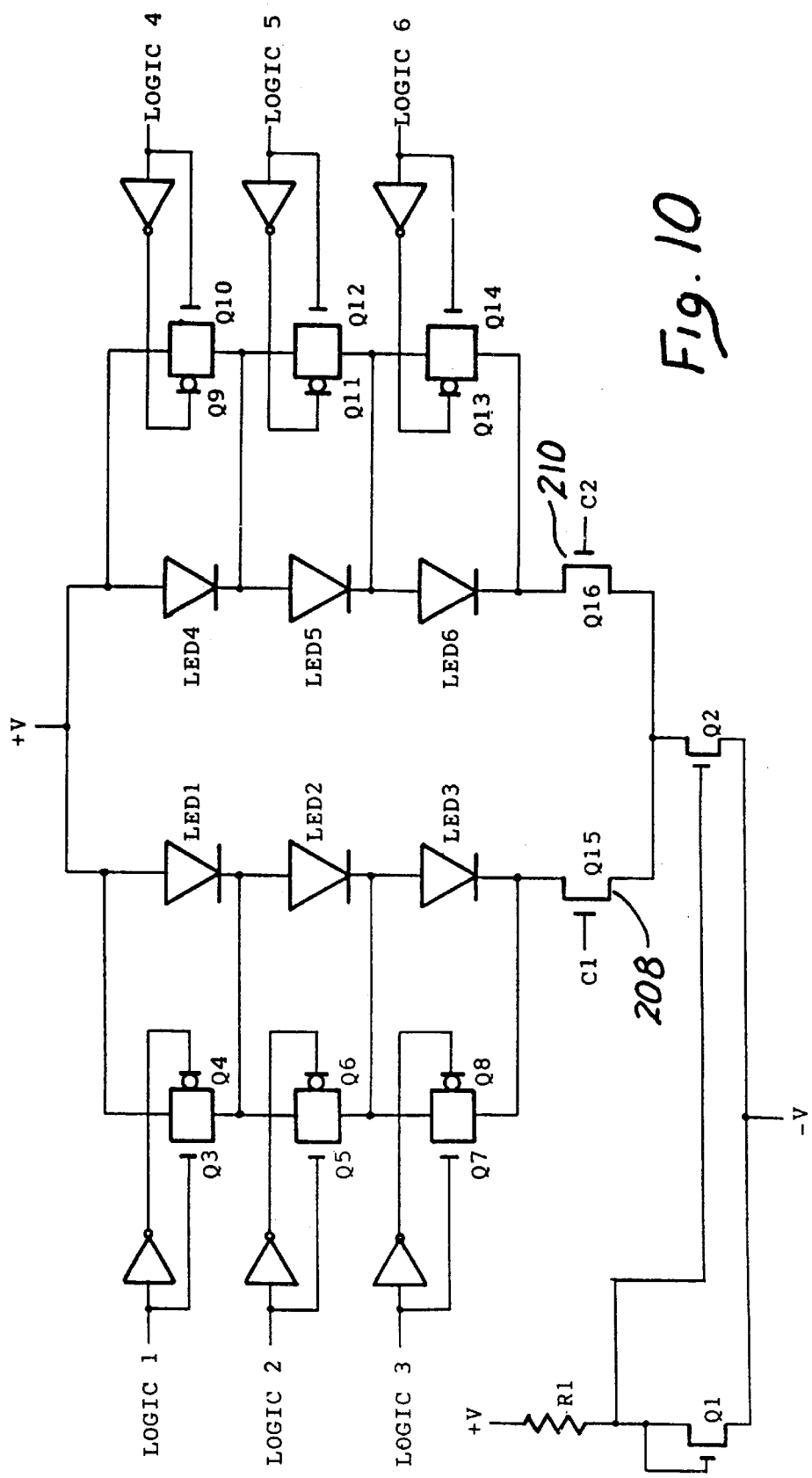
FIG. 10 is a schematic of an embodiment similar to that of FIG. 9 wherein it has been designed to operate as a 50% duty cycle.
Figure 11:
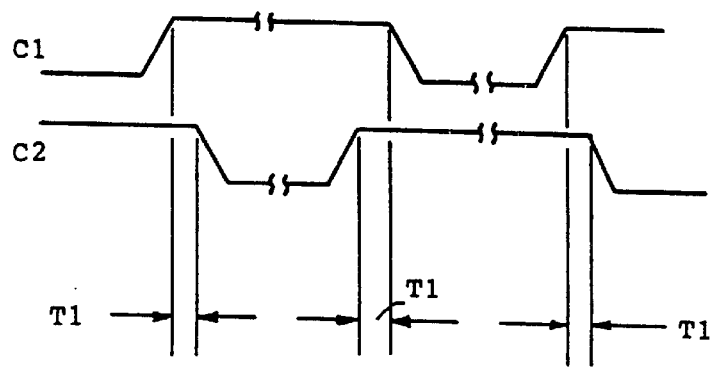
FIG. 11 is a timing diagram for the control signals used in FIG. 10.

FIG. 10 is a schematic of a circuit similar to that shown in FIG. 9 with the exception that the circuitry of FIG. 10 is adapted to operated at a 50 percent duty cycle while the circuitry of FIGS. 9 and 8 is designed to operate at a 100 percent duty cycle. In other words, added to two identical switch and LED banks are control gates 208 and 210 which are driven by complementary square wave drive signals such that both banks of LEDs are gated on only for a short overlapping time at the beginning and end of each clock cycle. At all other times the LED banks are alternately on or off. The resistance of gates 208 and 210 is important in determining the number of LEDs that can be coupled in series and should be relatively low. The time overlap between the control signals, T1 as shown in diagrammatically in the timing diagram of FIG. 11, is important because if gates 208 and 210 were both simultaneously off, a current spike would occur at the minus or plus voltage supply nodes.

A circuit similar to that shown in FIG. 10 can be constructed and operated in an analogous manner with other corresponding duty cycles simply by adding additional banks of LEDs and switches and corresponding gate controls in the same manner as FIG. 10 extends the circuitry of FIG. 9. In other words, to accommodate three LED and switch banks a 33⅓ percent duty cycle can be needed, the addition of four LED and switch banks will require a 25 percent duty cycle and so forth.

Driving a series bank of LEDs using a constant current source has the advantage of providing consistent light emission from the LEDs with lower maximum current used in the circuit. Switching the LEDs in series using parallel logic switches permits complete display flexibility without changing the current demands or creating current spikes in the power supply lines. The circuitry shown in concept in FIG. 8 can be simply implemented in integrated MOS FET form as depicted by the examples in FIGS. 9 and 10. The methodology can be easily adapted to a wide variety of duty cycles and series diodes banks, some of which are shown in the examples of FIGS. 9 and 10. The variable duty cycles can be implemented without causing current spikes in the power supply lines by utilizing gating clocks which include an overlap in the control signals. If because of the particular application the possibility arises that any one of the LEDs would logically never be on at the same time as selected other ones, the number of LEDs in series circuit can be increased even beyond what which might otherwise be tolerated by constant current source 192, however switch resistance voltage drops need to be considered in such cases. It should be evident that the circuit design of FIGS. 8–11 is also readily adaptable to bipolar transistor design.

Automatic Timing Compensation for a Communication Line

In the illustrated embodiment, the system is shown in FIG. 1 is comprised of control unit 10 coupled to a twisted wire pair 20 which in turn is coupled to a plurality of remote station units 18 or adapter boxes 36. Control unit 10 contains all the logic for controlling the communication on line 20. Adapter boxes 36 can be treated as the same as station units 18 when considering and discussing automatic timing compensation. Control unit 10 and station units 18 and 36 are synchronized to a common reference signal which sets their receive timing.

The transmit timing is then adjusted so that regardless of the amount of line connected within the allowed limits of line length, the signals will be received by control unit 10 and each of station units 18 and 36 at approximately the same time relative to the receive timing regardless of the point from which they were transmitted.

The main component or cause of delay time is the line capacitance of line 20. When the system of FIG. 1 is initialized, a transmit advance signal or time is preset according to the invention to accommodate a line that is near the middle of the permitted line length and of average type. The effective capacitance is then measured by circuitry within control unit 10. The adjusted advance time is then set in the control unit 10 and communicated to each of the station units 18 and adapter box 36.

Once the transmitted advance time of station units 18 and adapter boxes 36 are adjusted, the system of FIG. 1 is optimized for delay characteristics of the line. Line 20 is then tested and readjusted periodically to compensate for any changes which may have occurred to the capacitance on line 20 such as the addition or removal of stations, wire, or adapter boxes from it.

The solution of the invention provides an improved performance over a fixed advance time as is common in the prior art and can be easily integrated with other circuitry to provide a low cost solution to the problem. In addition, an advance timing misadjustment can be detected at control unit 10 and can be established for each separate station unit 18 and 36 and the transmit advance time for each station unit 18 or 36 can be finely tuned either using a static adjustment or a dynamic setting dependent upon the communication task at hand for each station unit 18 and 36.

Figure 12:
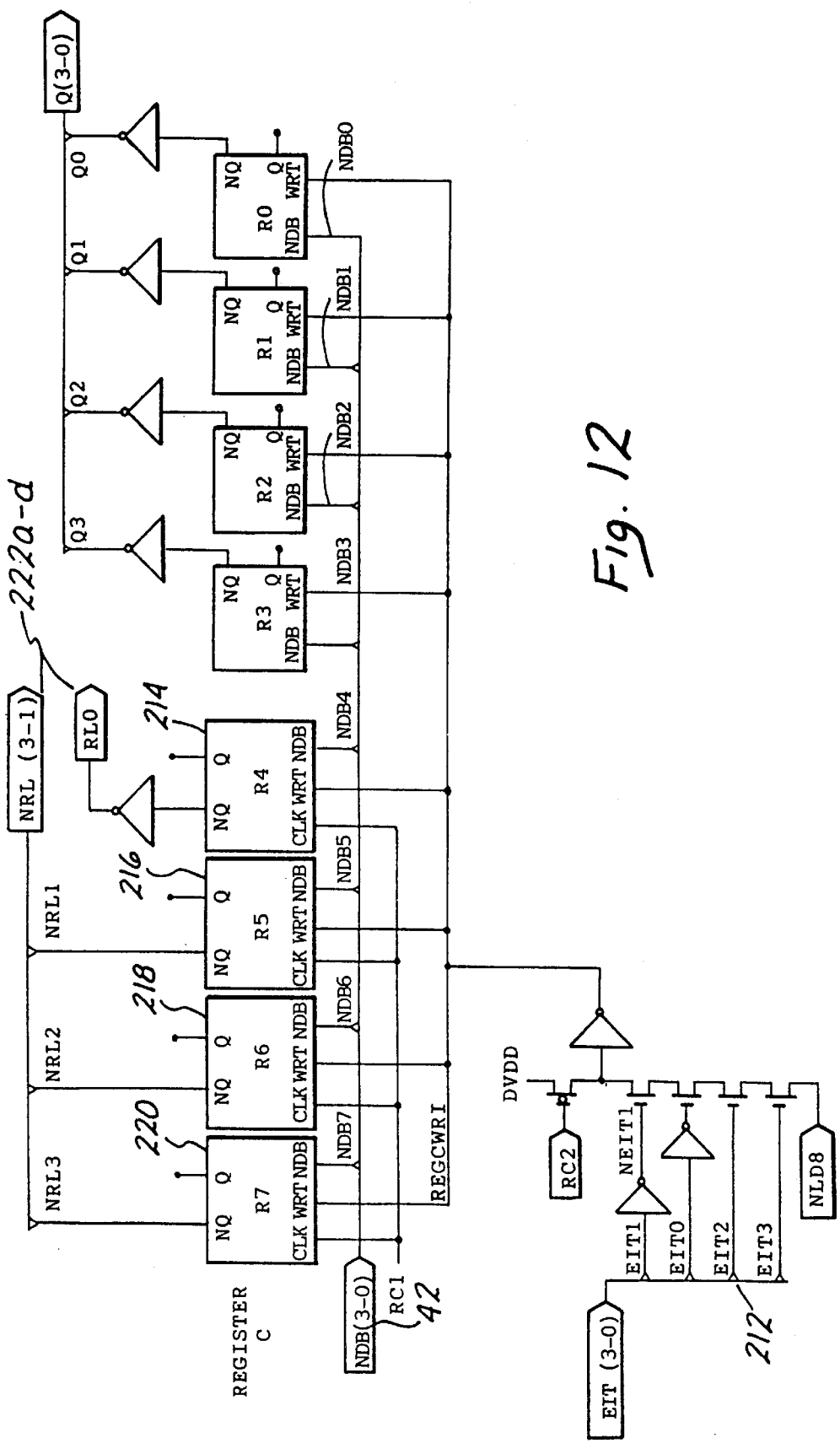
FIG. 12 is a block diagram of a portion of the register wherein the automatically updated transmit advance time is stored.
Figure 13:
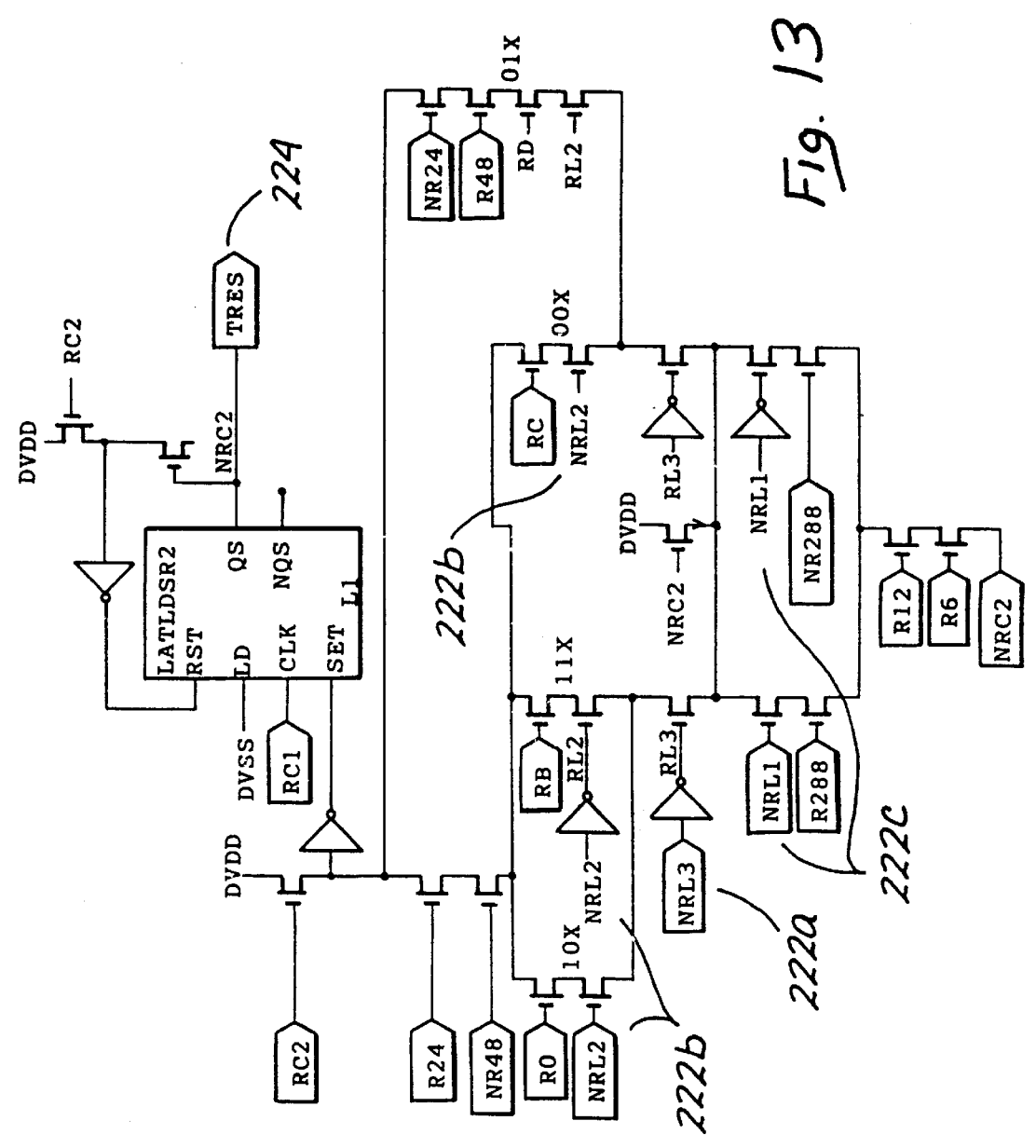

The implementation of the invention is illustrated in the schematic diagram of FIGS. 12 and 13. In FIG. 12, the transmitted advance time or data appears on data bus 42 after being communicated from control unit 10 as described in connection with the block diagram of FIG. 1. In the illustrated embodiment of FIG. 12, register C is used for storage of the transmit advance time Register C is one of many contained in the MAN chip of FIG. 2 in its register file 58. In particular, bits 4–7 are used to carry the transmitted advance time. The transmitted advance time is then written into register bits 214–220 included within register file 58 of FIG. 12 as controlled by decoder 212 and by the register write command, REGCWRT. The contents of registers 214–220 are then available to the internal logic within the circuitry of FIG. 2 on discrete control and logic lines 222.

Turning to FIG. 13, these control signals are now available in logic control circuitry included within control circuit 59 of FIG. 2a to be used in conjunction with a plurality of thing signals to adjust a timing control signal, TRES at output node 224 which is used in the internal control logic of control unit 10 of FIG. 1 to determine the difference between the transmit time of data from the station unit to the receive time. Inasmuch as the circuitry of FIG. 2a is shared in common between control unit 10, station units 18 and adapter box 36, the control and timing circuitry described in connection with FIGS. 12 and 13 is also equally applicable and available for use in connection with station-to-station or station-to-adapter-box communication. The details of the circuit diagram of FIG. 13 have not been described since they are largely immaterial to the concept and understanding of the invention, although they are illustrated in the Figures in a specific embodiment.

A Low Cost Adaptive Echo Balance Methodology

The invention is an interface to a communication line which compensates for various line lengths, the type of line and other devices coupled to the line. The circuit operates to attenuate echo caused by these and other line variations. The technique described is adaptive and can be updated periodically to adjust for a device being added or deleted from the line and other line lead changes. Turn to FIG. 14 wherein a block diagram of the illustrated implementation of the invention is illustrated. A control unit 10a is provided such as a control unit of a key telephone system which controls all the signaling and interfaces to central telephone office lines 12 in FIG. 1. Control unit 10a is coupled as will be described below to station unit 18a which for example may be a key telephone handset. Control unit 10a and station unit 18a play much the same role as control unit 10 and station unit 18 or 36 in FIG. 1, except that the additional circuitry of FIG. 14 is contemplated as being included within control unit 10 and station unit 18 or 36 in FIG. 1.

A test tone generated at 270 on control unit input 274 is introduced on communication line 20 from control unit 10a with all stations 18a connected to line 20 but off-line. An RC network is adjusted until best balance is achieved or in other words the least echo received back. Only one station unit 18a has been depicted in FIG. 14 for the sake of simplicity but it is expressly understood that multiple number of station units or adapter boxes 36 as described in connection with FIG. 1 may also be coupled to line 20.

As described in greater detail below, the receive signal is then conditioned through a peak voltage detector 228 and into an analog-to-digital converter 230. An analog-to-pulse width converter may be substituted for the analog to digital converter for lower cost. A processor 232 or other custom logic circuit is used to change the resistive and capacitive parameters coupled through balance network 226. The echo back from the tone is then once again received and tested to determine if an improvement has been realized. After a best value for the signal or least echo has been established, each station 18a is signaled to adjust balance network 226 located in the station unit to be set at the same or similar values.

Figure 14:
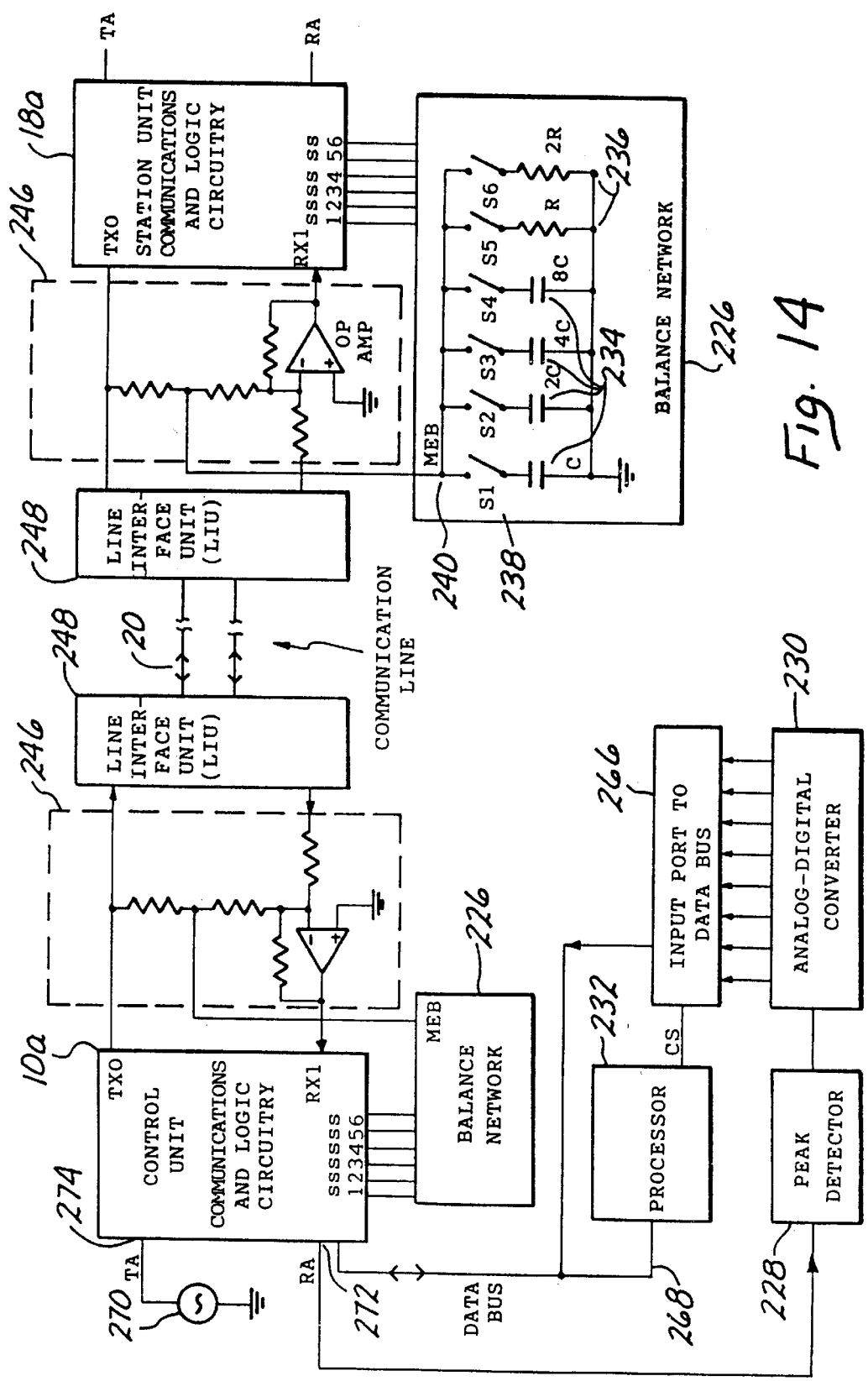
FIG. 14 is a schematic of a single line communication system of the invention wherein echo back signals are adaptively reduced or canceled.
Figure 15:
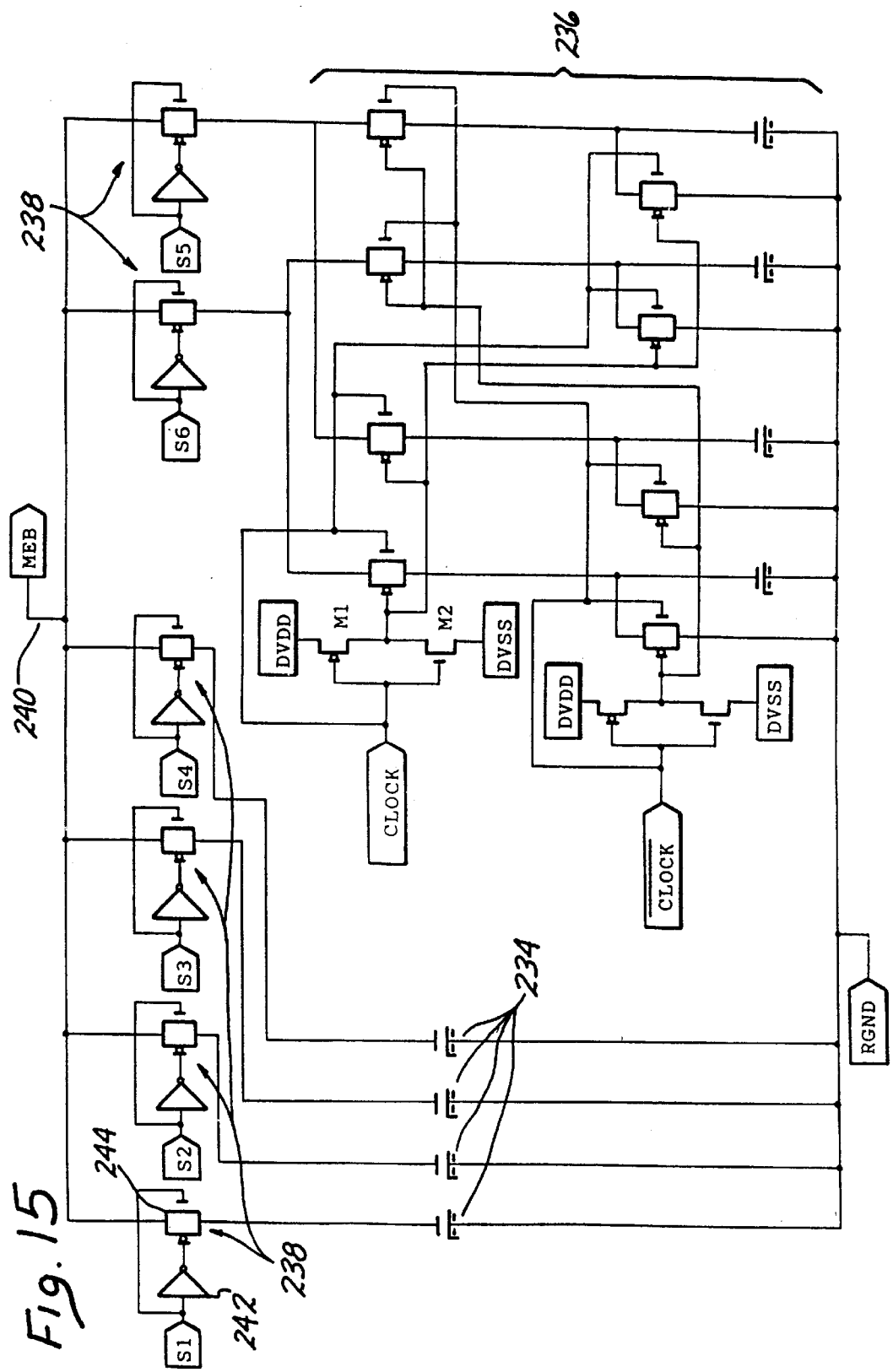
FIG. 15 is a schematic of the balance network of FIG. 14.

In the illustrated embodiment as schematically depicted in FIG. 15, balance network 226 is comprised of a plurality of capacitors 234 of different values, shown in the block diagram of FIG. 14 as being C, 2C, 4C and 8C, and a plurality of switched capacitor resistive equivalent elements 236, again shown as R and 2R in FIG. 14. Each of the elements 234 and 236 are switched through corresponding switches S1–S6 collectively denoted by reference numeral 238 to an output node 240. Switches S1–S6 are implemented as controllable semiconductor switches, but are schematically shown in FIG. 14.

In the illustrated embodiment, capacitors 234 are tested in various arrangements and set to an optimum combination to reduce the echo. Thereafter, resistors 236 are likewise tested and combined to further minimize the echo. The values of capacitor and resistors are weighted so that sixteen values of capacitors are available in equal steps and four values of resistors are available in equal steps. A specific implementation of balance network 226 is illustrated in CMOS circuitry in the schematic of FIG. 15. FIG. 15 shows switches 238 implemented with CMOS switches using an inverter 242 in combination with a pair of CMOS transistors 244. Resistors 236 are implemented using switched capacitor equivalent.

Figure 16:
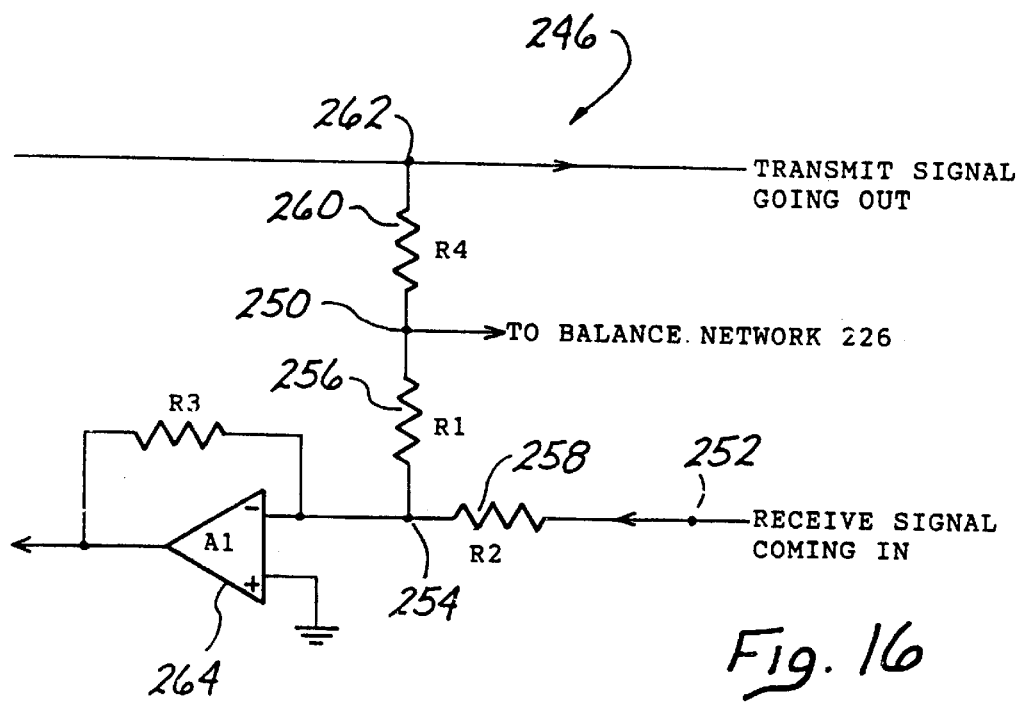
FIG. 16 is a schematic of the summing circuit of FIG. 14.

An echo balancing circuit 246 is utilized in FIG. 14 which is coupled between line interface unit 248 and control unit 10*a* on one hand and between line interface unit 248 on the opposing end of communication line 20 and station unit 18*a* on the other hand. The details of echo balancing circuit 246 are better depicted in the schematic of FIG. 16. Nodes 250 and 252 can be considered as inputs to a summing amplifier 264. Node 254 is a virtual ground so that when current in resistor 256 from node 250 to the virtual ground 254 equals the complement of the current in resistor 258 between node 252 and virtual ground 254 for the echo signal, echo cancellation is achieved. The combination of resistor 260 and the balance network are used to attempt to match the delay in amplitude of the echo signal on node 252 which is coupled to the incoming received signal through line interface 248. Resistor 260 is coupled across the output of the transmitted signal from control unit 10*a* to line interface 248 and to node 250 which is also coupled to balance network 226. Ideally there should be 180 degree phase shift between the transmit signal received on node 262 and the echo signal received on node 252. When the capacitors of balance network 226 are adjusted, the phase delay at node 250 is directly effected. When resistors 236 of balance network 226 are adjusted, the amplitude at node 250 is adjusted. The values thus chosen for the elements within balance network 226 must be large enough to adjust the worst variations expected in communication line 20. The accuracy of cancellation that is achievable will based upon the minimum value for the elements within balance network 226.

Any imbalance of signal at node 254 is amplified by operation amplifier 264 and coupled into the receive terminal, RXI, of control unit 10*a*. This value is coupled then to peak detector 228 and a peak voltage converted in analog-to-digital converter 230 to an input port or latch 266. Adjustment is made by processor 232 to minimize the echo in the adjusting signal output on data bus 268 to control unit 10*a* and thence to switches 238 within balance network 226.

Circuitry within the control unit 10*a* conditions the analog signal received from amplifier 246 and put it out on terminal 272. If likewise conditions the analog test signal from oscillator 270 which is transmitted onto communication line 20 for purposes of echo cancellation. As control unit 10*a* is part of a key telephone system, terminals 272 and 274 of control unit 10*a* is also coupled to a line interface unit connected to the central office lines (not shown). For the purpose of illustration, oscillator 270 is shown as coupled to input 274 directly, but in a practical embodiment, the test tone is switched into terminal 274 only during the adjustment period.

Control unit 10*a* also is used to control the interface signaling information between processor 232 and station units 18*a*. The signaling information can either be done on separate lines or as in the illustrated embodiment, multiplexed with the analog data over common communication line 20. In the diagrammatic depiction of FIG. 14, station unit 18*a* includes analog circuitry to condition the analog signal coming in on the receive node, RXI, and outputting it on the audio output node, RA. Station unit 18*a* also receives an incoming audio signal on input node TA and outputs it to node TXO. In a key telephone system, the TA and RA nodes would be coupled to a handset. In addition, station unit 18*a* will contain circuitry to control the interface signaling information between control unit 10*a* and station unit 18*a* and to use the signaling information furnished by control unit 18*a* to set its own corresponding balance network 226.

Figure 17:
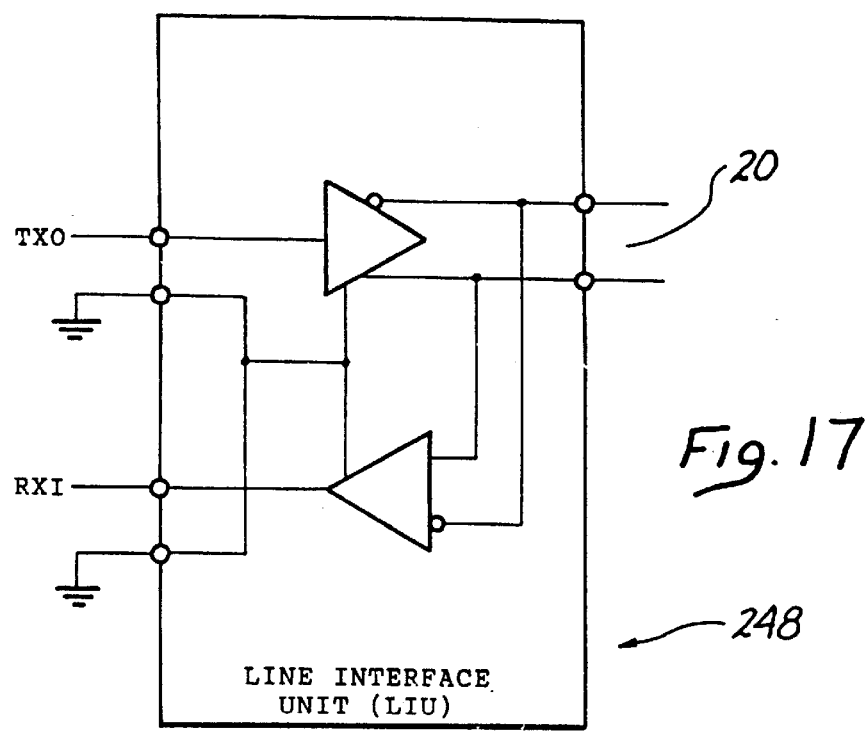
FIG. 17 is a schematic of the line interface unit of FIG. 14.
Figure 21:
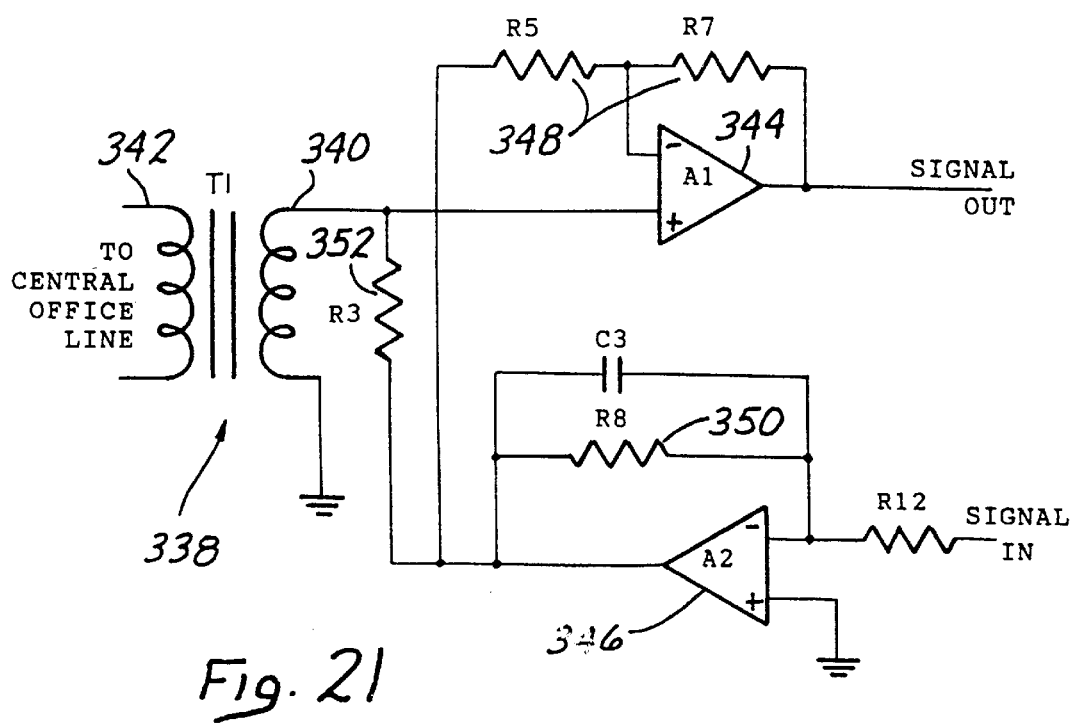
FIG. 21 is a schematic of a prior art telephone line interface.

Line interface units 248 provide the interface between a two-wire communication line having data flowing in both directions and separate transmit and receive signal wires with a common reference ground wire. A simple representation of line interface unit 248 is shown in the block diagram of FIG. 17. As depicted, interface unit 248 includes two buffers or amplifiers for transmitting information in opposite directions, from communication line 20 to transmit and receive lines TXO and TXI. This line interface unit is a typical two-to-four wire conversion circuit and is used at each termination of a telephone line.

Peak detector 228 first determines the peak voltage on the signal input to it and generates a steady analog output voltage in response as a measure of the peak input voltage. Digital to analog converter 230 is a conventional 8 bit analog to digital converter. Processor 232 performs the functions of outputting test values to balance network 226, reading the value of the output of A-to-D converter 230 through an input port 266 and thereby determining and setting the optimum value in balance network 226 before the ending of the echo balance routine.

The echo balance routine is performed at startup and occasionally updated, typically at off peak periods of processor and system activity.

A Two-Wire Twisted Pair, Multiple Signal, Capacitor Coupled Communication Line Interface An improved interfacing system is provided for coupling a plurality of sources to a two-wire communication pair. The interfacing system is comprised of a plurality of differential voltage-to-current amplifiers which are capacitively coupled to the line pair. Each differential voltage-to-current amplifier includes two complementary current sources, one for driving current into the defined balanced DC ground of the communication line and the other for drawing current from the ground of the DC balanced communication line. Both current sources are voltage controlled from the communication source. A differential receiving amplifier is RC coupled to the communication line and is used as a common mode rejecting input amplifier. An echo balancing network is coupled to the output of the differential receiving amplifier and the echo cancellation signal is provided from the source being coupled to the communication line. Each source is provided with its own corresponding differential voltage-to-current amplifier and echo balancing network while the differential receiving amplifier used to receive signals form the line is coupled in parallel and shared among all the source and receiving entities coupled to the communication line at that particular interface.

Figure 18:
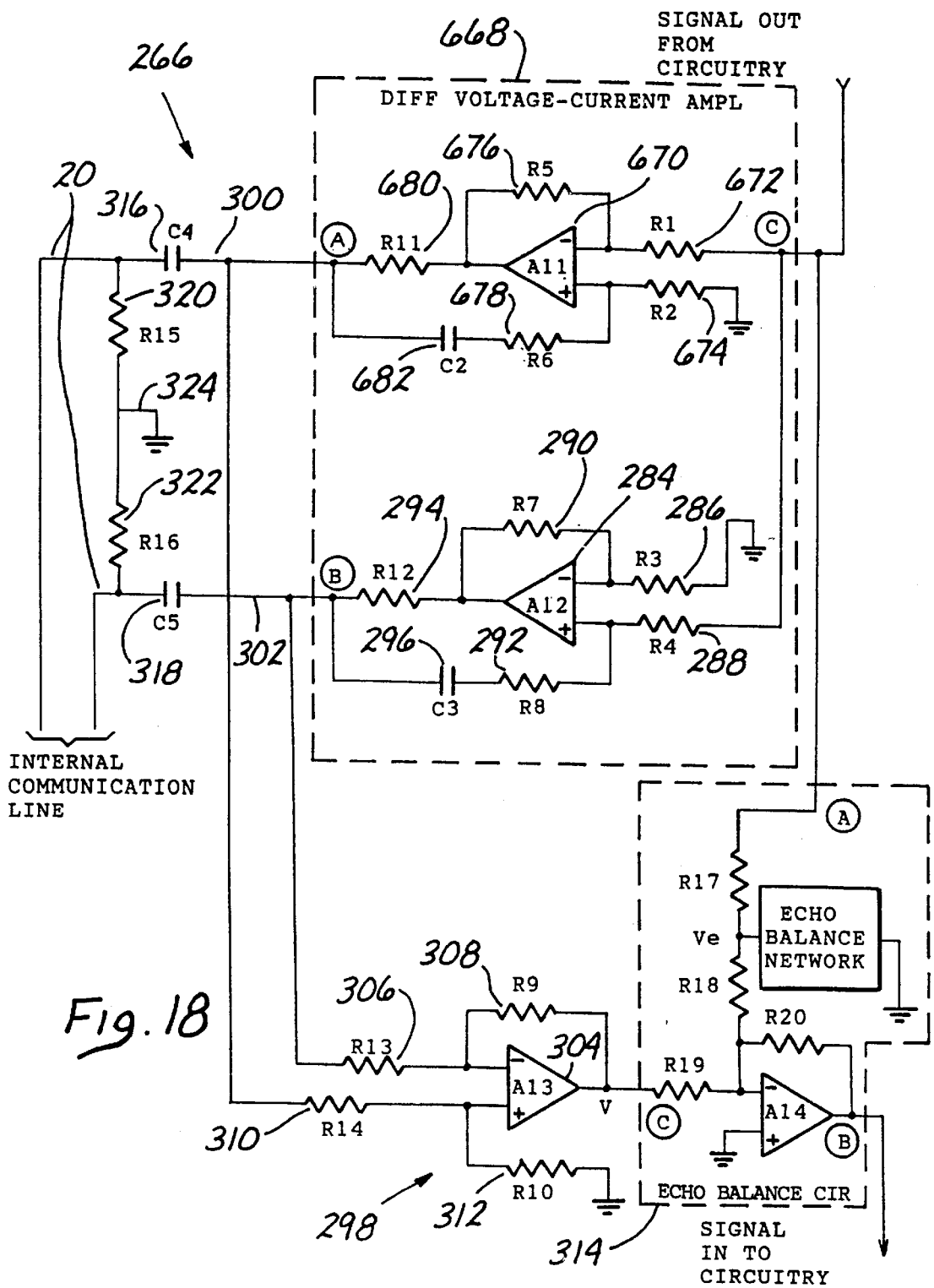
FIG. 18 is a schematic diagram of the line interface unit of the invention.

Turn to FIG. 18 which shows an interface from a single sourcing and receiving entity to an internal communication line 20. The interface, generally denoted by reference numeral 266, is comprised of among other things a differential voltage-current amplifier 668 which is a capacitor coupled differential driver amplifier which converts a single ended input voltage to a differential pair of complementary current source outputs. The voltage-to-current conversion for one phase is provided by differential amplifier 670 and its corresponding resistors 672–680 and capacitor 682. The voltage-to-current conversion for the opposing phase is similarly provided by differential amplifier 284 with its corresponding resistors 286–294 and capacitor 296.

A capacitor coupled differential receiver amplifier, generally denoted by reference numeral 298, converts the differential line input voltages on lines 300 and 302 to a single ended output voltage. Receiver amplifier 298 is comprised of operation amplifier 304 and its corresponding resistors 306–312.

An echo cancellation stage 314 is provided at the output of capacitor coupled differential receiver amplifier 298. The components within echo balancing circuit 314 are identical to and have been described above in connection with the circuitry of FIGS. 14–16 and include circuitry equivalent to balance network 226 and summing amplifier 246. The output of echo balance circuit 314 is provided as an input signal to the circuitry for which circuit 266 serves as an interface.

Capacitor 316 on line 300 and capacitor 318 on line 302 are isolating capacitors to provide DC isolation from communication line 20 as well as the AC signaling connection to the same line. Resistors 320 and 322, which are equal in resistance value, establish a ground reference for the circuit 266 and other local circuitry. Resistors 320 and 322 are kept at as high an impedance as is practical.

The current drawn by the interface circuitry and any other circuitry drawing current from the line must be balanced. In a telephone system this interface should be used for all system telephones and all adapter boxes that interface between internal communication line 20 and commercial telephone equipment or any other remote station type instrument.

Consider now the operation interface 266 in FIG. 18. Differential voltage-to-current amplifier 670 operates with more current flowing to signal ground with a positive change in its input voltage, while voltage-to-current amplifier 284 operates to flow more current from signal ground 324 with a positive change in its input voltage. It can be shown through analysis of the circuit in FIG. 18 that the current output by voltage-to-current amplifier 668 is proportional to the input voltage as determined by a proportionality constant only dependent upon values of the internal resistors. Since the input voltages are applied antisymmetrically with respect to differential amplifiers 670 and 284, the phase and current supplied by each subcircuit corresponding to amplifiers 670 and 284 to the line load relative to ground node 324 is equal and opposite.

This, therefore, provides a voltage driven current source as the interface driver to internal communication line 20. Differential receiver amplifier 298 and echo balance circuit 314 are used in combination with the above circuits in interface 266 to efficiently cancel the echo back signal from the driver output on line 20 and provide signal back from the line to the circuitry being interfaced.

Figure 19:
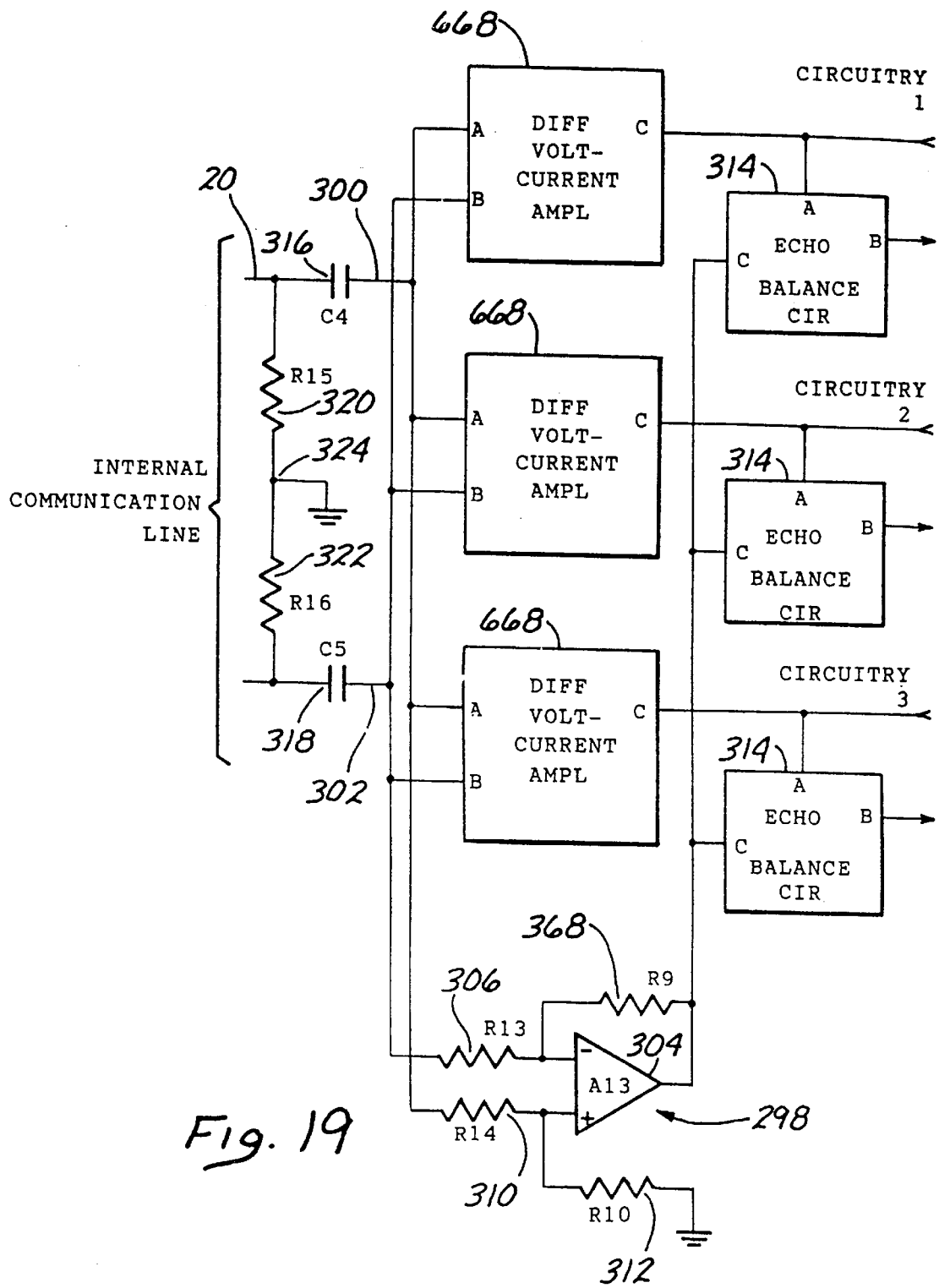
FIG. 19 is a block diagram wherein the concept of the line interface unit of FIG. 18 is extended to multiple sources.

The schematic of FIG. 19 illustrates a circuit wherein a plurality of interfaces are coupled to communication line 20. A plurality of voltage-to-current converters 668 are coupled in parallel to lines 300 and 302, each provided with its own corresponding echo balance circuit 314. A single differential receiver amplifier 298 is coupled across lines 300 and 302 for each of the echo balance circuits. In this way the receive circuitry, isolation capacitors and ground reference resistors are shared in a multiple bank interface. In the illustrated embodiment the interface of FIG. 19 is used in a control unit or master telephone where outside lines are interfaced to internal communication line 20.

Figure 20:
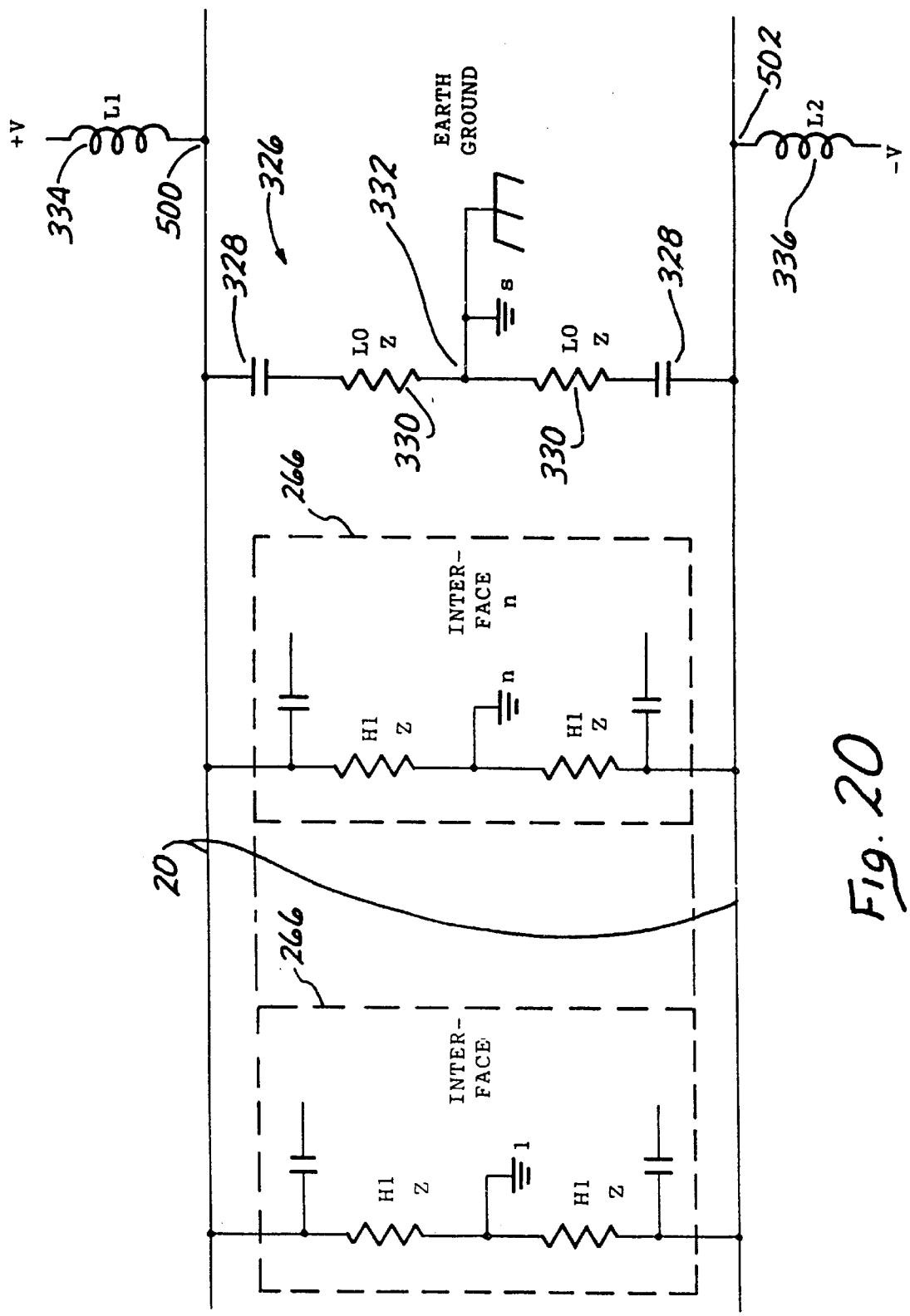
FIG. 20 is a schematic of further improvements to the DC and AC line loading and powering of the communication line to which the interface units of FIGS. 18 and 19 are coupled.

As illustrated in FIG. 20 at some point within internal communication line 20 a low AC impedance circuit, generally denoted by reference numeral 326, is provided across communication lines 20. Impedance circuit 326 is comprised of capacitors 328 coupling resistors 330 to a signal ground 332. Circuit 326 is used to provide a balance load to a solid ground and to minimize the effects of capacitance and resistance variations on communication line 20 In addition, circuit 326 establishes a return to ground for lightning protection. Circuit 326 may, for example, be installed across lines 300 and 302 between capacitors 316 and 318 at the outputs of the differential voltage-current amplifiers 668 in the system as depicted in FIG. 19 when the circuitry in FIG. 19 is located in the same location where the hard ground is established. This would allow the shared use of capacitors 316 and 318 in place of capacitors 328 as well as eliminating the need of the high impedance resistors 320 and 322 in favor of the low impedance resistors 330 in that case.

In addition as shown in FIG. 20, somewhere on communication line 20, a DC voltage can be established through inductors 334 and 336 to provide power to the line. Inductors 334 and 336 are used to minimize the power supply loading effects on the signals. The power supply reference is established relative to ground 332 connected to resistors 330. There are system advantages to combine the power supplies, low resistance resistors 330 and the power consuming digital control circuitry within a single interface although this is not required. The DC power supplies can then be used to power digital circuitry, establish a reference for interfaces, that include a line power supply and are used to supply all the power for the remote line powered interfaces.

The circuit described has many advantages, the chief of which are described as follows. The circuitry of FIGS. 18–20 allow a multiplicity of sources to be coupled to internal transmission line 20 at the same time without the bulk size, cost, and poor characteristics of a transformer interface. The grounds of the various sources are isolated by the relatively high impedance provided by resistors 320 and 322 for each source. The system can operate with a relatively large common mode voltage. Differential DC voltage can be placed across internal communication line 20 for the distribution of DC power. The use of a balanced AC differential current output as described in FIG. 18 provides a high DC impedance that allows many sources to be coupled to line 20 simultaneously without serious degradation of the communication signals. The use of a relative low impedance balanced load circuit 326 as shown in FIG. 20 which is located only at one position within the system in combination with an interface circuit having relatively high impedance allows for the possibility of many interfaces to be coupled to line 20 with large variations in line length without sacrificing the signal integrity. The use of circuitry that has a balanced DC load and a DC power source provided through inductors 334 and 336 allows line powering over communication line 20 without lowering the AC impedance of each interface or disturbing signal current information. The use of a pair resistors in circuit 326 along with a balance load allows for the setting of a good ground reference while maintaining high source impedance which in turn allows many interfaces to be coupled to line 20 without significantly lowering the impedance of the line. The use of an adaptive echo balance circuit 314 as part of interface 666 allows large variations in both communication line length and the number of interfaces coupled to communication line 20 without causing large echo signals which in turn generate communication errors. The sharing of differential circuit 668 for multiple sources as shown in FIG. 19 minimizes the amount of hardware, power and line loading that occurs. Further, the use of a differential amplifier 304 to provide the input signals to the sources provides substantial common mode rejection.

Telephone Line Interface

An improved telephone line interface unit for coupling through a transformer into telephone office transmission lines and equipment is provided by first amplifying the audio signal from its source and then inverting the amplified audio signal before coupling it through a load resistor in series with the secondary of the transformer that is coupled to the telephone lines. The amplified signal from the first amplifier is then coupled through a balance network to the input of the input amplifier also coupled to the secondary of the coupling transformer. The balance network simulates the impedance of the central office telephone equipment, central office transmission line, the source resistance of the central office, the magnetizing inductance of the coupling transformer, the load resistance, and the effects on low frequency gain of the input amplifier by the winding resistance of the transformer and the low frequency cut off characteristics of the transformer. The inverted audio signal coupled to the load resistor is then summed with the feedback signal coupled to the balance network to provide substantial echo reduction through the input amplifier also coupled to the transformer.

Figure 22:
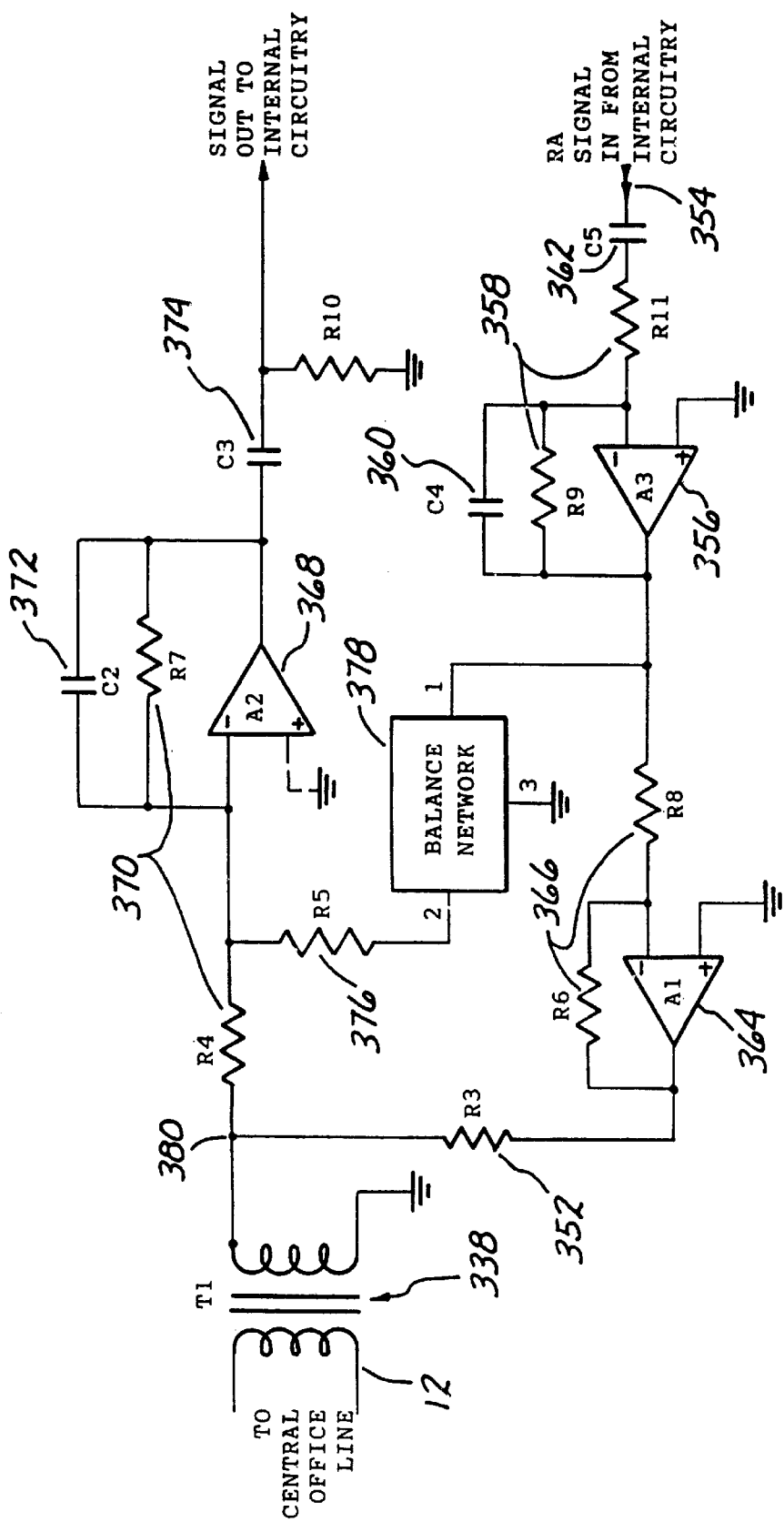
FIG. 22 is a schematic of a telephone line interface according to the invention.

The telephone line interface unit of the invention is schematically depicted in FIG. 22. As before, telephone lines 12 are coupled through transformer 338 and load resistor 352 to provide a 600 ohm termination as seen from the telephone central office line. The audio output signal, RA, coupled to node 354 from the internal circuitry of the equipment being interfaced is coupled to an output summing amplifier stage comprised of operational amplifier 356 and its associated summing resistors 358, and 3 kHz upper baseband roll off capacitor 360 and the 300 Hz lower baseband roll off capacitor 362. The output signal from operational amplifier 356 is further amplified and delivered to telephone line 12 through load resistor 352 and transformer 338 by means of an inverting amplifier stage comprised of operational amplifier 364 and summing resistors 366.

The input audio is received by a summing amplifier 368 and its corresponding summing resistors 370 with a 3 kHz upper baseband roll off capacitor 372 and a 300 Hz lower baseband roll-off capacitor 374. Summing amplifier 368 also receives the audio output signal from the internal circuitry through a summing resistor 376 as altered by balance network 378 which is depicted and described in greater detail in connection with FIG. 23. The audio signal input to balance network 378 and summing resistor 376 is out of phase or inverted with respect to the audio output signal coupled to the input transformer 338 via load resistor 352. In this manner echo cancellation or echo balance of signals is provided so that the input will not receive its own output signal.

Figure 23:
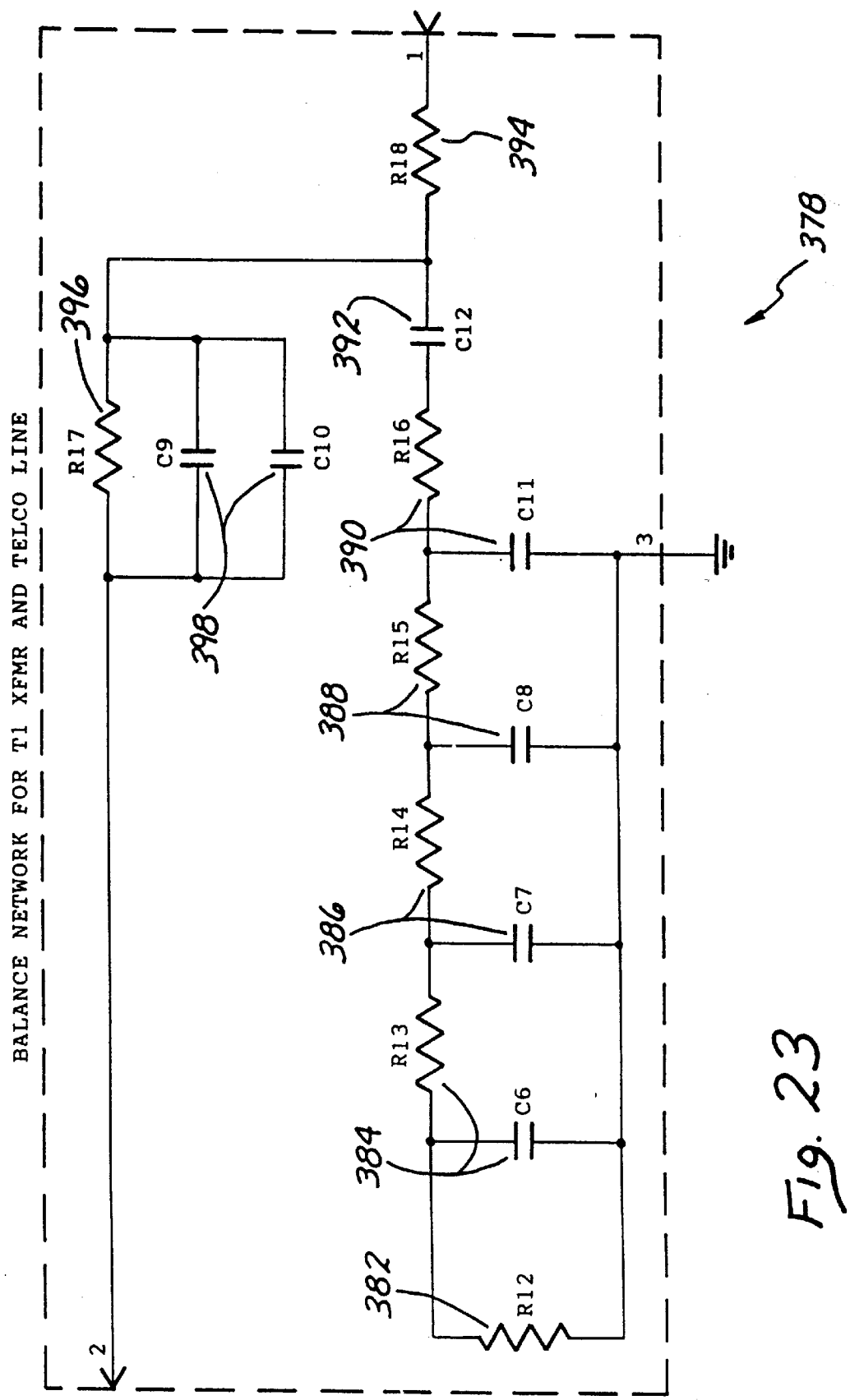
FIG. 23 is a schematic of the balance network used in the circuit of FIG. 22.

Turn now to FIG. 23 which is a schematic diagram of balance network 378. It is the purpose of balance network 378 to form an audio output signal whose amplitude and phase will cancel the audio output signal formed at output node 380 of transformer 338. An assumption is made that the normally expected type of telephone central office line and telephone central office equipment is connected to the input terminals of transformer 338. Balance network 378 in FIG. 23 comprises an equivalent circuit to the telephone central office source resistance 382 and four lumped equivalences of a typical transmission telephone line comprised of resistor and capacitor pairs 384–390. In the depiction of FIG. 23 the resistance of pair 390 also includes the equivalent of the DC winding resistance of transformer 338.

A low frequency cut off capacitor 392 is then coupled in series with the equivalent impedances. Low frequency cut off capacitor 392 compensates for the effect of the magnetizing inductance of transformer 338. Series coupled resistor 394 is provided to compensate for the source resistance of load resistor 352. The ratio of resistor 396 and 376 compensate for the low frequency effect on the gain of operational amplifier 368 caused by the transformer winding resistance. The low frequency cut off associated with the magnetizing inductance of transformer 338 is compensated by capacitors 398.

The overall effect of the circuitry FIG. 22 with the balancing network of FIG. 23 is to provide a means whereby a suitable interface is obtained between telephone central office line 12 and equipment coupled to the line with good echo cancellation. The balance network 378 simulates a typical central office line and the coupling transformer characteristics in order to achieve good echo cancellation at low cost. Operational amplifier stages 356 and 364 are utilized to drive load resistance 352 and to invert the output signal to thereby allow summing into a simple feedback network to be an effective form echo cancellation.

A Piezo Driver Using Voltage Doubling and CMOS Techniques

An improved driver for a piezo element is provided by driving two CMOS driver circuits out of phase with respect to each other by the signal used to control the piezo element. The output amplitude of each CMOS driver is equal to the difference between the voltage supply across the CMOS driver. The out-of-phase outputs from the two CMOS drivers are then coupled across the piezo element to provide twice the voltage amplitude change to drive the piezo element with the effect that increased audio volume is generated without the necessity of providing a higher voltage supply terminal to the circuit.

Figure 24:
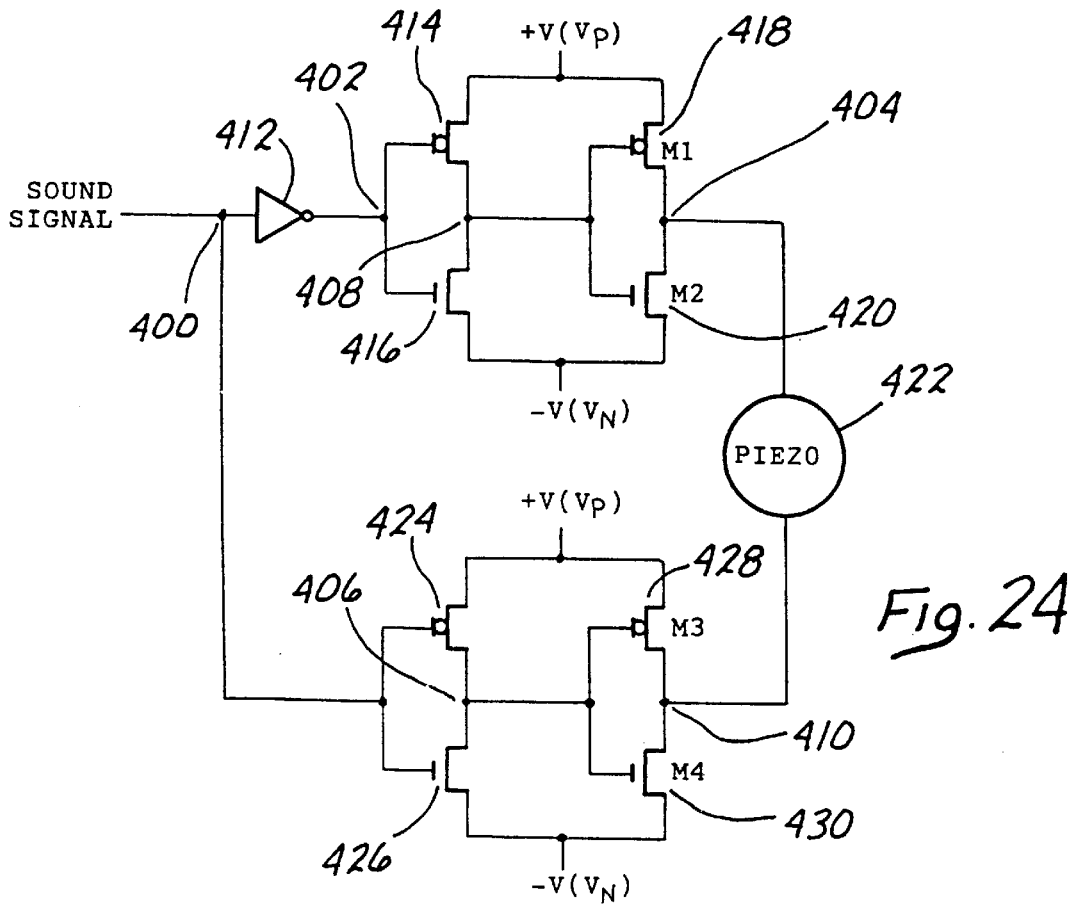
FIG. 24 is a schematic of the improved piezo driver of the invention used in the circuit of FIG. 1.

Turn to the schematic of FIG. 24 wherein a piezo driver of the invention is depicted. When node 400 is high, nodes 402, 404 and 406 will be low while nodes 408 and 410 high. The signal at node 400 is coupled through an inverter 412 to the gates of PFET 414 and NFET 416. The output of FET's 414 and 416 is common node 408 which in turn is coupled to the gates of PFET 418 and NFET 420. The output of FET's 418 and 420 is node 404 which is coupled to one terminal of piezo element 422.

Similarly, node 400 is coupled to the gates of PFET 424 and NFET 426. The output of FET's 424 and 426, node 406, in turn is coupled to the gates of PFET 428 and NFET 430. The output of FET's 428 and 430 in turn are coupled to node 410 which is coupled to the opposing terminal of piezo element 422.

When node 400 is high, the voltage across piezo element 422, namely the voltage across nodes 404 and 410, is equal to the negative of the difference between the positive and negative supply voltages Vp and Vn. When node 400 is low, the voltage across nodes 404 and 410 is equal to the positive of the difference between the positive and negative supply voltages Vp and Vn. Therefore, the change across piezo element 422 for each transition in the voltage at node 400 is 2(Vp-Vn). Piezo element 422 will therefore have an audible volume that is the same as that which would be generated by turning on and off a voltage with the magnitude of 2(Vp-Vn).

No high voltage power supply is required in order to achieve this voltage doubling. Therefore, the circuit of FIG. 24 provides an increase in voltage change across piezo element 422 to improve the volume of its sound output and it is done with circuitry which is CMOS. Therefore, a low cost and effective piezo element driver is provided by using two CMOS drivers operating in opposite phases to drive piezo element 422.

Voltage Limiter

Improved linearity of an amplifier stage in its useful dynamic voltage range is achieved while providing voltage limitation of the amplifier output by utilizing two series circuits in parallel across the input and output of the amplifier. Each series circuit is comprised of a series of bipolar transistors, one series being arranged and configured with respect to the output of said amplifier to limit the negative voltage excursion, while the other series circuit is arrange and configured with respect to the output of said amplifier to limit the positive voltage excursion. The number of bipolar transistors coupled in series within each leg is used to determine through the collective series base-to-emitter threshold voltages the output voltage limitation range for the amplifier.

Figure 25:
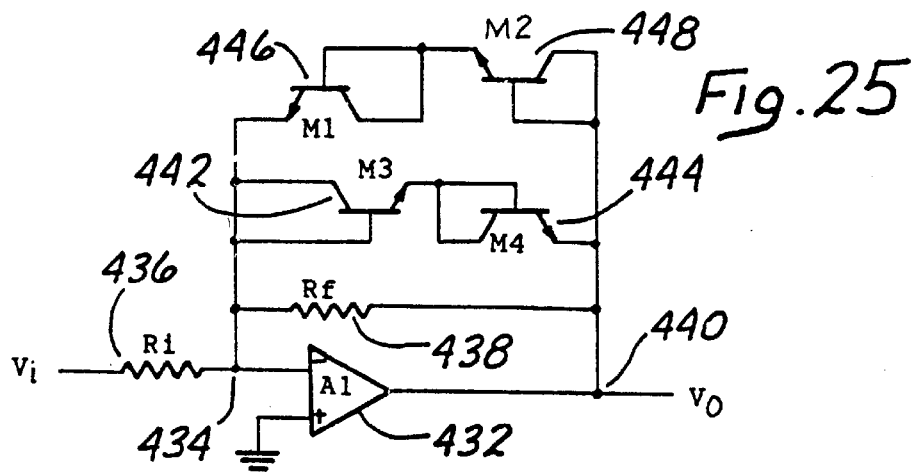
FIG. 25 is a schematic of a voltage limiter of the invention.

FIG. 25 is the schematic of a circuit for providing extended linear dynamic range for voltage limitation on an amplifier. An operational amplifier 432 is provided with an input 434 into which an input signal Vi is applied through an input load resistor 436. A feedback resistor 438 is coupled in parallel between input node 434 and output node 440. Resistors 436 and 438 together with operational amplifier 432 comprise a conventional inverting amplifier stage.

Without limiting operation, input node 434 is a high impedance virtual ground and the current through the feedback resistor 438 approximately equals the current through input resistor 436 with the voltage gain of amplifier stage 432, 436 and 438 equal to the negative of the ratio of the resistances of resistor 438 to resistor 436.

Also coupled in parallel across input nodes 434 and output node 440 is a transistor 442 in series with transistor 444 in one leg and transistor 446 in series with transistor 448 in a second leg. When the output voltage Vo, at node 440 becomes more positive than the sum of the base to emitter voltages through transistors 446 and 448, transistors 446 and 448 will turn on and shunt the current around feedback resistor 438, thereby limiting the output voltage. The base and collector of transistor 448 are coupled in common and the emitter of transistor 448 is coupled in common to the base and collector of transistor 446. The emitter of transistor 446 is coupled to input node 434. Similarly, the base and collector of transistor 442 are coupled in common to input node 434 and its emitter coupled in common to the base and collector of transistor 444. The emitter of transistor 444 is coupled to output node 440.

Figure 26:
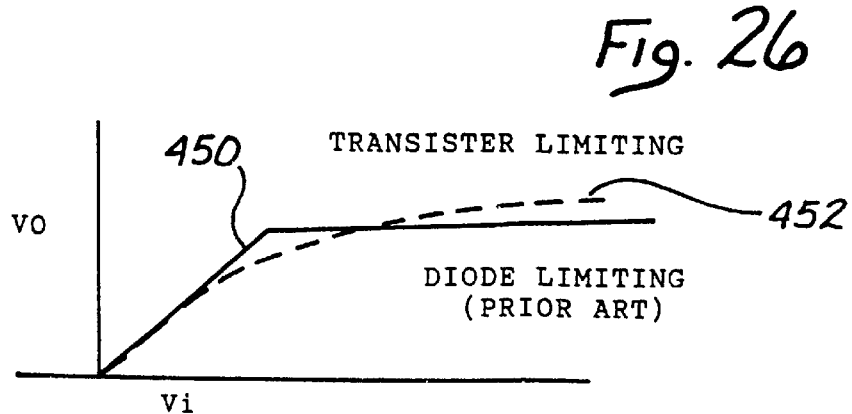
FIG. 26 is a voltage gain graph comparing the performance of the circuit of FIG. 25 to a prior art diode limiter.

After transistors 446 and 448 start to turn on, the excess current is controlled by the threshold parameters of these transistors and gives a sharp knee 450 to the voltage gain of the amplifier of FIG. 25 as shown in the voltage gain graph of FIG. 26. Similarly, when output voltage, Vo, becomes more negative than the base to emitter voltage of transistors 442 and 444, the negative voltage of the amplifier of FIG. 25 is similarly limited.

FIG. 26 also illustrates the difference between the transistor voltage limitation of FIG. 25 as compared to a prior art conventional diode limitation as depicted in dotted line 452. It can readily be seen that for a given voltage limit, the transistor limiting scheme of the invention gives a much more linear dynamic range than could be achieved by prior art diode limiting.

In the present embodiment, two transistors 446 and 448 or 442 and 440 are shown in series to limit the output voltage to swings of about 1.0 volts. The output voltage swing can be limited to a higher voltage or lower voltage by placing more or fewer transistors in series than those depicted in FIG. 25. Therefore, the invention must be understood to include any number of limiting transistors as may be desired.

Further, although the illustrated embodiment shows NPN transistors being used, it is also expressly contemplated that PNP bipolar transistors may be used as well. By the use of bipolar transistors to limit the output voltage swing on an amplifier, voltage limitation can be obtained with good linear dynamic performance over the useful voltage range.

Still further, it is expressly contemplated within the invention that the feedback path utilized in the amplifier need not be the simple resistive feedback provided by resistor 438 but any more complex feedback scheme can be substituted without materially altering the scope of the invention.

Line Powering for Two-Wire Twisted Pair, Multiple Signal, Capacitor Coupled Communication Line Interface A supply having multiple supply voltages is provided to supply power on a two-wire communication line without the injection of interfering noise onto the line by providing line power interface circuits in both powered line interfaces and nonpowered line interfaces. In the powered line interface, a constant current source and adjustable current source are combined to provide a floating ground in the power supply which is centered between the voltages on the two-wire communication line. The adjustable current supply is adjusted according to the off-center drift sensed though an operational amplifier so that its current output matches the current of the constant current source to thereby maintain the ground reference signal in a centered position. Security of connection of the line interface units is provided by coupling the interface units to the two-wire line through a diode bridge to ensure that a predetermined polarity is always provided to the line interface. In the nonpowered interface, a fixed constant current source is provided to maintain the diode bridge in a forward biased linear region of operation and to appropriately load a resistive voltage divider to provide and center the floating ground and to provide a proper voltage bias across electrolytic capacitors to which the two-wire communication line is coupled.

A supply having multiple supply voltages is provided to supply power on a two-wire communication line without the injection of interfering noise onto the line by providing line power interface circuits in both station unit line interfaces and adapter box line interfaces. In the station unit line interface, a constant current source and adjustable current source are combined to provide a floating ground in the power supply which is centered between the voltages on the two-wire communication line. The adjustable current supply is adjusted according to the off-center drift sensed though an operational amplifier so that its current output matches the current of the constant current source to thereby maintain the ground reference signal in a centered position. Correct connection of the line interface units is provided by coupling the interface units to the two-wire line through a diode bridge to ensure that a predetermined polarity is always provided to the line interface. In an adapter box, a fixed constant current source is provided to maintain the diode bridge in a forward biased linear region of operation and to appropriately load a resistive voltage divider to provide and center the floating ground and to provide a proper voltage bias across electrolytic capacitors to which the two-wire communication line is coupled.

The line powering signal interface has been described in detail above in connection with FIG. 20. To reiterate, the line power source is comprised of two large coils 334 and 336 connecting DC power sources +V and −V to a positive line 500 and a an negative line 502 which are also named line 20 for signal purposes. Coils 334 and 336 are of like value, manufacture and construction and supply voltages which are set to the same but opposite polarities. While matching values for coil 334 and 336 are not necessary, matching is desirable to maintain symmetry and balance of lines 500 and 502. In the illustrated embodiment, coil 334 and 336 have an inductance of 330 millihenries and are manufactured with as low a series resistance as possible. Voltage power supplies +V and −V are provided at plus and minus 24 volts respectively with a low output source impedance. The supply voltage is high enough to allow for lines losses and to provide for a large number of instruments or users on the line. On the other hand, the voltage also remains low enough to avoid electrical safety problems such as shock, wire damage due to shorting and other high voltage hazards.

Figure 27:
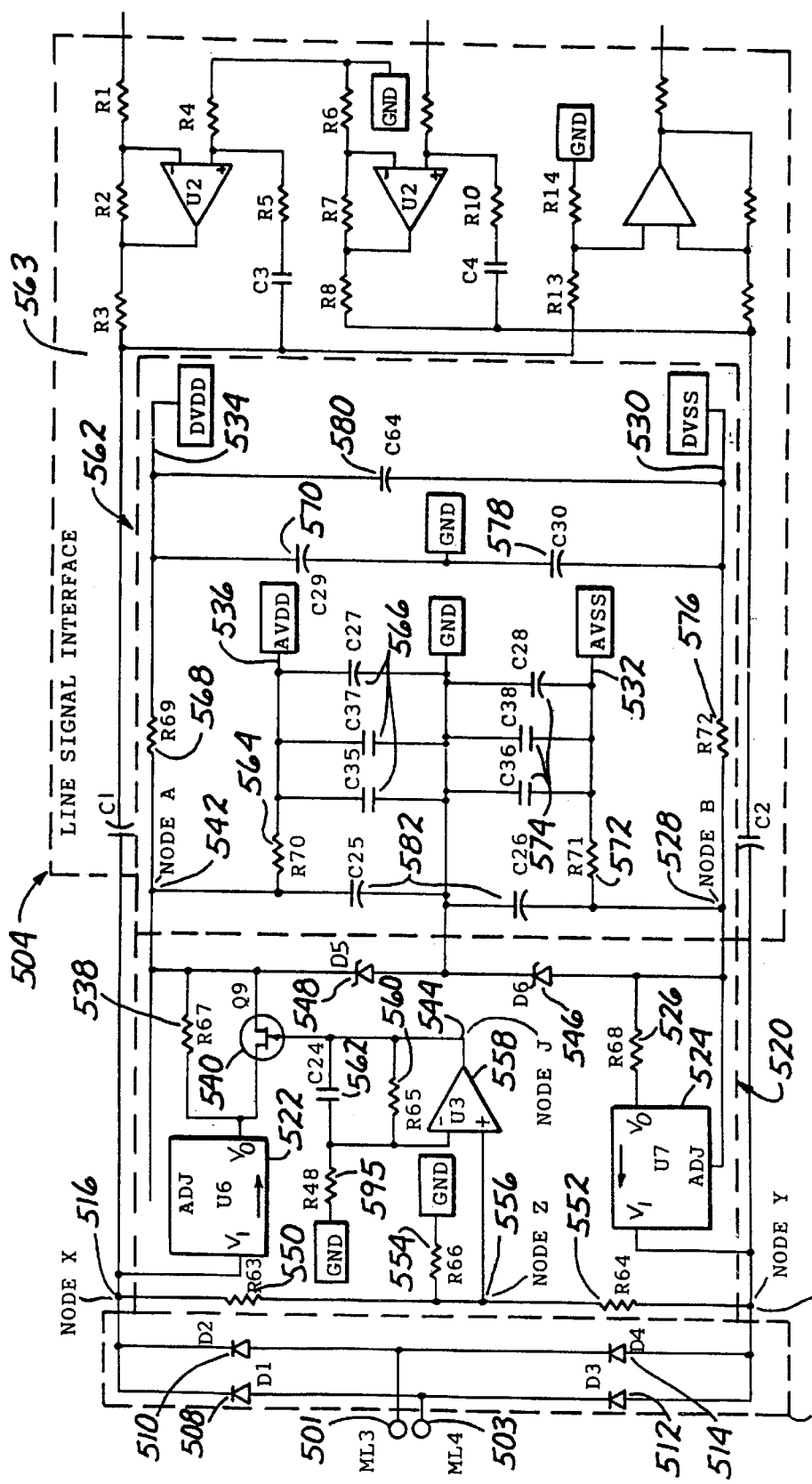
FIG. 27 is a schematic of a station unit line interface according to the invention.

The line power source of FIG. 20 is combined with a station unit line power interface diagrammatically depicted in FIG. 27. Station unit line interface, generally denoted by reference numeral 504 is comprised of three elements, a line signal interface as described above in connection with FIG. 20, a diode bridge interface 506 and a line power interface 520.

Diode bridge 506 is coupled to lines 501 and 503 to ensure trouble free connection no matter what voltage polarity is connected to the input terminals of the diode bridge. Nodes 501 and 503 correspond to nodes 500 and 502 except their order may be reversed, so the voltage polarity is known for nodes 500 and 502 and not known for nodes 501 and 503. For example, if terminal 501 is positive and terminal 503 negative, then diodes 510 and 512 conduct, making node 516 positive and node 518 negative. On the other hand if input terminals 501 and 503 are reversed so that terminal 501 is negative and terminal 503 positive, then diodes 508 and 514 conduct, again making node 516 positive and node 518 negative. Therefore, node 516 is always positive and node 518 always negative no matter how station unit line interface 504 may be connected to the two-wire line.

Line power interface circuit, generally denoted by reference numeral 520 in FIG. 27, includes conventional adjustable voltage regulators 522 and 524 which are used as the basis for a common constant current source as described below. Adjustable voltage regulator 522 is connected to the positive node 516 while adjustable voltage regulator 524 has its input coupled to the negative voltage node 518. A constant current source is comprised of adjustable output negative voltage regulator 524 and resistor 526. This assures that a constant current will flow originally from node 528 through regulator 524 into node 518. In the illustrated embodiment, the current flowing through this path to node 518 is approximately 1.25 volts divided by the resistance value of resistor 526 or in the illustrated embodiment approximately 45 milliamps. The current value is set by choice of the resistance of resistor 526 to the value of the worst case current-sinking demand required by loading on the negative power supply terminal 530, DVSS, and terminal 532, AVSS, or to the value of the worst case current-sourcing demands required by the loading on the positive supply terminals 534, DVDD and 536, AVDD, whichever is the greater magnitude.

Similarly, an adjustable constant current source is formed with positive regulator 522, resistor 538 and FET 540. The positive adjustable constant current source ensures that the adjusted constant current will flow from node 516 through regulator 522 into node 542. For example, in the illustrated embodiment, the current through regulator 522 is approximately 1.25 volts divided by the effective resistance provided by the parallel resistance through resistor 538 and N-type depletion mode JFET 540. In general, the minimum attainable current, namely 1.25 divided by the resistance of resistor 538, is several percent less than the current setting through negative voltage regulator 524, thereby allowing the circuit to adjust via the voltage on node 544 to a reasonable range of current above and below the current set through regulator 524.

Identical zener diodes 546 and 548 are coupled to the outputs of the positive and negative constant current sources and between nodes 528 and 542 to set and regulate the power supply voltages DVDD, AVDD, DVSS and AVSS as referenced to ground, as long as the load current demand on each of these terminals 530–536 does not exceed the setting on these current sources and thus the voltage supplies will remain in regulation. For example, in the illustrated embodiment, the zener voltage for diodes 546 and 548 are selected to ensure a plus five volts at node 542 and a minus five volts at node 528. Zener diodes 546 and 548 act to shunt any excess current supplied by the positive or negative current sources to ground that is not consumed by the load circuit.

Resistors 550 and 552 are also coupled in series between nodes 516 and 518 to form a voltage divider. Resistor 554 is coupled to their junction and thence to a floating ground, GND. These three resistors serve to set a reference point for ground somewhere close to the center point between the raw supply voltages presented from the line terminals 501 and 503 through the diode bridge described in connection with FIG. 20. For good system performance, a supply ground, GND, should be close to the center point between the voltages on nodes 516 and 518 which then requires the resistance of resistors 550 and 552 to be approximately equal. Resistor 554 provides a voltage on node 556 indicative of the offset of the ground from the true center point as well as offering a path for any temporary unbalance of positive and negative current sources.

Operational amplifier 558, having one input coupled to node 556, in combination with resistor 595 and 560 and capacitor 562 provide a low frequency, steady state, noninverting voltage gain stage amplifier from the voltage offset point on node 556 to the output of the amplifier at node 544. The gain in operational amplifier 558 is approximately equal to the ratio of the resistance of resistor 595 to 560. Response of the gain stage amplifier is further determined by the time constant provided by the product of the resistance of resistor 560 and capacitor 562. In the illustrated embodiment, resistor 595 is 1 kilohm, resistor 560 1 megaohm and capacitor 562 is 0.47 microfarads so that the time constant of operational amplifier 558 is 0.47 seconds with a gain of 1,000.

The noninverting voltage gain stage provided by operational amplifier 558 in response to any significant positive or negative center point offset voltage on node 556 serves to present a voltage on node 544 which slowly rises or decreases. The voltage on node 544 relatively increases or decreases the resistance provided by JFET 540 and therefore adjusts the positive adjustable constant current source, comprised of the combination of regulator 522, resistor 538 and FET 540, to provide more or less positive supply current respectively for centering the supply reference point, GND, approximately to center point between the voltages presented on nodes 516 and 518 and to do so within an inaudible frequency domain with a time constant of approximately half a second.

For example, a more negative voltage on node 556 will present a more negative voltage on node 544 thereby raising the on-resistance of FET 540. As a result, the current supplied by the positive current source is reduced, bringing it more into balance with a negative current source and requiring less current to flow from ground through resistors 554 and 552. This drops the voltage magnitude on node 556 and serves to center the reference node GND to the voltage center point between the voltage levels presented at node 516 and 518 by the line.

The Final effect of operation of line power interface 520 is to present a constant current load to the line, 501 and 503, as well as a constant voltage source applied to the plus and minus five volt nodes 542 and 528 respectively with a ground reference, GND, close to center point of the line voltages and to do so without injecting audible noise on the line.

Line power interface may also be combined with an RC coupling network denoted by reference numeral 562. RC coupling network 562 is a network of RC filters in which terminal 536 is provided with the RC filter comprised of resistor 564 and capacitors 566. Terminal 534 in turn is provided with an RC filter comprised of resistor 568 in combination with capacitor 570. Likewise, terminal 532 is provided with an RC filter comprised of resistor 572 and parallel capacitors 574. Terminal 530 in turn is coupled to an RC network comprised of resistor 576 and capacitor 578. Also associated with terminals 534 and 530 is the RC filter comprised of resistors 568 and 576 and capacitor 580 along with power supply tank capacitors 582.

Each of these RC filters are used to decouple high frequency as well as audio frequency noise from each of the other terminals and to maintain a low noise environment to prevent current regulators 522 and 524 from responding to the noises and thereby injecting the noise into the line 501 and 503.

The regulated terminals 501 and 503 are also coupled to a line signal interface circuit, generally denoted by reference numeral 563 and described in detail above in connection with FIGS. 18 and 19.

Figure 28:
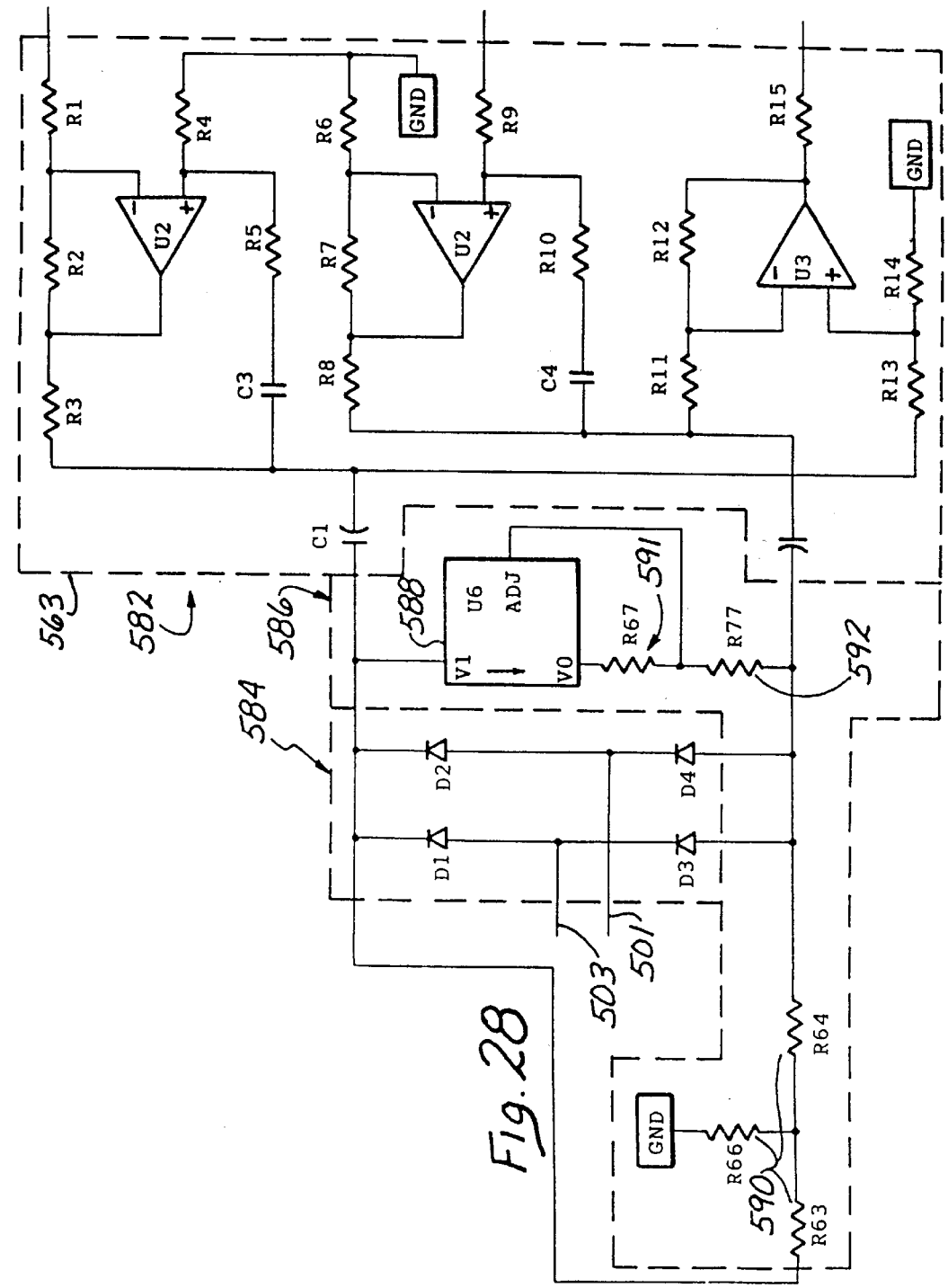
FIG. 28 is a schematic of an adaptor box (non-line powered) line interface according to the invention.

The adapter box line interface is schematically depicted in FIG. 28 and is denoted by reference numeral 582. Adapter box interface 582 is a separate powering circuit comprised of three elements, namely the line signal interface 563 as described in connection with FIGS. 18 and 19, a diode bridge interface generally denoted by reference numeral 584 similar to diode bridge interface 506 described in connection with FIG. 27, and a line load interface generally denoted by reference numeral 586. Diode bridge interface 584 is required because of the use of polarized electrolytic capacitors in the signal interface mechanism depicted in FIG. 28.

Line load interface 586 is comprised of a small constant current source which includes a regulator 588 and resistor 591 in combination with a load resistor 592. Load resister 592 is used as a loading device along with ground-point-resistor-setting circuit 590 to provide enough current drain to properly forward bias diode bridge 584 and to provide proper polarity to ensure protection to the electrolytic capacitors coupling diode bridge 584 to line signal interface circuit 563. Line signal interface circuit 563 is described in connection with FIGS. 18 and 19.

The operation of adapter box line interface 582 is as follows. The line input is coupled to terminals 501 and 503 which are rectified by the four diodes in diode bridge 584 to provide the proper polarity to the system reference voltage point, GND, in similar manner as described in connection with diodes 508–514 and resistors 550–554 in FIG. 27. Regulator 588 and resistor 591 are configured as a positive constant current source supplying load resistor 592. The current from the positive constant current source is approximately 1.25 volts divided by the resistance of resistor 591 and is set to a current which will ensure linear region operation within diode bridge 584 under all worst case conditions of signal levels on the external line or line signal interface. The current setting is no greater than is needed and load resistor 592 is no less than a value required to perform the necessary diode biasing in order to minimize system power.

The operation of the circuits in FIGS. 27 and 28 now having been described, it must be understood that the line powering interface is shown only by way of example. The preferred embodiment uses balanced elements and close centering of the supplies to the source. However, offset centering and different supply voltages other than plus or minus 5 volts can be specified and achieved as well as providing multiple voltage sources with varying levels without departing from the scope of the invention. Different types of voltage dependent resistors other than a depletion mode JFET, like JFET 540, can also be utilized for similar results. The invention should not be construed as requiring this type of voltage dependent resistive element. Many different approaches for generation buffering of node 544 in FIG. 27 can also be used other than the voltage follower voltage gain amplifier which is illustrated.

Still further, many other types of constant current sources can be used in place of the set negative current provided by regulator 524 and resistor 526 and the adjustable positive current provided by regulator 522 with the load resistance of JFET 540 and resistor 538 with similar effect.

The invention is generally directed to a single fixed current source and a slowly adjustable current source with a slowly adjustable current having means to move the adjustable current into balance with the fixed current source for the purposes of avoiding the need to exactly match components as well as adjusting to system or load imbalance experienced in real applications.

Further, many other types of voltage regulators beyond zener diodes 546 and 548 can also be substituted. Also, a variable negative current source and a fixed positive current source can be used to achieve a similar effect and performance.

The line power embodiments which have been illustrated, with or without a diode bridge, and with or without line signal interfacing, are particularly distinguished by its unique ability to achieve extremely low noise at subaudio frequencies in line powering and other types of powering applications. The illustrated embodiments are particularly advantageous for use in applications where common ground connections are not physically or economically achievable and/or where such common ground connections exists with problems of small supply imbalances which would cause ground loop noise. The invention has solved these problems by providing a floating ground reference.

Similarly, many other embodiments of the adapter box line load interface of FIG. 28 other than that illustrated are contemplated as within the scope of the invention. Such other forms may use different types of constant current source devices rather than the simple regulator and resistor combination described and still achieve the same effect.

One-Chip System

Figure 29:
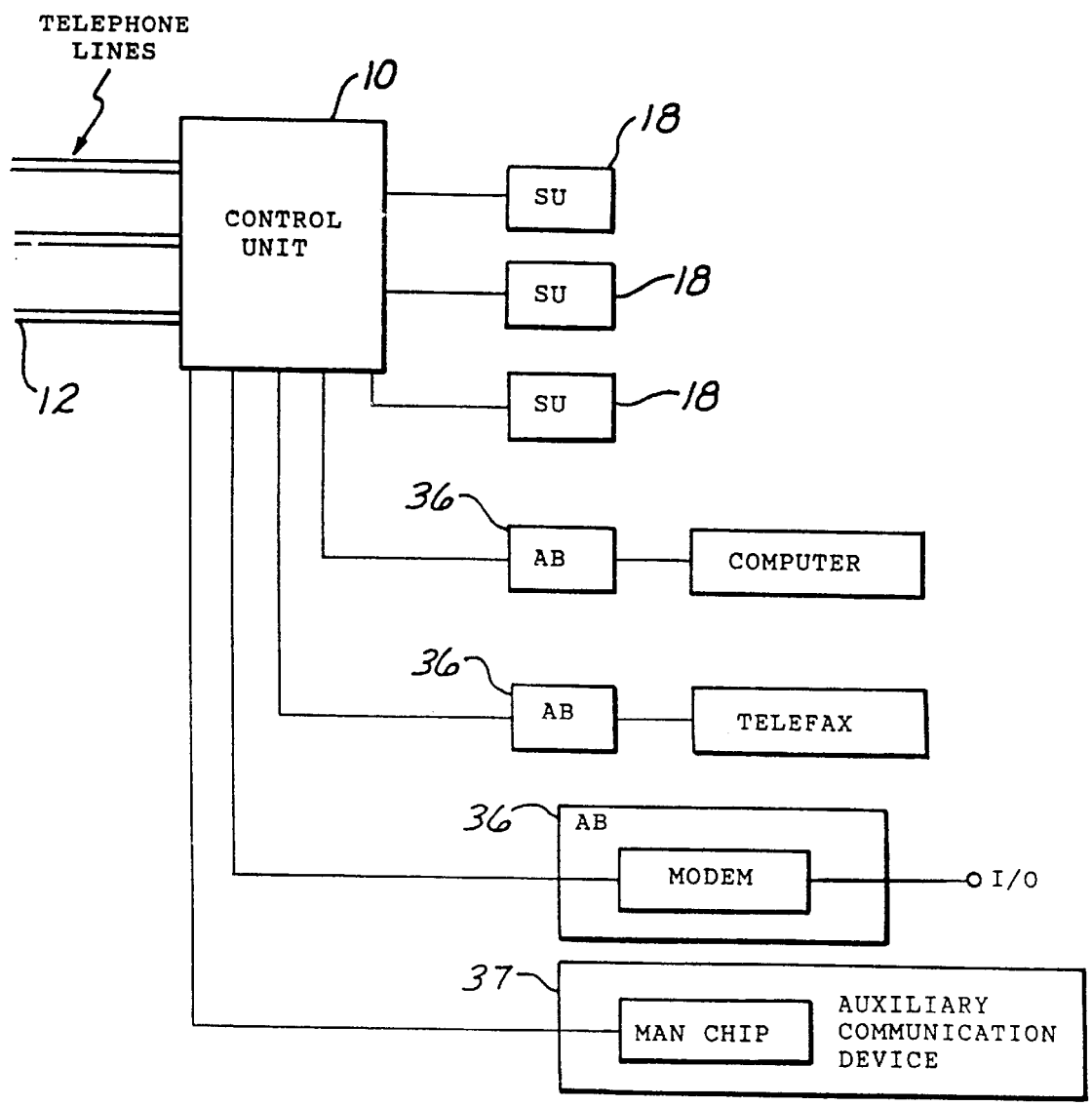
FIG. 29 is a simplified block diagram illustrating some of the system applications made possible by the invention.

FIG. 29 illustrates some of the applications which can be realized with a one chip system devised according to the invention. Everything needed to provide a programmably customized communication and telephone network is available using only one basic chip design in the system as described above. Not only are standard telephone communications possible on a single twisted pair, but a network of telephone receivers, computers, modems, telefax devices, answering machines and any other type of information handling or communication device now known or later devised for use on a telephone line can be networked and accommodated within the system.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the germ of the invention. In the following claims it must be understood that where "station unit" or words to similar effect are used, it is sometimes meant to include both the station unit 18 and adaptor box 36 described above, or either one of them.

We claim:

1. A circuit for reducing echo back of transmitted signals on a communication line comprising:

a summing means coupled to said communication line for a bi-directional communication of signals therewith, said summing means having a summing node;

a balance network means for coupling a switch selected array of selectable impedances to said summing node; and a processor means for receiving a signal from said summing node and for generating a control signal to said balance network means to select an impedance to be coupled to said summing node to reduce said signal received from said summing node by said processor means, said summing node having coupled thereto signals which are measures of the transmitted and received signals on said communication line;

whereby the echo back of a transmitted signal placed on said communication line is substantially reduced.

2. The circuit of claim 1 wherein said balance network means comprises a plurality of selectively switched impedance elements.

3. The circuit of claim 2 wherein said switched impedance elements are comprised of a plurality of switch selectable capacitive elements and switch selectable resistive elements.

4. The circuit of claim 3 wherein said switch selectable resistive elements comprises a switched capacitor equivalent of resistors.

5. The circuit of claim 1 wherein said processor means comprises:

a peak detector means for generating a constant analog voltage corresponding to an amplified signal from said summing node and from said echo back of transmitted signals from said communication line;

an analog-to-digital converter for converting said constant analog voltage to a digital number; and a digital processor for receiving said digital number and generating control signals to be coupled to said balance network means for altering said impedance of said balance network means to minimize said echo back signal.

6. The circuit of claim 1 further comprising an analog test tone signal generation means for selectively coupling a predetermined test tone onto said communication line and into said summing node to generate and measure from said communication line said echo back signals coupled to said summing node.

7. The circuit of claim 1 further comprising a remote station unit coupled to said communication line, and a control unit communicating with said station unit across said communication line, said station unit similarly being provided with a summing means and balance network means, said processor means corresponding to said control unit for further remotely communicating control signals to said balance network means corresponding to said remote station unit to substantially reduce said echo back of transmitted signals at said station unit as determined by optimal reduction of said echo back of transmitted signals by said processor means and corresponding balance network means at said control unit.

8. A system for coupling signals on a two-wire communication line to a plurality of sources/receivers comprising:

a plurality of voltage-to-current amplifiers, each capacitively coupled to said communication line, said voltage-to-current amplifier for transmitting between one of said plurality of sources/receivers and said communication line;

wherein each said voltage-to-current amplifier comprises two differential amplifiers, each differential amplifier having an output capacitively coupled to one wire of said two-wire communication line comprising said two-wire communication line, one of said two differential amplifiers being operated as a current source into ground and the other one of said differential amplifiers being operated as a current source from ground and both operating in a complementary fashion to each other relative to signals on said two-wire communication line; and capacitive means for providing high impedance coupling between said plurality of voltage-to-current amplifiers and said communication line;

whereby said plurality of sources/receivers are coupled to said communication line without being characterized by mutual inductance, leakage inductance, inherent resonance, nonlinearlity of magnetic media, or a winding resistance characteristic of transformer coupling.

9. The system of claim 8 further comprising a differential receiving amplifier having two inputs, each of said inputs being RC coupled to one of said two lines of said two-wire communication line, said RC coupled differential amplifier having an output characterized by substantial common mode rejection of signals received by said two-wire communication line.

10. The system of claim 9 further comprising a plurality of echo balance means for canceling echo back signals and wherein said RC coupled differential amplifier has its output coupled to each of said echo balance means, one of said echo balance means being provided for each of said voltage-tocurrent amplifiers so that the echo back signal for each source/receiver is substantially reduced.

11. The system of claim 8 further comprising a balanced DC load means comprised of a plurality of high impedance balanced DC loads at each transmitting/receiving station interface for allowing line powering over said communication line without substantially lowering the AC impedance of each said voltage-to-current amplifier and without disturbing signal current information.

12. The system of claim 8 further comprising a single low impedance capacitively coupled balanced load ground means for setting a ground reference while maintaining high impedance of said communication line and to allow said plurality of voltage-to-current amplifiers to be coupled to said communication line without significantly lowering the impedance of said communication line.

* * * * *